(12) United States Patent
McCrossan et al.

(10) Patent No.: US 8,233,779 B2
(45) Date of Patent: Jul. 31, 2012

(54) RECORDING MEDIUM, RECORDING METHOD, REPRODUCTION APPARATUS AND METHOD, AND COMPUTER-READABLE PROGRAM

(75) Inventors: Joseph McCrossan, Simi Valley, CA (US); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 1351 days.

(21) Appl. No.: 11/857,377

(22) Filed: Sep. 18, 2007

(65) Prior Publication Data
US 2008/0050091 A1 Feb. 28, 2008

Related U.S. Application Data

(62) Division of application No. 10/563,262, filed as application No. PCT/JP2004/010155 on Jul. 9, 2004, now Pat. No. 7,366,405.

(51) Int. Cl.
*H04N 5/89* (2006.01)
(52) U.S. Cl. ......... 386/336; 386/230; 386/241; 386/248
(58) Field of Classification Search .................. 386/230, 386/241, 243, 244, 248, 329, 330, 336, 337, 386/356; 345/628, 629, 632, 639
See application file for complete search history.

(56) References Cited

U.S. PATENT DOCUMENTS

| | | | |
|---|---|---|---|
| 5,838,316 A | 11/1998 | Arruza | |
| 5,854,873 A | 12/1998 | Mori et al. | |
| 5,907,658 A | 5/1999 | Murase et al. | |
| 5,929,857 A | 7/1999 | Dinallo et al. | |
| 6,104,706 A | 8/2000 | Richter et al. | |
| 6,181,872 B1 | 1/2001 | Yamane et al. | |
| 6,580,869 B1 | 6/2003 | Ando et al. | |
| 7,386,223 B2 | 6/2008 | Yagi et al. | |
| 2002/0076209 A1 | 6/2002 | Moon | |
| 2002/0106183 A1 | 8/2002 | Maertens | |
| 2002/0196050 A1 | 12/2002 | Nygren | |
| 2002/0196850 A1 | 12/2002 | Liu et al. | |
| 2003/0086690 A1 | 5/2003 | Chung et al. | |

(Continued)

FOREIGN PATENT DOCUMENTS
CN 1399268 2/2003
(Continued)

OTHER PUBLICATIONS

The First Office Action issued by Chinese Patent Office dated Feb. 5, 2010 for corresponding Chinese Patent Application No. 200710167989.5.

*Primary Examiner* — Thai Tran
*Assistant Examiner* — Mishawn Dunn
(74) *Attorney, Agent, or Firm* — Panasonic Patent Center; Dhiren Odedra; Kerry Culpepper

(57) ABSTRACT

An AV Clip generated by multiplexing video and graphics streams is recorded on a BD-ROM. The graphics stream includes a plurality of DSs (Display Sets) which are each a group of segments used for graphics display. ODSs (Object Definition segments) belonging to a DS include a referenced ODS and a non-referenced ODS. The non-referenced ODS is an ODS that is not referenced by a PCS (Presentation Composition Segment) included in the display set. An END segment is provided immediately following a last ODS of the sequence of the referenced ODS and the non-referenced ODS in the display set.

7 Claims, 41 Drawing Sheets

U.S. PATENT DOCUMENTS

| | | |
|---|---|---|
| 2003/0117529 A1 | 6/2003 | De Haan |
| 2004/0175133 A1 | 9/2004 | Kashiwagi et al. |
| 2004/0184764 A1 | 9/2004 | Yagi et al. |
| 2005/0025452 A1 | 2/2005 | Seo et al. |
| 2006/0204092 A1 | 9/2006 | Hamasaka et al. |
| 2006/0245723 A1 | 11/2006 | Yahata et al. |
| 2006/0294543 A1* | 12/2006 | Yahata et al. ............ 725/37 |

FOREIGN PATENT DOCUMENTS

| | | |
|---|---|---|
| EP | 0 924 934 A1 | 6/1999 |
| EP | 1 081 962 | 2/2000 |
| EP | 1 035 735 A2 | 9/2000 |
| JP | 09-259507 | 10/1997 |
| JP | 2000-228656 | 7/2000 |
| JP | 3128220 | 1/2001 |
| JP | 2002-374494 | 12/2002 |
| JP | 2003-100056 | 4/2003 |
| JP | 2003-173621 | 6/2003 |
| TW | 334563 | 6/1998 |
| TW | 436777 | 5/2001 |
| TW | 200301061 | 6/2003 |
| WO | 01/22729 A1 | 3/2001 |
| WO | 01/76256 | 10/2001 |
| WO | 2004/036578 | 4/2004 |
| WO | 2004/098193 A2 | 11/2004 |

\* cited by examiner

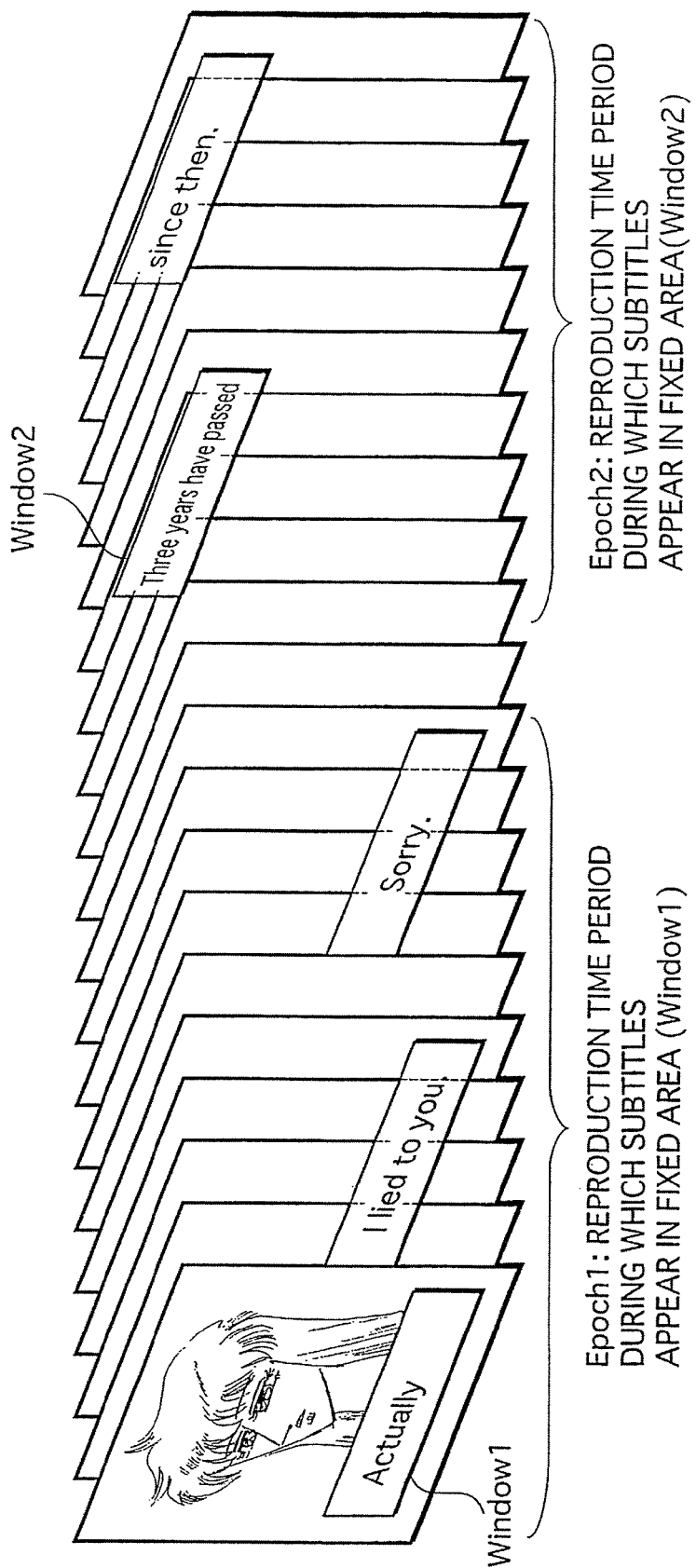

FIG.8A window_definition_segment

| window_id |
| window_horizontal_position |
| window_vertical_position |
| window_width |
| window_height |

FIG.8B presentation_composition_segment

| segment_type |
| segment_length |
| composition_number |
| composition_state |
| palette_update_flag |
| palette_id |
| composition_object(1) |
| composition_object(2) |
| ... |
| composition_object(i) |
| ... |
| composition_object(m) | wd1

| object_id |
| window_id |
| object_cropped_flag |
| object_horizontal_position |
| object_vertical_position |
| cropping_rectangle INFORMATION (1) |
| cropping_rectangle INFORMATION (2) |
| ... |
| cropping_rectangle INFORMATION (i) |
| ... |
| cropping_rectangle INFORMATION (n) | wd2

| object_cropping_horizontal_position |
| object_cropping_vertical_position |
| object_cropping_width |
| object_cropping_height |

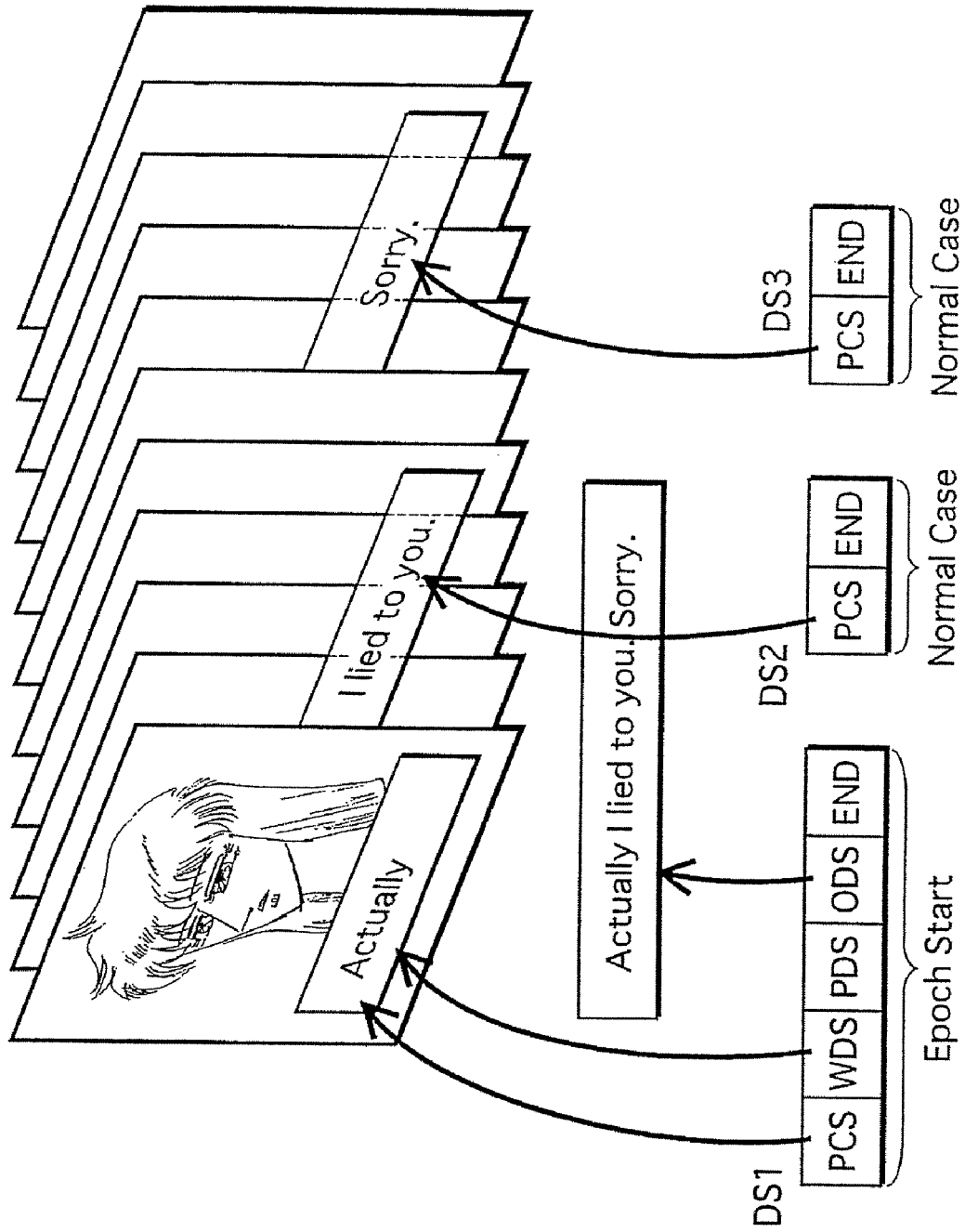

FIG.14 $PTS(DSn[PCS])) >= DTS(DSn[PCS]) + DECODEDURATION(DSn)$
Where:
- DECODEDURATION( DSn ) is calculated as follows:

```
decode_duration = 0 ;
decode_duration += PLANEINITIALIZATIONTIME( DSn ) ;
if( DSn. PCS. num_of_objects == 2 )
{
    decode_duration += WAIT( DSn, DSn. PCS. OBJ[0], decode_duration ) ;
    if( DSn. PCS. OBJ[0]. window_id == DSn. PCS. OBJ[1]. window_id )
    {
        decode_duration += WAIT( DSn, DSn. PCS. OBJ[1], decode_duration );
        decode_duration += 90000*( SIZE( DSn. PCS. OBJ[0]. window_id )//256*10^6 );
    }
    else
    {
        decode_duration += 90000*( SIZE( DSn. PCS. OBJ[0]. window_id )//256*10^6 );
        decode_duration += WAIT( DSn, DSn. PCS. OBJ[1], decode_duration );
        decode_duration += 90000*( SIZE( DSn. PCS. OBJ[1]. window_id )//256*10^6 );
    }
}
else if( DSn. PCS. num_of_objects ==1 )
{
    decode_duration += WAIT( DSn, DSn. PCS. OBJ[0], decode_duration ) ;
    decode_duration += 90000*( SIZE( DSn. PCS. OBJ[0]. window_id )//256*10^6 ) ;
}
return decode_duration ;
```

- PLANEINITIALIZATIONTIME( DSn ) is calculated as follows:

```
initialize_duration=0 ;
if( DSn. PCS. composition_state== EPOCH_START )
{
    initialize_duration = 90000*( 8*video_width*video_height//256*10^6 ) ;
}
else
{
    for( i=0 ; i < WDS. num_windows ; i++ )
    {
        if( EMPTY(DSn.WDS.WIN[i],DSn ) )
            initialize_duration += 90000*( SIZE( DSn. WDS. WIN[i] )//256*10^6 );
    }
}
return initialize_duration ;
```

- WAIT( DSn, OBJ, current_duration ) is calculated as follows:

```
wait_duration = 0 ;
if( EXISTS( OBJ. object_id, DSn ) )
{
    object_definition_ready_time = PTS( GET( OBJ. object_id. DSn ) ) ;
    current_time = DTS( DSn. PCS )+current_duration ;
    if( current_time < object_definition_ready_time )
        wait_duration += object_definition_ready_time - current_time ) ;
}
return wait_duration ;
```

DECODE_DURATION
=(2)+(3)

DECODE_DURATION
=(1)+(3)

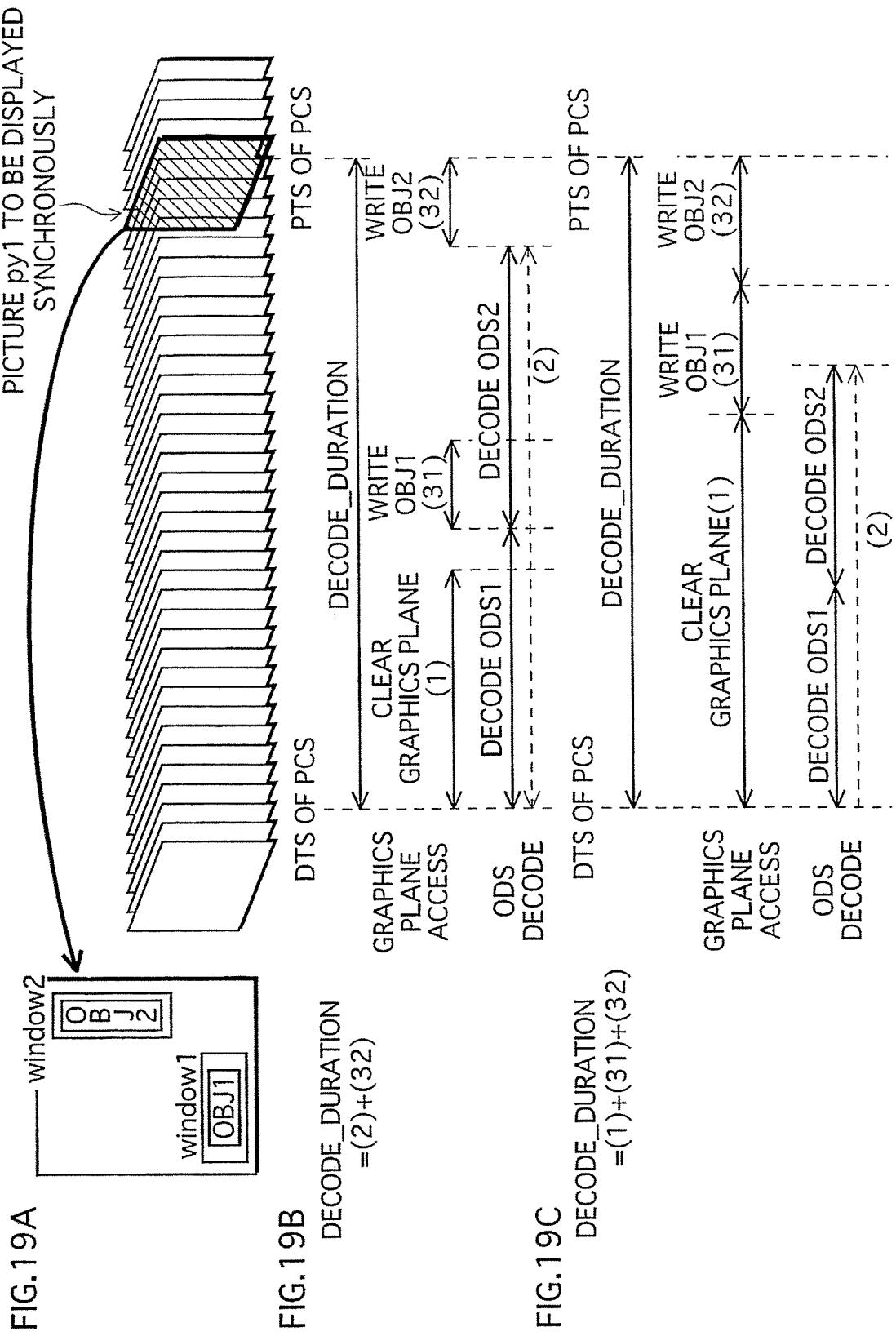

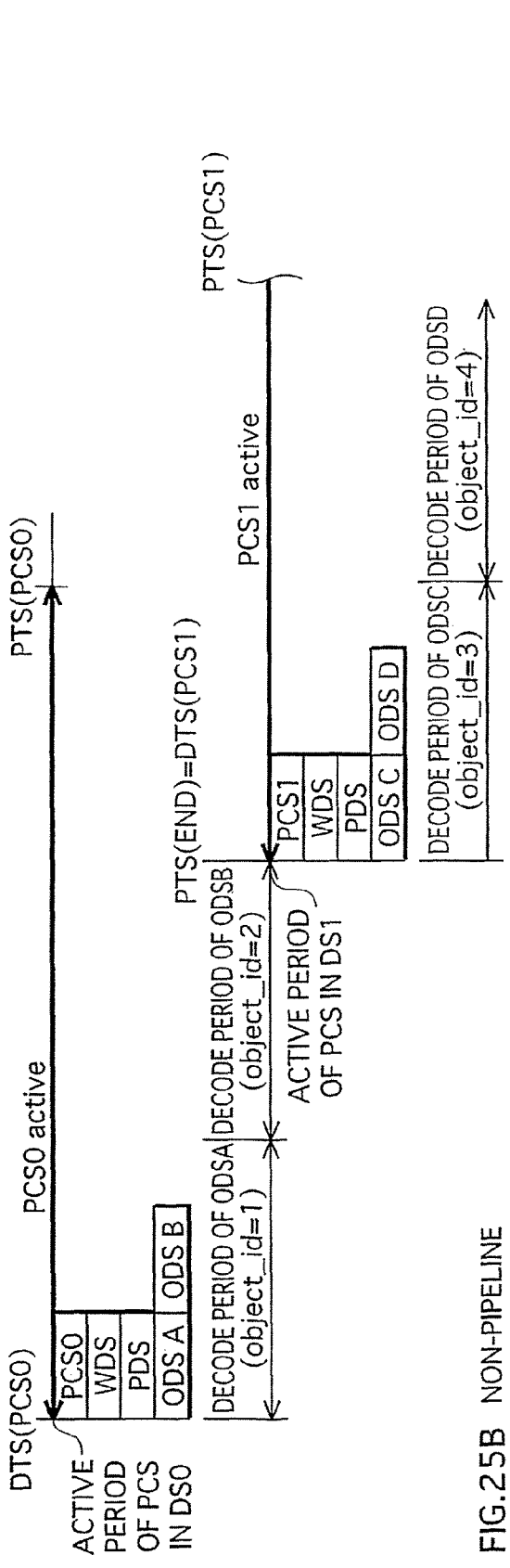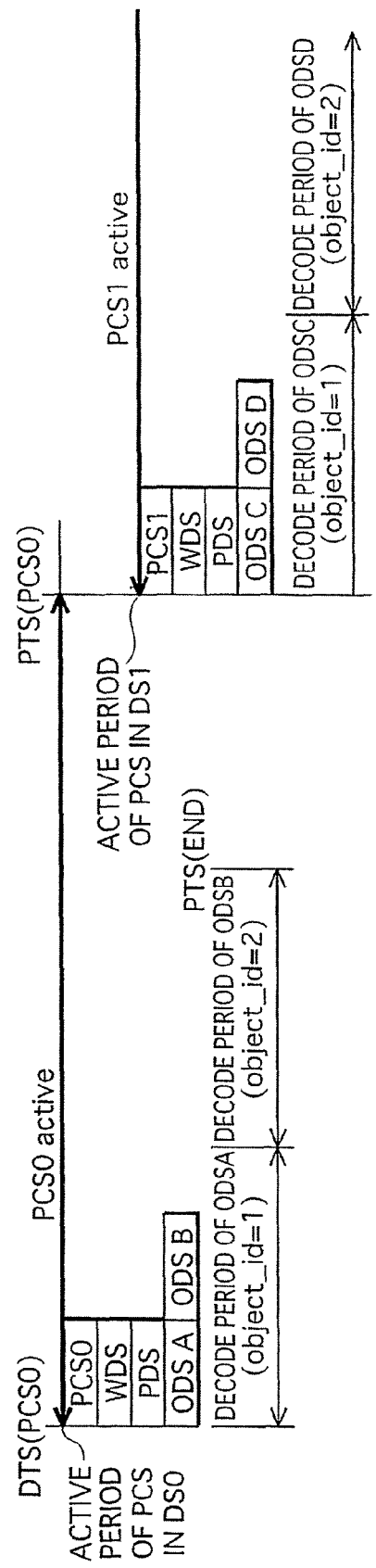

FIG.27A  SCREEN COMPOSITION
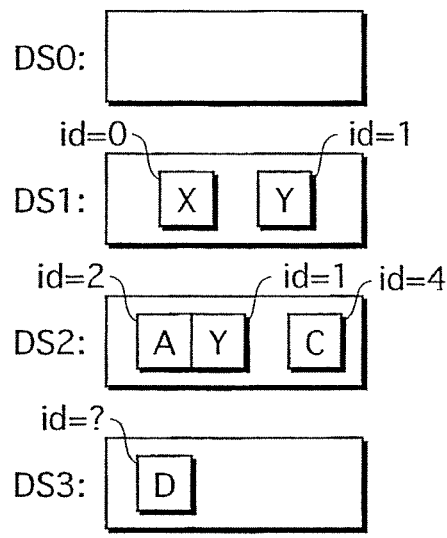
FIG.27B  ACTIVE PERIOD OVERLAPPING AND ODS TRANSFER
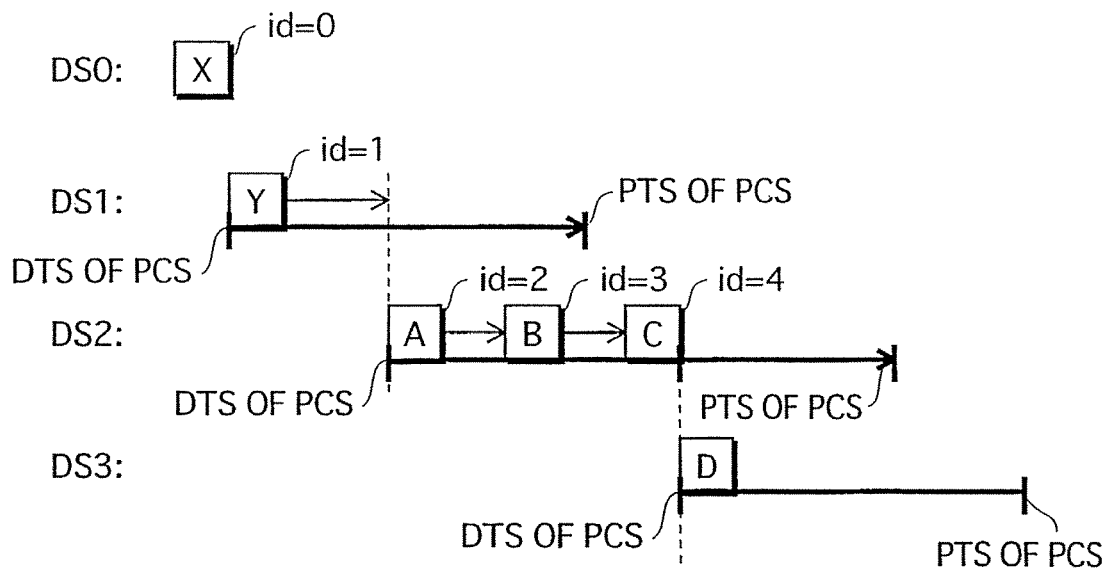
FIG.27C  ARRANGEMENT IN OBJECT BUFFER
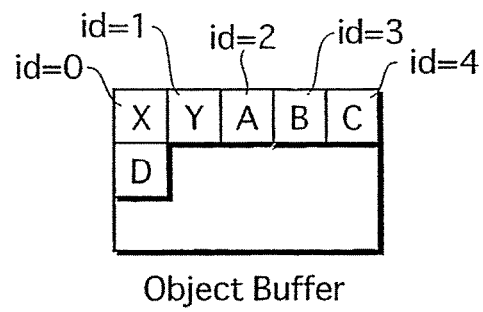
Object Buffer

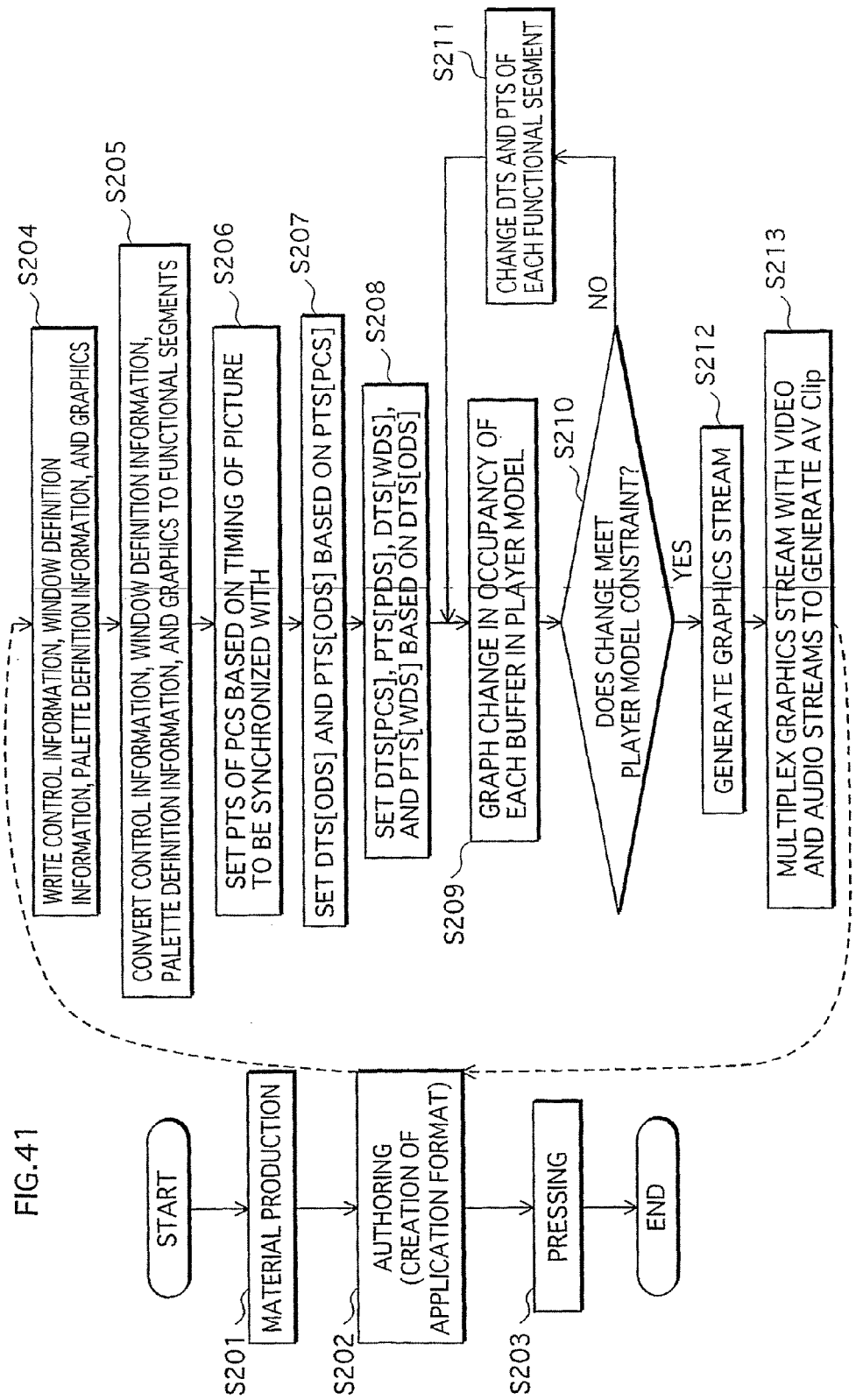

RECORDING MEDIUM, RECORDING METHOD, REPRODUCTION APPARATUS AND METHOD, AND COMPUTER-READABLE PROGRAM

RELATED APPLICATIONS

This application is a divisional application of U.S. patent application Ser. No. 10/563,262 filed Jun. 5, 2006 now U.S. Pat. No. 7,366,405 as a National Phase application from PCT/JP2004/010155 filed Jul. 9, 2004.

TECHNICAL FIELD

The present invention relates to a recording medium such as a BD-ROM and a reproduction apparatus, and in particular relates to a technique of subtitling by reproducing a digital stream which is generated by multiplexing a video stream and a graphics stream.

BACKGROUND ART

Subtitles displayed by rendering a graphics stream are important means for people in different linguistic areas to enjoy foreign-language films. Such a graphics stream is multiplexed with a video stream that represents a moving picture, and recorded on a recording medium. The graphics stream includes a plurality of display sets that are each made up of display control information and graphics data. Each of the display sets is used for displaying an individual subtitle in reproduction of a film. The display sets are read from the recording medium and processed one by one as the reproduction of the moving picture progresses, to display the subtitles together with the moving picture.

Here, if each display set is processed only after processing of an immediately preceding display set is completed, a processing delay develops. Especially when each display set has a high resolution such as 1920×1080, a significant processing delay occurs. Thus, when the graphics stream contains multiple display sets, the need for parallel processing of display sets arises.

One display set may carry not only an object definition segment referenced by its own presentation composition segment but also an object definition segment referenced by a presentation composition segment of a succeeding display set. In such a case of transferring an object definition segment not referenced by the presentation composition segment, when a plurality of object definition segments are loaded to a reproduction apparatus, a boundary between object definition segments that belong to one display set and object definition segments that belong to a succeeding display set is ambiguous.

To perform complete parallel processing of display sets, however, a reproduction apparatus for recording media such as BD-ROMs needs to be equipped with a dual processor-controller system where two processors each decode graphics data and two controllers each control the decoding of the corresponding processor. This makes an internal construction of the reproduction apparatus more complex. If the internal construction is more complex, the manufacturing cost is higher, which hinders wider use of reproduction apparatuses. Thus, even if parallel processing can be achieved with a dual processor-controller system, such an architecture is detrimental to widespread use of reproduction apparatuses, and therefore undesirable in terms of standardization.

DISCLOSURE OF THE INVENTION

The present invention aims to provide a recording medium that can, even when one display set includes not only an object definition segment referenced by its own presentation composition segment but also an abject definition segment referenced by a presentation composition segment of a succeeding display set, clarify which display set object definition segments belong to.

The stated aim can be achieved by a recording medium used for storing data, including: a digital stream generated by multiplexing a video stream and a graphics stream, wherein: the graphics stream includes a plurality of display sets each of which is used for a graphics display; the display set includes a PCS (Presentation Composition Segment), an ODS (Object Definition Segment) for defining a graphics object, and an END segment; the PCS has time information, the time information designating an active period of the PCS in the display set on a reproduction time axis of the video stream; each segment is contained in a packet; the time information includes a decoding time stamp and a presentation time stamp which are written in a packet; the display set includes a sequence of ODSs including a referenced ODS which is referenced by the PCS in the display set and a non-referenced ODS which is not referenced by the PCS in the display set; the referenced ODS and the non-referenced ODS are arranged in the display set in the stated order; the sequence of the referenced ODS and the non-referenced ODS are to be sequentially decoded in the order of the arrangement; and the END segment immediately follows a last ODS of the sequence of the referenced ODS and the non-referenced ODS in the display set.

According to this construction, the END segment is placed in the display set after the object definition segments that belong to the display set. By referencing the END segment, a reproduction apparatus can detect the end of transfer of the object definition segments belonging to the display set. Therefore, even when a referenced object definition segment and a non-referenced object definition segment are included in one display set, when processing that display set, it is easy to recognize from which point to which point the decoding needs to be performed. This enables the reproduction apparatus to perform high-speed rendering using a non-referenced object definition segment.

BRIEF DESCRIPTION OF DRAWINGS

FIG. 6 shows a relationship between subtitle display positions and Epochs.

FIG. 8A shows a data structure of a WDS.

FIG. 8B shows a data structure of a PCS.

FIG. 9 shows an example description of DSs for displaying subtitles.

FIG. 14 shows an example algorithm of calculating a DECODEDURATION.

FIG. 19A shows a situation where two graphics Objects exist respectively in two Windows.

FIG. 19B is a timing chart when decode period (2) is longer than a sum of clear period (1) and write period (31).

FIG. 19C is a timing chart when the sum of clear period (1) and write period (31) is longer than decode period (2).

FIG. 25A shows a case where active periods of PCSs in two DSs are overlapped.

FIG. 25B shows a case where active periods of PCSs in two DSs are not overlapped.

FIGS. 27A to 27C show a relationship between active period overlaps and object_id assignments.

FIG. 41 shows manufacturing steps of the BD-ROM.

BEST MODE FOR CARRYING OUT THE INVENTION (First Embodiment)

Figure 1:
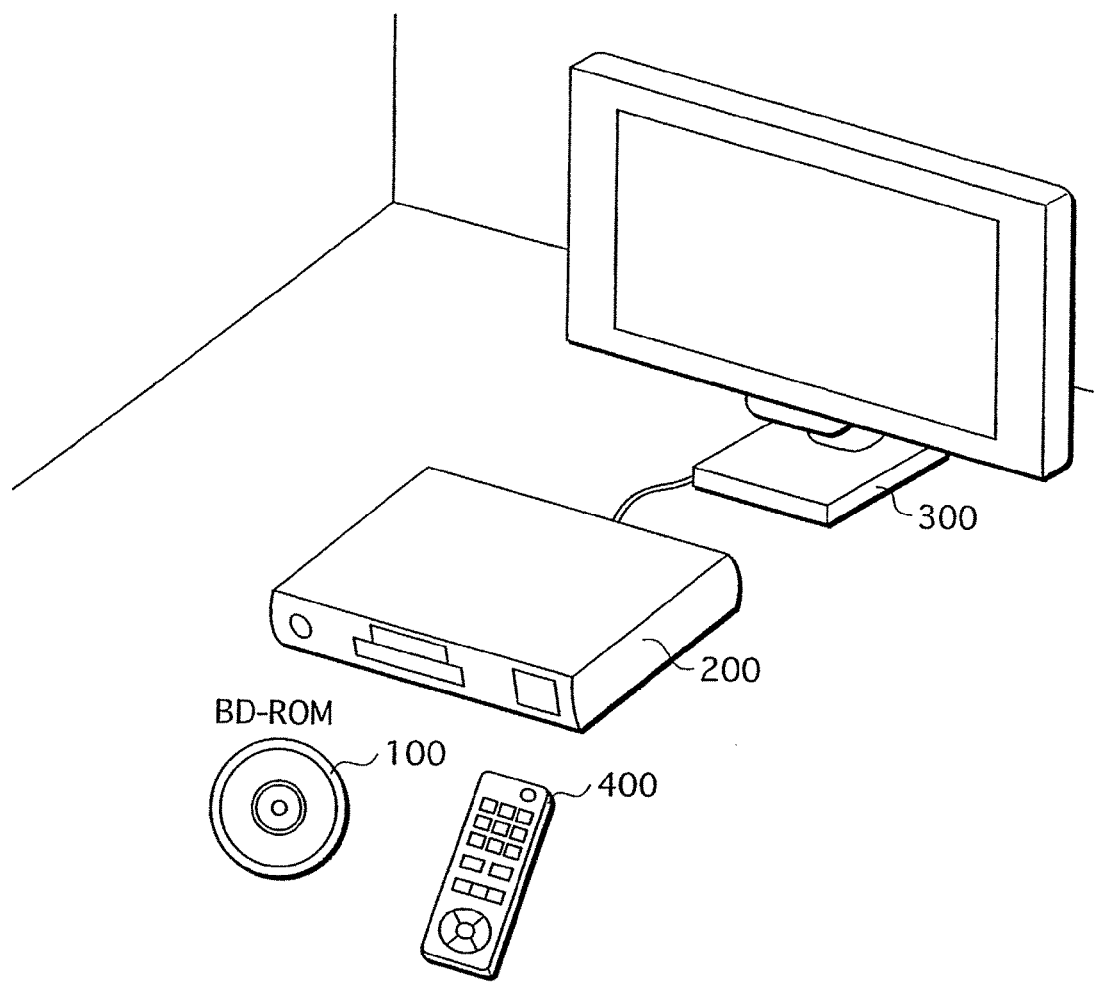
FIG. 1 shows an example application of a recording medium to which embodiments of the present invention relate.

The following is a description on a recording medium to which a first embodiment of the present invention relates. First, use of the recording medium is explained below. FIG. 1 shows an example application of the recording medium. In the drawing, the recording medium is a BD-ROM 100. The BD-ROM 100 is used for providing a movie film in a home theater system that includes a reproduction apparatus 200, a television 300, and a remote control 400.

Figure 2:
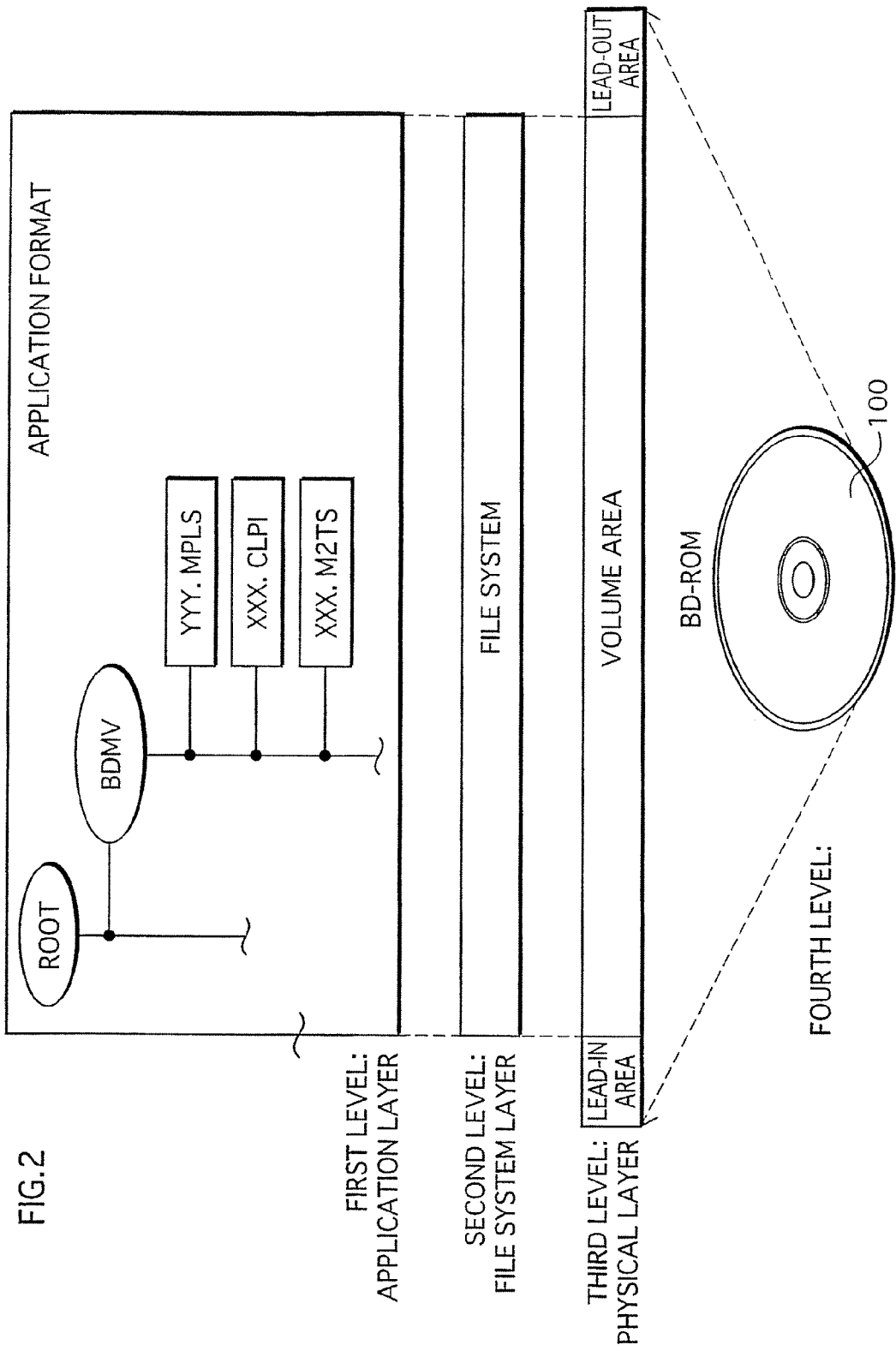
FIG. 2 shows a structure of a BD-ROM shown in FIG. 1.

Production of the recording medium is explained next. The recording medium can be realized by making improvements to an application layer of a BD-ROM. FIG. 2 shows an example structure of the BD-ROM 100.

In the drawing, the fourth level shows the BD-ROM 100, and the third level shows a track on the BD-ROM 100. The track is shown as being stretched out into a straight line, though in actuality the track spirals outwards from the center of the BD-ROM 100. The track includes a lead-in area, a volume area, and a lead-out area. The volume area has a layer model of a physical layer, a file system layer, and an application layer. The first level shows a format of the application layer (application format) of the BD-ROM 100 in a directory structure. As illustrated, the BD-ROM 100 has a BDMV directory below a ROOT directory. The BDMV directory contains a file (XXX.M2TS) storing an AV Clip, a file (XXX.CLPI) storing management information of the AV Clip, and a file (YYY.MPLS) defining a logical playback path (playlist) for the AV Clip. The BD-ROM 100 can be realized by generating such an application format. If there are more than one file for each of the above file types, three directories named STREAM, CLIPINF, and PLAYLIST may be provided below the BDMV directory, to store files of the same type as XXX.M2TS, files of the same type as XXX.CLPI, and files of the same type as YYY.MPLS respectively.

The AV Clip (XXX.M2TS) in this application format is explained below.

Figure 3:
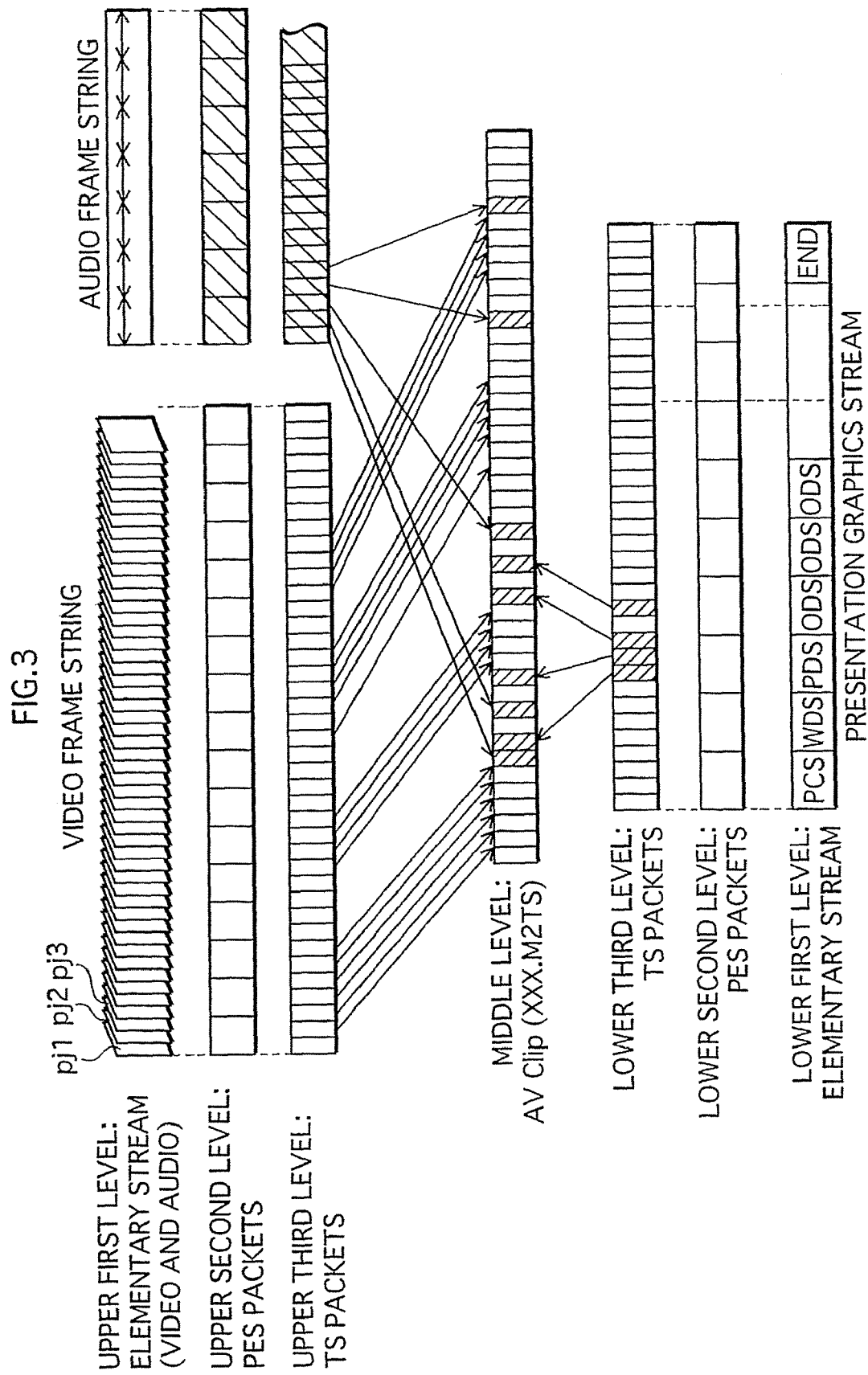
FIG. 3 shows a structure of an AV Clip.

The AV Clip (XXX.M2TS) is a digital stream of the MPEG-TS (Transport Stream) format, and is obtained by multiplexing a video stream, at least one audio stream, and a Presentation graphics stream. The video stream represents a moving picture of the film, the audio stream represents audio of the film, and the Presentation graphics stream represents subtitles of the film. FIG. 3 shows a structure of the AV Clip (XXX.M2TS).

In the drawing, the middle level shows the AV Clip. This AV Clip can be created as follows. The video stream made up of a plurality of video frames (pictures pj1, pj2, pj3, . . . ) and the audio stream made up of a plurality of audio frames on the upper first level are each converted to PES packets on the upper second level, and further converted to TS packets on the upper third level. Likewise, the Presentation graphics stream on the lower first level is converted to PES packets on the lower second level, and further converted to TS packets on the lower third level. These TS packets of the video, audio, and Presentation graphics streams are multiplexed to form the AV Clip.

FIG. 3 shows an example where only one Presentation graphics stream is multiplexed in the AV Clip. If the BD-ROM 100 supports multiple languages, however, a Presentation graphics stream for each of the languages is multiplexed in the AV Clip. The AV Clip generated in the above manner is divided into a plurality of extents in the same way as computer files, and stored on the BD-ROM 100.

Figure 4:
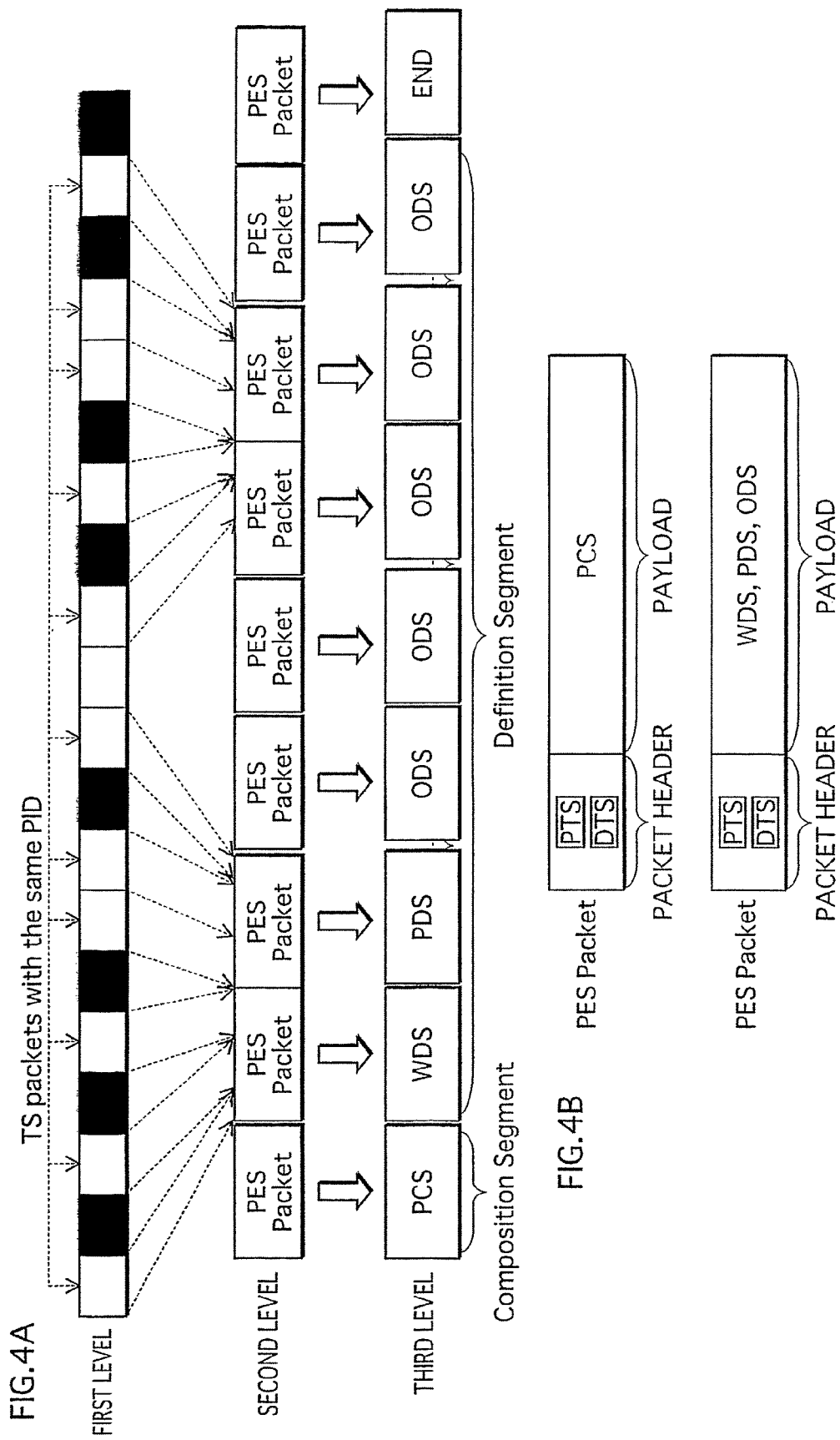
FIG. 4A shows a structure of a Presentation graphics stream.
FIG. 4B shows PES packets which contain functional Segments.

The following explains the Presentation graphics stream. FIG. 4A shows a structure of the Presentation graphics stream. In the drawing, the first level shows the TS packet string which constitutes the AV Clip. The second level shows the PES packet string which constitutes the Presentation graphics stream. This PES packet string is formed by connecting payloads of TS packets having a predetermined PID from the TS packet string on the first level.

The third level shows the structure of the Presentation graphics stream. The Presentation graphics stream is made up of functional Segments that include a PCS (Presentation Composition Segment), a WDS (Window Definition Segment), a PDS (Palette Definition Segment), an ODS (Object Definition Segment), and an END (End of Display Set Segment). Of these functional Segments, the PCS is a screen Composition Segment, whereas the WDS, the PDS, and the ODS are Definition Segments. One functional Segment corresponds to either one PES packet or a plurality of PES packets. Which is to say, one functional Segment is converted to one PES packet and recorded on the BD-ROM 100, or split into fragments which are converted to PES packets and recorded on the BD-ROM 100.

FIG. 4B shows PES packets containing functional Segments. As illustrated, each PES packet is made up of a packet header and a payload. The payload carries a functional Segment, and the packet header carries a DTS and a PTS associated with the functional Segment. Hereafter, a DTS and a PTS in a packet header of a PES packet which contains a functional Segment are regarded as a DTS and a PTS of that functional Segment.

Figure 5:
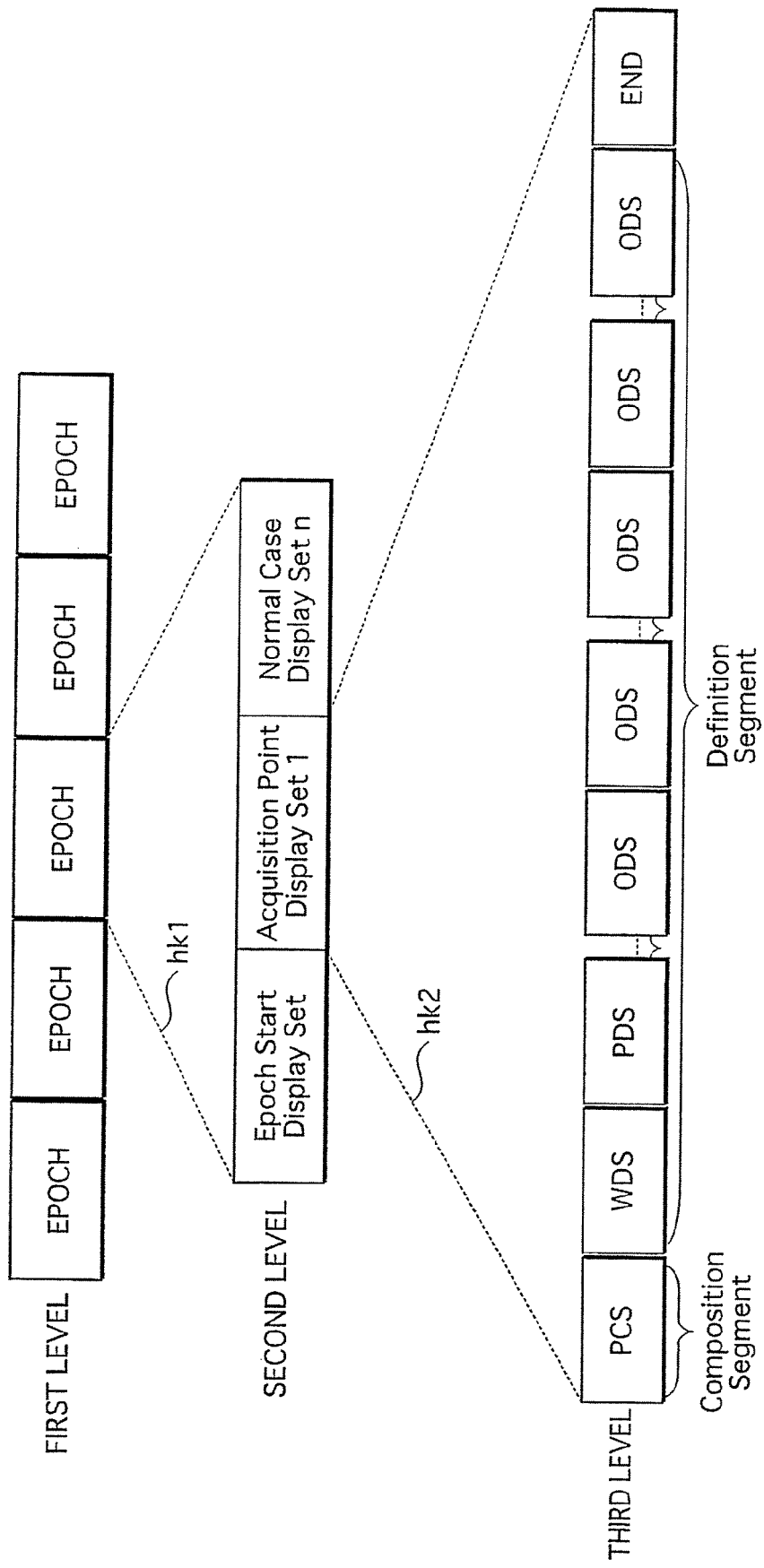
FIG. 5 shows a logical structure made up of various types of functional Segments.

These various types of functional Segments form a logical structure such as the one shown in FIG. 5. In the drawing, the third level shows the functional Segments, the second level shows DSs (Display Sets), and the first level shows Epochs.

A DS on the second level is a group of functional Segments, in the Presentation graphics stream, which are used for creating one screen of graphics. Dashed lines hk2 show which DS the functional Segments on the third level belong to. As can be seen from the drawing, the series of functional Segments PCS-WDS-PDS-ODS-END composes one DS. The reproduction apparatus 200 reads these functional Segments which compose the DS from the BD-ROM 100, to produce one screen of graphics.

An Epoch on the first level refers to one time unit of continuous memory management on a reproduction time axis of the AV Clip, and to a group of data allocated to that time unit. Memory mentioned here includes a Graphics Plane for storing one screen of graphics and an Object Buffer for storing uncompressed graphics data. Continuous memory management means that throughout the Epoch neither the Graphics Plane nor the Object Buffer is flushed and deletion and rendering of graphics are performed only within a predetermined rectangular area of the Graphics Plane (to flush means to clear the entire Graphics Plane or the entire Object Buffer). A size and a position of this rectangular area are fixed during the Epoch. So long as deletion and rendering of graphics are performed within this fixed rectangular area of the Graphics Plane, synchronization of video and graphics is guaranteed. In other words, the Epoch is a time unit, on the reproduction time axis of the AV Clip, during which synchronization of video and graphics can be guaranteed. To change the graphics deletion/rendering area in the Graphics Plane, it is necessary to define a point of change on the reproduction time axis and set a new Epoch from the point onward. Synchronization of video and graphics is not guaranteed in a boundary between the two Epochs.

In regard to subtitling, the Epoch is a time period, on the reproduction time axis, during which subtitles appear within the fixed rectangular area on a screen. FIG. 6 shows a relationship between subtitle display positions and Epochs. In the drawing, subtitle display positions are changed depending on patterns of pictures. In more detail, three subtitles "Actually", "I lied to you.", and "Sorry." are positioned at the bottom of the screen, whereas two subtitles "Three years have passed" and "since then." are positioned at the top of the screen. Thus, the subtitle display positions are changed from one margin to another on the screen, to enhance visibility. In such a case, on the reproduction time axis of the AV Clip, a time period during which the subtitles are displayed at the bottom of the screen is Epoch1, and a time period during which the subtitles are displayed at the top of the screen is Epoch2. These two Epochs each have an individual subtitle rendering area. In Epoch1, the subtitle rendering area is Window1 that corresponds to the bottom margin of the screen. In Epoch2, the subtitle rendering area is Window2 that corresponds to the top margin of the screen. In each of Epoch1 and Epoch2, memory management of the Object Buffer and the Graphics Plane is continuous, so that the subtitles are displayed seamlessly in the corresponding margin of the screen. This completes the explanation on an Epoch.

The following explains a DS.

In FIG. 5, dashed lines hk1 indicate which Epoch DSs on the second level belong to. As illustrated, a series of DSs that are an Epoch Start DS, an Acquisition Point DS, and a Normal Case DS constitutes one Epoch on the first level. Here, Epoch Start, Acquisition Point, and Normal Case are types of DSs. Though the Acquisition Point DS precedes the Normal Case DS in FIG. 5, they may be arranged in reverse order.

The Epoch Start DS provides a display effect "new display", and indicates a start of a new Epoch. The Epoch Start DS contains all functional Segments necessary for the next screen composition. The Epoch Start DS is provided in a position which is to be a destination of a skip operation, such as a start of a chapter in a film.

The Acquisition Point DS provides a display effect "display refresh", and is identical to the preceding Epoch Start DS. The Acquisition Point DS is not the start of the Epoch, but contains all functional Segments necessary for the next screen composition. Therefore, graphics can be displayed reliably when reproduction is started from the Acquisition Point DS. Which is to say, the Acquisition Point DS enables a screen composition to be made from a midpoint in the Epoch.

The Acquisition Point DS is provided in a position which can be a destination of a skip operation, such as a position that may be designated by a time search. The time search is an operation of locating a reproduction point corresponding to a time input by a user in minutes/seconds. The time input is made in a relatively large unit such as ten minutes and ten seconds. Accordingly, the Acquisition Point DS is provided in a position that can be designated by a time search made in units of 10 minutes and 10 seconds. By providing the Acquisition Point DS in a position that can be designated by a time search, the graphics stream can be smoothly reproduced when a time search is conducted.

The Normal Case DS provides a display effect "display update", and contains only a difference from the previous screen composition. For example, if DSv has the same subtitle as immediately preceding DSu but a different screen composition from DSu, DSv is a Normal Case DS which contains only a PCS and an END. This makes it unnecessary to provide overlapping ODSs in DSs, with it being possible to reduce the amount of data stored on the BD-ROM 100. Since the Normal Case DS contains only the difference, graphics cannot be displayed with the Normal Case DS alone.

The following explains the ODS, the WDS, and the PDS (Definition Segments).

The ODS is a functional Segment for defining a graphics Object. AV Clips recorded on BD-ROMs feature an image quality as high as high-definition television. This being so, graphics Objects are set at a high resolution of 1920×1080 pixels. This high resolution allows theater screen-style subtitles, i.e. elegant handwriting-style subtitles, to be reproduced vividly on BD-ROMs.

A graphics Object is made up of a plurality of pieces of run-length data. Run-length data expresses a pixel string using a Pixel Code which shows a pixel value and a continuous length of the pixel value. The Pixel Code has 8 bits, and shows one of the values from 1 to 255. Through the use of this Pixel Code, the run-length data sets arbitrary 256 pixel colors out of full color (16,777,216 colors). Note that it is necessary to place a character string on a background of a transparent color in order to display a graphics Object as a subtitle.

Figure 7A:
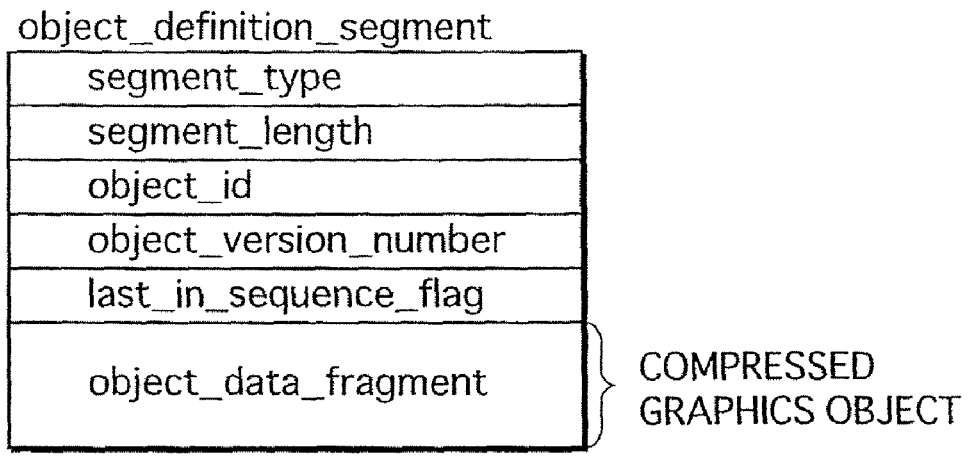
FIG. 7A shows a data structure of an ODS.

The ODS defines a graphics Object according to a data structure shown in FIG. 7A. As shown in the drawing, the ODS includes a segment_type field showing a Segment type "ODS", a segment_length field showing a data length of the ODS, an object_id field identifying the graphics Object in the Epoch, an object_version_number field showing a version of the ODS in the Epoch, a last_in_sequence_flag field, and an object_data_fragment field carrying a consecutive sequence of bytes corresponding to part or all of the graphics Object.

In more detail, the object_id field shows an identifier which identifies the graphics Object and a storage area in the Object Buffer that is occupied by the graphics Object, when the ODS is decoded and the graphics Object is buffered in the Object Buffer. This being so, when one or more graphics Objects are present in the Object Buffer, each individual storage area in the Object Buffer is identified by an object_id field value. Suppose one object_id is assigned to two or more ODSs. In such a case, after a graphics Object corresponding to one ODS is stored in the Object Buffer, that graphics Object is overwritten by a graphics Object corresponding to a succeeding ODS with the same object_id. Such an update intends to prevent occurrence of many small free spaces in the Object Buffer and scattering of graphics Objects in the Object Buffer. When displaying graphics, graphics Objects in the Object Buffer are constantly transferred to the Graphics Plane. This being so, if many small free spaces exist in the Object Buffer or one graphics Object is scattered in the Object Buffer, overhead for reading graphics Objects causes a reduction in efficiency of transfer from the Object Buffer to the Graphics Plane. Such a reduction in transfer efficiency may affect synchronous display of graphics and video. To prevent this, an existing graphics Object in the Object Buffer is overwritten by a new graphics Object having the same object_id.

Here, the new graphics Object overwriting the existing graphics Object needs to be equal in size to the existing graphics Object, that is, the new graphics Object can be neither smaller nor larger than the existing graphics Object. At the time of authoring, therefore, an author needs to make these graphics Objects equal in size. This size constraint that graphics Objects having the same object_id need be equal in width and height applies only within an Epoch. Graphics Objects having the same object_id need not be equal in size if they belong to different Epochs.

The last_in_sequence_flag field and the object_data_fragment field are explained next. Due to a constraint of payloads of PES packets, uncompressed graphics constituting one subtitle may not be able to be contained in one ODS. In such a case, the graphics is split into a plurality of fragments and one of such fragments is carried in the object_data_fragment field. When storing one graphics Object across a plurality of ODSs, every fragment except the last fragment is of the same size. That is, the last fragment is less than or equal to the size of the preceding fragments. The ODSs carrying these fragments of the graphics Object appear in the DS in sequence. The last_in_sequence_flag field indicates an end of the graphics Object. Though the above ODS data structure is based on a method of storing fragments in consecutive PES packets without a gap, the fragments may instead be stored in PES packets so as to leave some gaps in the PES packets.

Figure 7B:
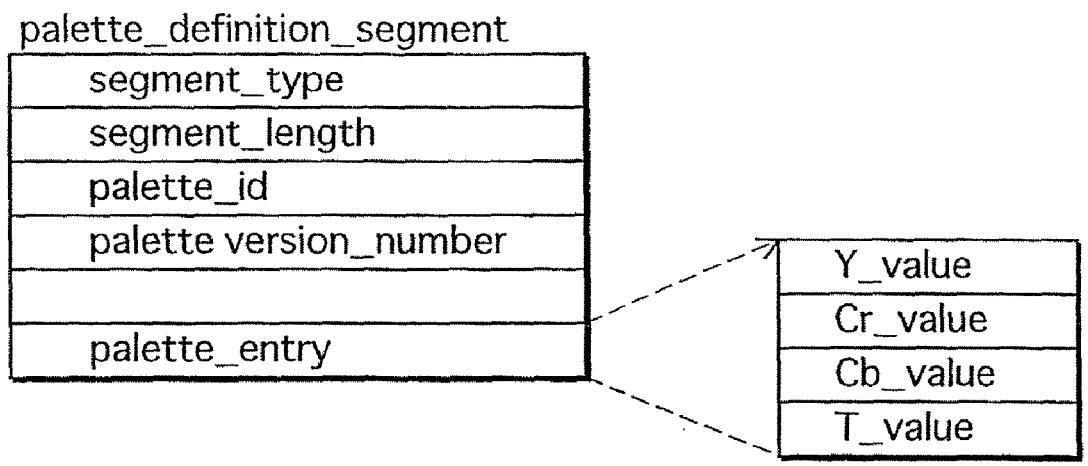
FIG. 7B shows a data structure of a PDS.

The PDS is a functional Segment for defining a Palette used for color conversion. The Palette is data showing combinations of Pixel Codes of 1 to 255 and pixel values. A pixel value referred to here is made up of a red color difference component (Cr value), a blue color difference component (Cb value), a luminance component (Y value), and a transparency (T value). Substituting a Pixel Code of each piece of run-length data into a pixel value on the Palette produces a color. FIG. 7B shows a data structure of the PDS. As shown in the drawing, the PDS includes a segment_type field showing a Segment type "PDS", a segment_length field showing a data length of the PDS, a palette_id field uniquely identifying the Palette, a palette_version_number field showing a version of the PDS within the Epoch, and a palette_entry field carrying information for each entry. The pallete_entry field shows a red color difference component (Cr_value), a blue color difference component (Cb_value), a luminance component (Y_value), and a transparency (T_value) for each entry.

The WDS is a functional Segment for defining a rectangular area on the Graphics Plane. As mentioned earlier, memory management is continuous within an Epoch during which clearing and rendering are performed in a fixed rectangular area on the Graphics Plane. This rectangular area on the Graphics Plane is called a Window, which is defined by the WDS. FIG. 8A shows a data structure of the WDS. As shown in the drawing, the WDS includes a window_id field uniquely identifying the Window on the Graphics Plane, a window_horizontal_position field specifying a horizontal position of a top left pixel of the Window on the Graphics Plane, a window_vertical_position field specifying a vertical position of the top left pixel of the Window on the Graphics Plane, a window_width field specifying a width of the Window on the Graphics Plane, and a window_height field specifying a height of the Window on the Graphics Plane.

The window_horizontal_position field, the window_vertical_position field, the window_width field, and the window_height field can take the following values. The Graphics Plane serves as a coordinate system for these field values. This Graphics Plane has a two-dimensional size defined by video_height and video_width parameters.

The window_horizontal_position field specifies the horizontal position of the top left pixel of the Window on the Graphics Plane, and accordingly takes a value in a range of 0 to (video_width)−1. The window_vertical_position field specifies the vertical position of the top left pixel of the Window on the Graphics Plane, and accordingly takes a value in a range of 0 to (video_height)−1.

The window_width field specifies the width of the Window on the Graphics Plane, and accordingly takes a value in a range of 1 to (video_width)−(window_horizontal_position). The window_height field specifies the height of the Window on the Graphics Plane, and accordingly takes a value in a range of 1 to (video_height)-(window_vertical_position).

A position and size of a Window can be defined for each Epoch, using these window_horizontal_position, window_vertical_position, window_width, and window_height fields in the WDS. This makes it possible for the author to adjust, at the time of authoring, a Window to appear in a desired margin of each picture in an Epoch so as not to interfere with a pattern of the picture. Graphics for subtitles displayed in this way can be viewed clearly. The WDS can be defined for each Epoch. Accordingly, when the pattern of the picture changes with time, graphics can be moved based on such a change so as not to decrease visibility. This enhances the quality of the film to the same level as in the case where subtitles are integrated in a moving picture.

The following explains the END. The END is a functional Segment indicating that the transmission of the DS is complete. The END is positioned immediately after the last ODS in the DS. The END includes a segment_type field showing a Segment type "END" and a segment_length field showing a data length of the END. These fields are not main features of the present invention and therefore their explanation has been omitted.

The following explains the PCS (Composition Segment).

The PCS is a functional Segment for composing a screen that can be synchronized with a moving picture. FIG. 8B shows a data structure of the PCS. As shown in the drawing, the PCS includes a segment_type field, a segment_length field, a composition_number field, a composition_state field, a palette_update_flag field, a palette_id field, and composition_object(1) to composition_object(m) fields.

The composition_number field uniquely identifies a graphics update in the DS, using a number from 0 to 15. In more detail, the composition_number field is incremented by 1 for each graphics update from the beginning of the Epoch to the PCS.

The composition_state field indicates whether the DS is a Normal Case DS, an Acquisition Point DS, or an Epoch Start DS.

The palette_update_flag field shows whether the PCS describes a Palette-only Display Update. The Palette-only Display Update refers to such an update that only replaces a previous Palette with a new Palette. To indicate a Palette-only Display Update, the palette_update_flag field is set to 1.

The palette_id field specifies the Palette to be used in the DS.

The composition_object(1) to composition_object(m) fields each contain information for controlling an individual Window in the DS. In FIG. 8B, dashed lines wd1 indicate an internal structure of composition_object(i) as one example. As illustrated, composition_object(i) includes an object_id field, a window_id field, an object_cropped_flag field, an object_horizontal_position field, an object_vertical_position field, and cropping_rectangle information(1) to cropping_rectangle information(n).

The object_id field shows an identifier of an ODS corresponding to a graphics Object in a Window that corresponds to composition_object(i).

The window_id field shows an identifier of the Window to which the graphics Object is allocated in the PCS. At most two graphics Objects can be allocated to one Window.

The object_cropped_flag field shows whether the graphics Object cropped in the Object Buffer is to be displayed or not. When the object_cropped_flag field is set to 1, the graphics Object cropped in the Object Buffer is displayed. When the object_cropped_flag field is set to 0, the graphics Object cropped in the Object Buffer is not displayed.

The object_horizontal_position field specifies a horizontal position of a top left pixel of the graphics Object on the Graphics Plane.

The object_vertical_position field specifies a vertical position of the top left pixel of the graphics Object on the Graphics Plane.

The cropping_rectangle information (1) to cropping_rectangle information(n) fields are valid when the object_cropped_flag field value is 1. Dashed lines wd2 indicate an internal structure of cropping_rectangle information(i) as one example. As illustrated, cropping_rectangle information(i) includes an object_cropping_horizontal_position field, an object_cropping_vertical_position field, an object_cropping_ width field, and an object_cropping_height field.

The object_cropping_horizontal_position field specifies a horizontal position of a top left corner of a cropping rectangle in the graphics Object. The cropping rectangle is used for taking out one part of the graphics Object, and corresponds to a "region" in ETSI EN 300 743.

The object_cropping_vertical_position field specifies a vertical position of the top left corner of the cropping rectangle in the graphics Object.

The object_cropping_width field specifies a horizontal length of the cropping rectangle in the graphics Object.

The object_cropping_height field specifies a vertical length of the cropping rectangle in the graphics Object.

The following explains a specific description of the PCS, using an example where the three subtitles "Actually", "I lied to you.", and "Sorry." shown in FIG. 6 are displayed sequentially by three operations of writing to the Graphics Plane as the reproduction of the moving picture progresses. FIG. 9 shows an example description for realizing such subtitling. In the drawing, an Epoch has DS1 (Epoch Start DS), DS2 (Normal Case DS), and DS3 (Normal Case DS). DS1 includes a WDS defining a Window in which the subtitles are to be displayed, an ODS showing the line "Actually I lied to you. Sorry.", and a PCS. DS2 includes a PCS. DS3 includes a PCS.

Figure 10:
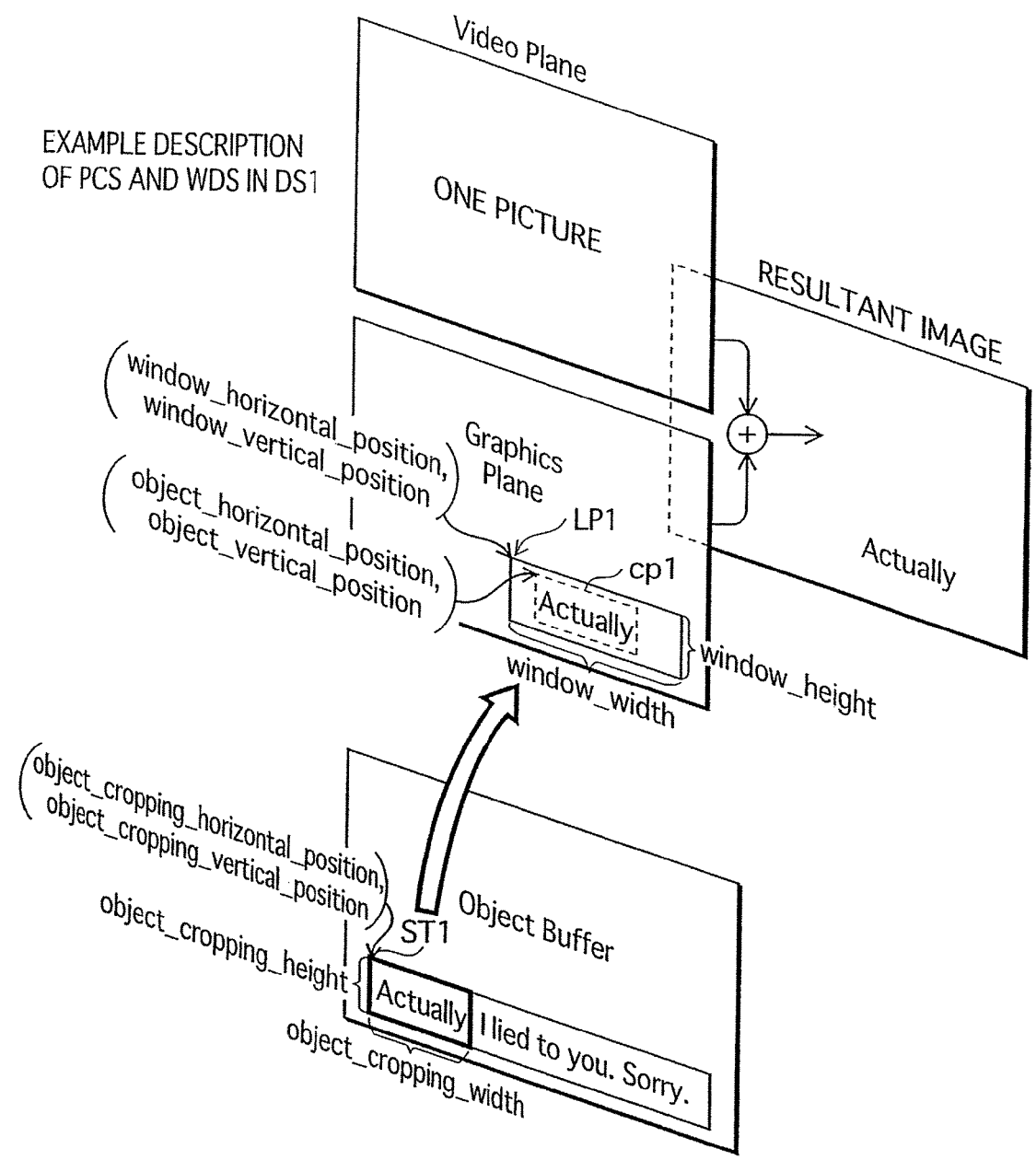
FIG. 10 shows an example description of a PCS and a WDS in DS1.
Figure 11:
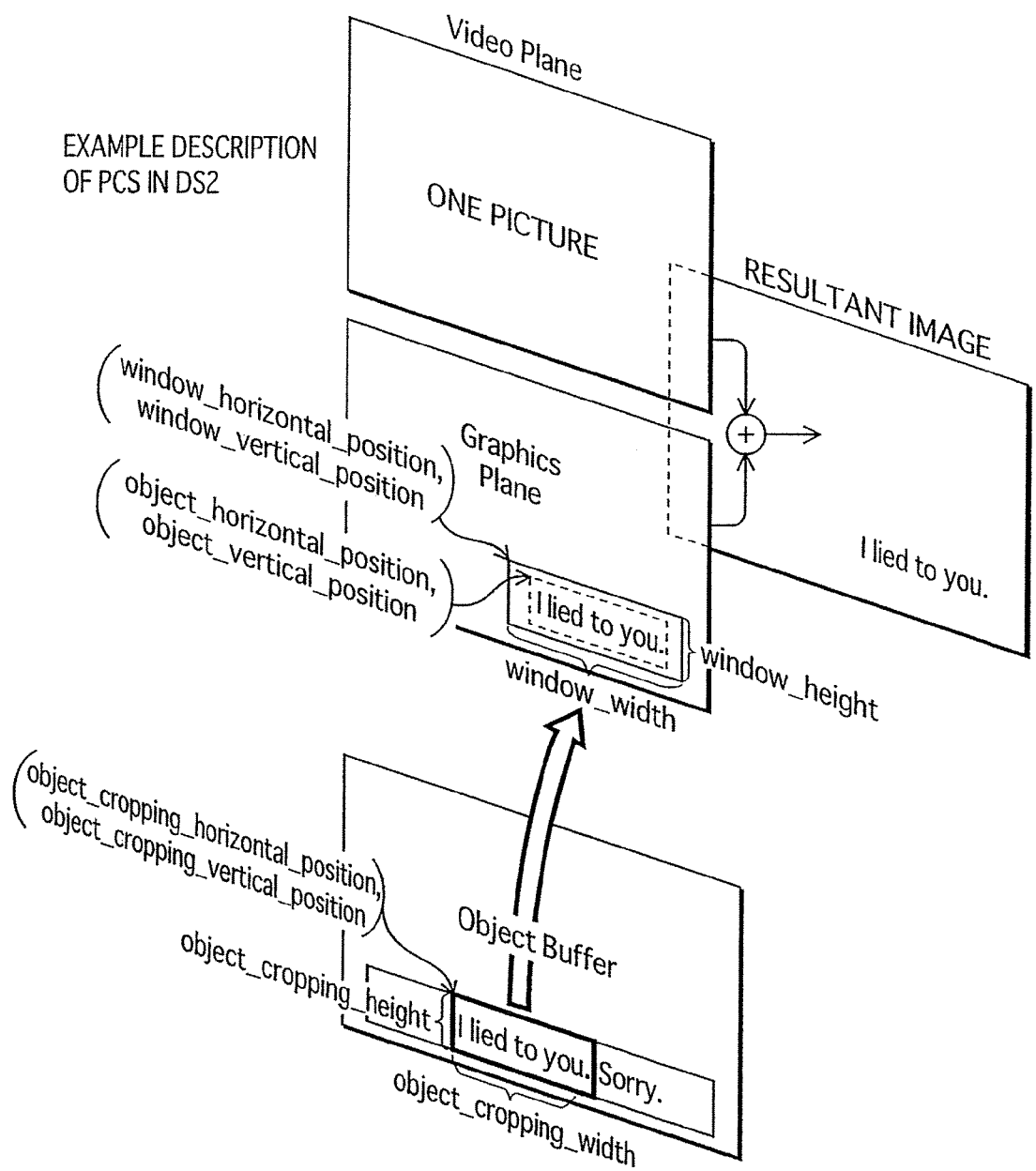
FIG. 11 shows an example description of a PCS in DS2.
Figure 12:
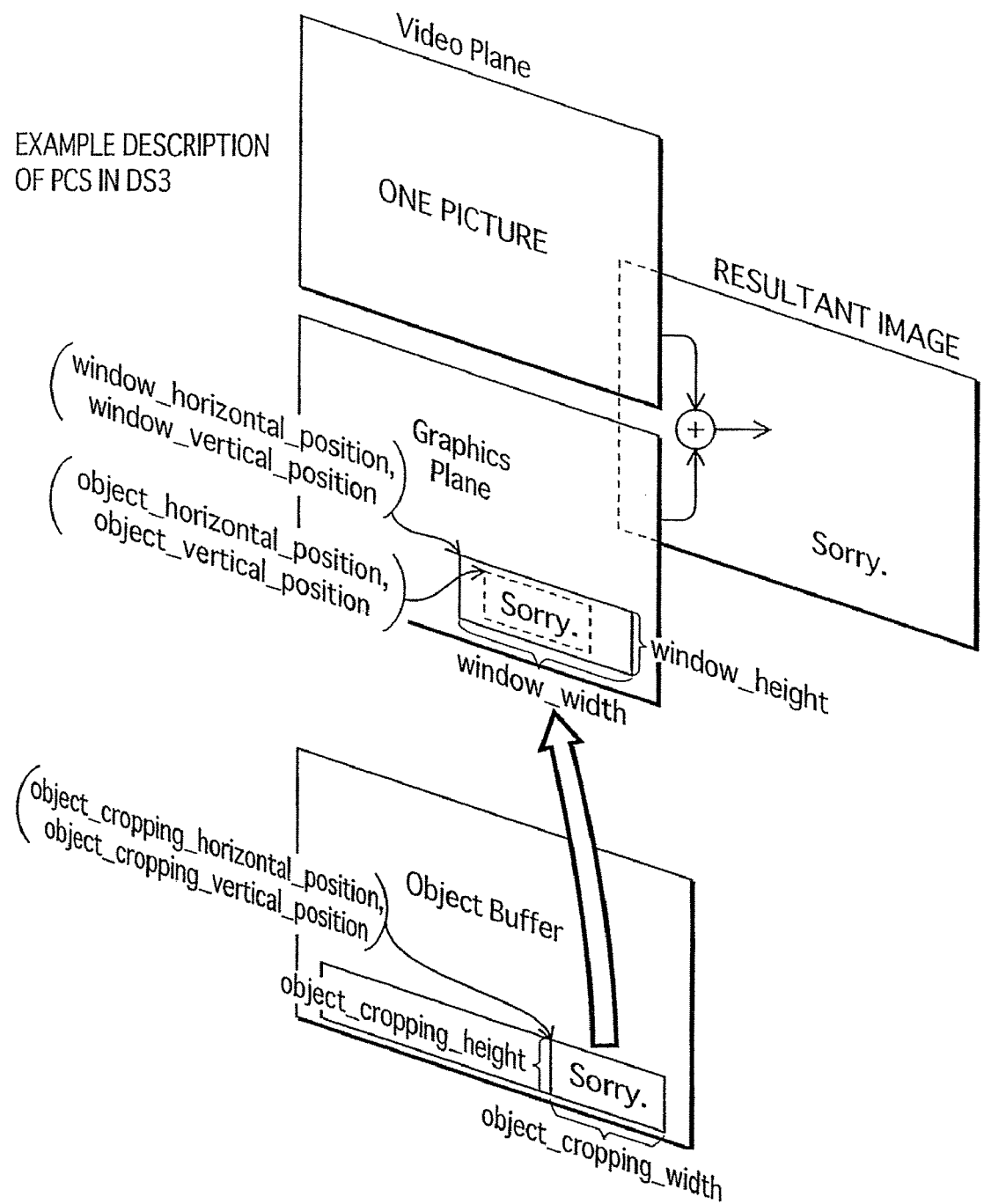
FIG. 12 shows an example description of a PCS in DS3.

Each of these PCSs has the following description. FIGS. 10 to 12 show example descriptions of the WDS and the PCSs belonging to DS1 to DS3.

FIG. 10 shows descriptions of the PCS and the WDS in DS1. In the drawing, a window_horizontal_position field value and a window_vertical_position field value in the WDS specify top left coordinates LP1 of the Window on the Graphics Plane, and a window_width field value and a window_height field value in the WDS specify a width and height of the Window.

An object_cropping_horizontal_position field value and an object_cropping_vertical_position field value of cropping_rectangle information in the PCS specify top left coordinates ST1 of a cropping rectangle in a coordinate system whose origin is top left coordinates of the graphics Object in the Object Buffer. The cropping rectangle is an area (enclosed by a thick-line box) defined by an object_cropping_width field value and an object_cropping_height field value from top left coordinates ST1. A cropped graphics Object is positioned in area cp1 (enclosed by a dashed-line box) so that a top left corner of the cropped graphics Object lies at a pixel specified by an object_horizontal_position field value and an object_vertical_position field value in the coordinate system of the Graphics Plane. In this way, the subtitle "Actually" out of "Actually I lied to you. Sorry." is written into the Window on the Graphics Plane. The subtitle "Actually" is overlaid on a picture and a resultant image is displayed.

FIG. 11 shows a description of the PCS in DS2. Since the description of the WDS in the drawing is the same as that in FIG. 10, its explanation has been omitted. Meanwhile, the description of cropping_rectangle information differs from that in FIG. 10. In FIG. 11, an object_cropping_horizontal_position field value and an object_cropping_vertical_position field value in cropping_rectangle information specify top left coordinates of a cropping rectangle corresponding to the subtitle "I lied to you." in the Object Buffer, and an object_cropping_height field value and an object_cropping_width field value specify a height and width of the cropping rectangle. As a result, the subtitle "I lied to you." is written into the Window on the Graphics Plane. The subtitle "I lied to you." is overlaid on a picture and a resultant image is displayed.

FIG. 12 shows a description of the PCS in DS3. Since the description of the WDS in the drawing is the same as that in FIG. 10, its explanation has been omitted. Meanwhile, the description of cropping_rectangle information differs from that in FIG. 10. In FIG. 12, an object_cropping_horizontal_position field value and an object_cropping_vertical_position field value specify top left coordinates of a cropping rectangle corresponding to the subtitle "Sorry." in the Object Buffer, and an object_cropping_height field value and an object_cropping_width field value specify a height and width of the cropping rectangle. As a result, the subtitle "Sorry." is written into the Window on the Graphics Plane. The subtitle "Sorry." is overlaid on a picture and a resultant image is displayed.

Figure 13:
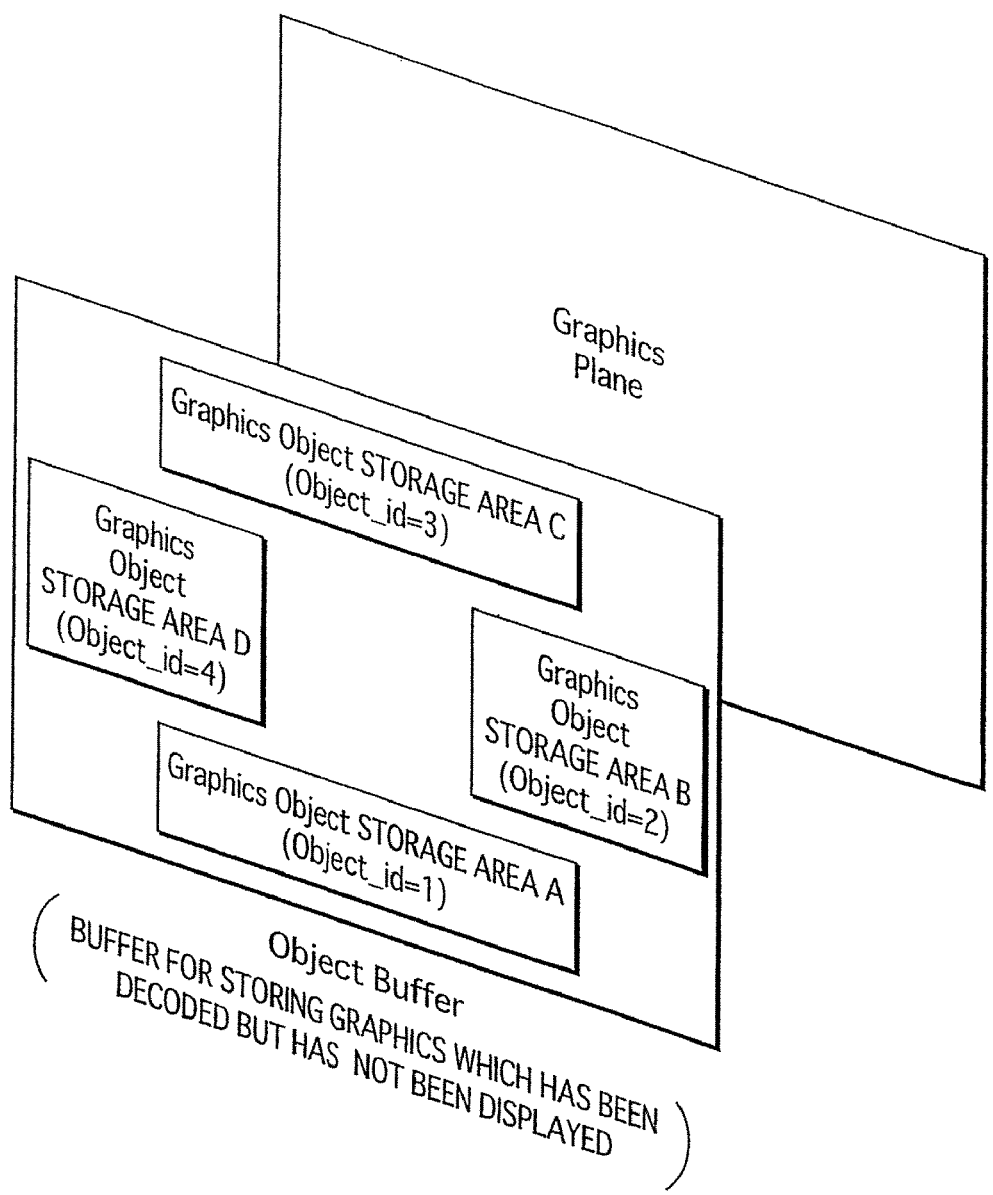
FIG. 13 shows a memory space in an Object Buffer when performing graphics updates such as those shown in FIGS. 10 to 12.

FIG. 13 shows a memory space of the Object Buffer when performing graphics updates such as those shown in FIG. 10 to 12. As illustrated, the Object Buffer has four storage areas A to D which each have a fixed height and width and a fixed position. Of storage areas A to D, the subtitle shown in FIG. 10 is stored in storage area A. Each of storage areas A to D is identified by an object_id corresponding to a graphics Object to be stored in that storage area. In detail, storage area A is identified by object_id=1, storage area B is identified by object_id=2, storage area C is identified by object_id=3, and storage area D is identified by object_id=4. To maintain an efficiency of transfer from the Object Buffer to the Graphics Plane, the height and width of each of storage areas A to D are fixed. This being so, when a graphics Object having some object_id is obtained as a result of decoding, that graphics Object is written in a storage area identified by the object_id over an existing graphics Object. For example, to display a subtitle in the same position and size as the subtitles displayed in FIGS. 10 to 12, an ODS having the same object_id as the ODS in DS1 needs to be provided in a succeeding DS. By adding the same object_id in such a way, a graphics Object in the Object Buffer is overwritten by a new graphics Object, which is displayed in the same position and size as the overwritten graphics Object.

The following explains constraints for achieving display effects. To display subtitles smoothly, it is necessary to perform clearing and rendering on a Window. When performing Window clearing and Window rendering at a frame rate of video frames, the following rate of transfer from the Object Buffer to the Graphics Plane is required.

First, a constraint on the size of the Window is examined. Let Rc be the transfer rate from the Object Buffer to the Graphics Plane. In a worst-case scenario, the Window clearing and the Window rendering need to be performed at Rc. In other words, each of the Window clearing and the Window rendering needs to be performed at half of Rc (Rc/2).

To synchronize the Window clearing and the Window rendering with a video frame, $$(\text{Window size}) \times (\text{frame rate}) \approx Rc/2$$

needs to be satisfied. If the frame rate is 29.97, $$Rc = (\text{Window size}) \times 2 \times 29.97$$

To display a subtitle, the size of the Window needs to be at least about 25% to 33% of the entire Graphics Plane. If a total number of pixels of the Graphics Plane is 1920×1080 and a bit length of an index per pixel is 8 bits, a total capacity of the Graphics Plane is 2 Mbytes ($\approx$1920×1080×8).

Suppose the size of the Window is ¼ of the Graphics Plane, i.e., 500 Kbytes (=2 Mbytes/4). Substituting this to the above formula yields Rc=256 Mbps (500 Kbytes×2×29.97).

Thus, if the size of the Window is about 25% to 33% of the Graphics Plane, display effects of subtitles can be achieved without losing synchronization with a moving picture, so long as the subtitles are displayed with Rc=256 Mbps.

If the Window clearing and the Window rendering may be performed at ½ or ¼ of the video frame rate, the size of the Window can be doubled or quadrupled with the same Rc.

The following explains a position and range of a Window. As mentioned earlier, a position and range of a Window are fixed within an Epoch, for the following reason.

If the position or range of the Window varies in the Epoch, a write address to the Graphics Plane needs to be changed. This incurs overhead, which causes a drop in transfer rate Rc from the Object Buffer to the Graphics Plane.

A number of graphics Objects that can be displayed simultaneously in one Window is limited, in order to reduce overhead when transferring decoded graphics Objects to the Graphics Plane. The overhead mentioned here occurs when setting addresses of edge parts of the graphics Objects. This overhead increases if the number of edge parts is greater.

If there is no limitation on the number of graphics Objects that can be displayed in one Window, the overhead occurs unlimitedly when transferring graphics objects to the Graphics Plane, which increases a variation in transfer load. On the other hand, if the number of graphics Objects in one Window is limited to 2, transfer rate Rc can be set on an assumption that the number of instances of overhead is 4 at the worst. Hence a minimum standard for transfer rate Rc can be determined easily. This completes the explanation on a Window.

The following explains how DSs carrying functional Segments such as PCSs and ODSs described above are allocated on the reproduction time axis of the AV Clip. An Epoch is a time period on the reproduction time axis during which memory management is continuous, and is made up of one or more DSs. Hence it is important to effectively allocate DSs on the reproduction time axis of the AV Clip. The reproduction time axis of the AV Clip mentioned here is a time axis for defining decoding times and presentation times of individual pictures which constitute the video stream multiplexed in the AV Clip. Decoding times and presentation times on the reproduction time axis are expressed with a time accuracy of 90 KHz. DTSs and PTSs of PCSs and ODSs in DSs specify timings for synchronous control on this reproduction time axis. In other words, the DSs are allocated on the reproduction time axis by exercising synchronous control using the DTSs and PTSs of the PCSs and ODSs.

Synchronous control exercised using a DTS and a PTS of an ODS is explained first.

The DTS shows a time at which a decoding process of the ODS is to be started, with an accuracy of 90 KHz. The PTS shows a time at which the decoding process of the ODS is to be completed, with an accuracy of 90 KHz.

The decoding process is made up of decoding the ODS and transferring an uncompressed graphics Object generated by the decoding to the Object Buffer. This decoding process does not complete instantaneously, but requires a certain length of time. The DTS and the PTS of the ODS respectively show the decoding start time and the decoding end time of the ODS, to specify the beginning and end of the decoding process.

Since the time shown by the PTS is a deadline, it is necessary to decode the ODS and store an uncompressed graphics Object in the Object Buffer by the time shown by the PTS.

A decoding start time of arbitrary ODSj in DSn is specified by DTS(DSn[ODSj]) with an accuracy of 90 KHz. This being so, a decoding end time of ODSj in DSn (i.e. PTS(DSn[ODSj]) is a sum of DTS(DSn[ODSj]) and a maximum time required for a decoding process.

Let SIZE(DSn[ODSj]) denote a size of ODSj, and Rd denote an ODS decoding rate. Then the maximum time required for the decoding process (in seconds) is SIZE(DSn[ODSj])//Rd. The symbol "//" represents an operator for a division with a fractional part being rounded up.

By converting this maximum time to the accuracy of 90 KHz and adding the result to the DTS of ODSj, the decoding end time of ODSj specified by the PTS is calculated with the accuracy of 90 KHz.

This PTS of ODSj in DSn can be expressed by the following formula:

$$PTS(DSn[ODSj])=DTS(DSn[ODSj])+90,000\times(SIZE(DSn[ODSj])//Rd)$$

Also, two adjacent ODSs (ODSj and ODSj+1) in DSn need to satisfy the following relationship:

$$PTS(DSn[ODSj])\leq DTS(DSn[ODSj+1])$$

An END in DSn indicates an end of DSn. Therefore, the END shows a decoding end time of a last ODS (ODSlast) in DSn. The decoding end time of ODSlast is shown by a PTS of ODSlast (PTS(DSn[ODSlast])), so that a PTS of the END is set as follows:

$$PTS(DSn[END])=PTS(DSn[ODSlast])$$

Meanwhile, a DTS and a PTS of a PCS in DSn are set in the following manner.

The DTS of the PCS shows either a decoding start time of a top ODS (ODS1) in DSn or a time earlier than that. This is because the PCS needs to be loaded in a buffer of the reproduction apparatus 200 at the same time as or earlier than the decoding start time of ODS1 (DTS(DSn[ODS1])) and a time at which a top PDS (PDS1) in DSn becomes valid (PTS(DSn[PDS1])). Which is to say, the DTS of the PCS needs to satisfy the following formulas:

$$DTS(DSn[PCS])\leq DTS(DSn[ODS1])$$

$$DTS(DSn[PCS])\leq PTS(DSn[PDS1])$$

On the other hand, the PTS of the PCS is calculated as follows:

$$PTS(DSn[PCS])\geq DTS(DSn[PCS])+DECODEDURATION(DSn)$$

Here, DECODEDURATION(DSn) indicates a time required for decoding and presenting all graphics Objects used for updates described in the PCS in DSn. Though DECODEDURATION(DSn) is not a fixed value, it will not be affected by factors such as differences in state or implementation of reproduction apparatuses. When a graphics Object used for a screen composition described by the PCS in DSn is denoted by DSn.PCS.OBJ[j], DECODEDURATION(DSn) is varied by (i) a time required for Window clearing, (ii) a time required for decoding DSn.PCS.OBJ[j], and (iii) a time required for writing DSn.PCS.OBJ[j] on the Graphics Plane. Accordingly, DECODEDURATION(DSn) is the same regardless of implementations of reproduction apparatuses, so long as Rd and Rc are predetermined. Therefore, the length of each of the above time periods is calculated to specify the PTS of the PCS, at the time of authoring.

Figure 15:
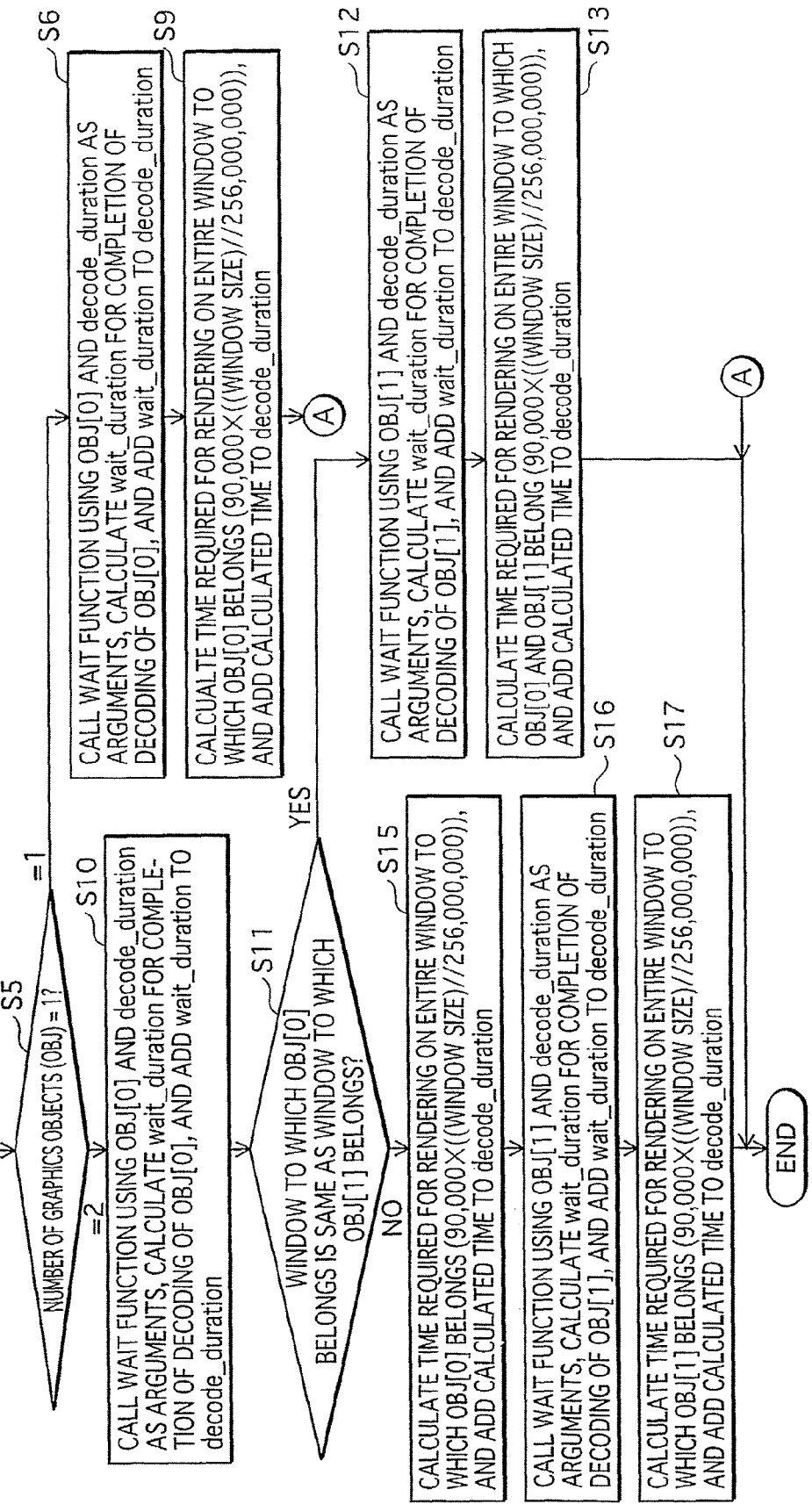
FIG. 15 is a flowchart of the algorithm shown in FIG. 14.
Figure 16A:
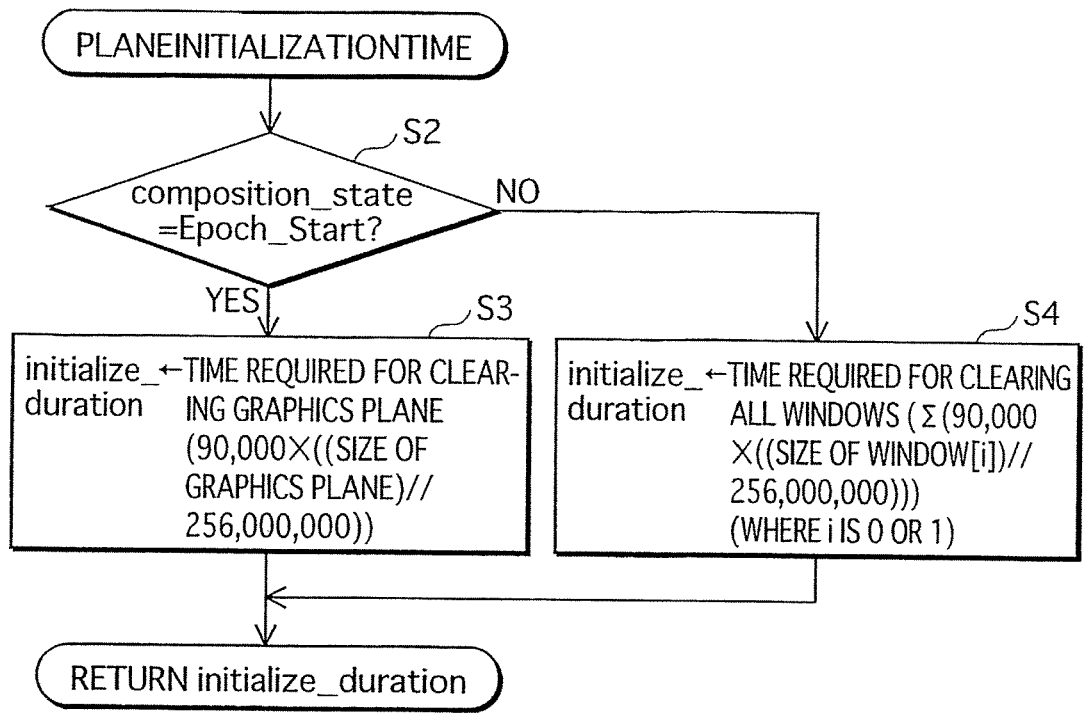
FIGS. 16A and 16B are flowcharts of the algorithm shown in FIG. 14.
Figure 16B:
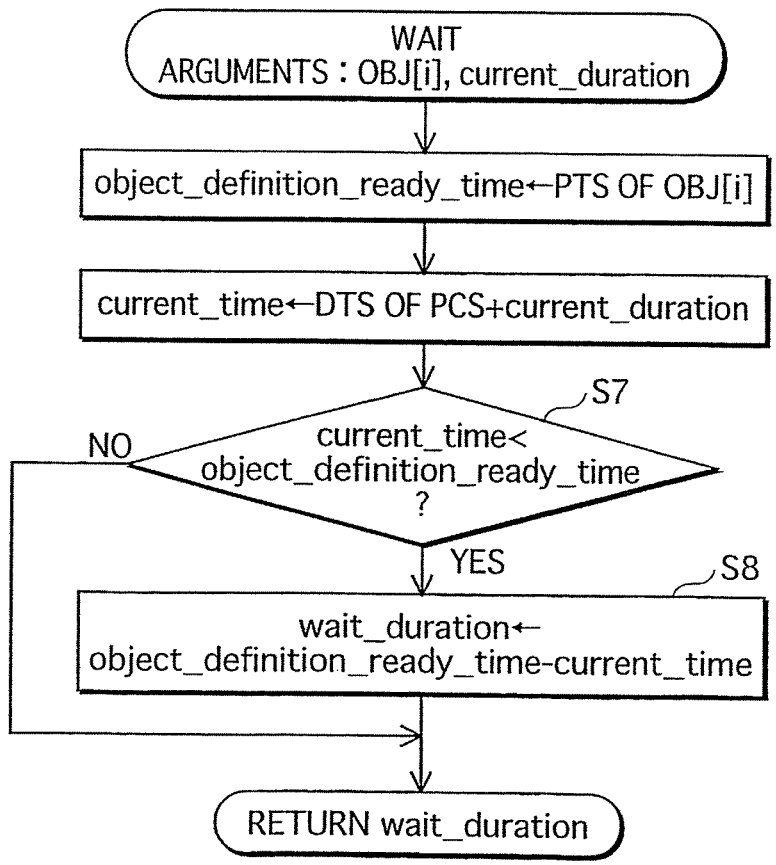

The calculation of DECODEDURATION(DSn) is carried out based on a program shown in FIG. 14. FIG. 15 and FIGS. 16A and 16B are flowcharts showing an algorithm of this program. A procedure of calculating DECODEDURATION (DSn) is explained below, with reference to these drawings. In FIG. 15, a PLANEINITIALIZATIONTIME function is called, and a return value is added to decode_duration (S1). The PLANEINITIALIZATIONTIME function (FIG. 16A) is a function for calculating a time required for initializing the Graphics Plane in order to produce display for DSn. In step S1, this PLANEINITIALIZATIONTIME function is called using DSn, DSn.PCS.OBJ[0], and decode_duration as arguments.

FIG. 16A shows a procedure of the PLANEINITIALIZATIONTIME function. In the drawing, initialize_duration is a variable indicating a return value of the PLANEINITIALIZATIONTIME function.

Step S2 judges whether a composition_state field of the PCS in DSn shows Epoch Start. If the composition_state field shows Epoch Start (S2:YES, DSn.PCS.composition_state==EPOCH_START in FIG. 14), a time required for clearing the Graphics Plane is set as initialize_duration (S3).

Suppose transfer rate Rc from the Object Buffer to the Graphics Plane is 256,000,000 and a total size of the Graphics Plane is (video_width)*(video_height), as mentioned above. Then the time required for clearing the Graphics Plane (in seconds) is (video_width)*(video_height)//256,000,000. This is multiplied by 90,000 Hz, to express in the PTS accuracy. Hence the time required for clearing the Graphics Plane is 90,000×(video_width)*(video_height)//256,000,000. This is added to initialize_duration, which is returned as a return value.

If the composition_state field does not show Epoch Start (S2:NO), an operation of adding a time required for clearing Window[i] to initialize_duration is carried out for all Windows[i] (S4). Suppose transfer rate Rc from the Object Buffer to the Graphics Plane is 256,000,000 as mentioned earlier, and a total size of Windows[i] is ΣSIZE(WDS.WIN[i]). Then a time required for clearing all Windows[i] (in seconds) is ΣSIZE(WDS.WIN[i])//256,000,000. This is multiplied by 90,000 Hz to express in the PTS accuracy. Hence the time required for clearing all Windows[i] is 90,000×ΣSIZE(WDS.WIN[i])//256,000,000. This is added to initialize_duration, which is returned as a return value. This completes the PLANEINITIALIZATIONTIME function.

Referring back to FIG. 15, step S5 judges whether a number of graphics Objects in DSn is 1 or 2 (if(DSn.PCS.num_of_objects==2, if(DSn.PCS.num_of_objects==1 in FIG. 14). If the number of graphics Objects in DSn is 1 (S5:=1), a wait time for decoding that graphics Object to complete is added to decode_duration (S6). The wait time is calculated by calling a WAIT function (decode_duration+=WAIT(DSn, DSn.PCS.OBJ[0], decode_duration) in FIG. 14). The WAIT function is called using DSn, DSn.PCS.OBJ[0], and decode_duration as arguments, and wait_duration showing the wait time is returned as a return value.

FIG. 16B shows a procedure of the WAIT function.

In the WAIT function, current_duration is a variable to which decode_duration is set, and object_definition_ready_time is a variable indicating a PTS of graphics Object OBJ[i] in DSn.

Also, current_time is a variable indicating a sum of current_duration and a DTS of the PCS in DSn. If object_definition_ready_time is greater than current_time (S7:YES, if(current_time<object_definition_ready_time) in FIG. 14), a difference between object_definition_ready_time and current_time is set to wait_duration, which is returned as a return value (S8, wait_duration+=object_definition_ready_time−current_time in FIG. 14). This completes the WAIT function.

Referring back to FIG. 15, a sum of the return value of the WAIT function and a time required for rendering on a Window to which OBJ[0] belongs (90,000*(SIZE(DSn.WDS.WIN[0]))//256,000,000) is set to decode_duration (S9).

The above procedure relates to the case when the number of graphics Objects in DSn is 1. If the number of graphics Objects is 2 (S5:=2), if(DSn.PCS.num_of_objects==2 in FIG. 14), the WAIT function is called using DSn, DSn.PCS.OBJ[0], and decode_duration as arguments, and a return value of the WAIT function is added to decode_duration (S10).

Step S11 judges whether the Window to which OBJ[0] belongs is the same as a Window to which OBJ[L] belongs (if(DSn.PCS.OBJ[0].window_id==DSn.PCS.OBJ[1].window_id in FIG. 14). If the judgment is in the affirmative (S11:YES), the WAIT function is called using DSn, DSn.PCS.OBJ[1], and decode_duration as arguments, and a return value of the WAIT function is added to decode_duration (S12). Furthermore, a time required for rendering on the Window to which OBJ[0] and OBJ[1] belong (90,000*(SIZE(DSn.WDS.OBJ[0].window_id)//256,000,000) is added to decode_duration (S13).

If the judgment is in the negative (S11:NO), on the other hand, the time required for rendering on the Window to which OBJ[0] belongs (90,000*(SIZE(DSn.WDS.OBJ[0].window_id)//256,000,000) is added to decode_duration (S15). After this, the WAIT function is called using DSn, DSn.PCS.OBJ[1], and decode_duration as arguments, and a return value of the WAIT function is added to decode_duration (S16). Furthermore, a time required for rendering on the Window to which OBJ[1] belongs (90,000*(SIZE(DSn.WDS.OBJ[1].window_id)//256,000,000) is added to decode_duration (S17). In this way, DECODEDURATION(DSn) is calculated.

The following explains how a PTS of a PCS in one DS is set, using specific examples.

Figure 17A:
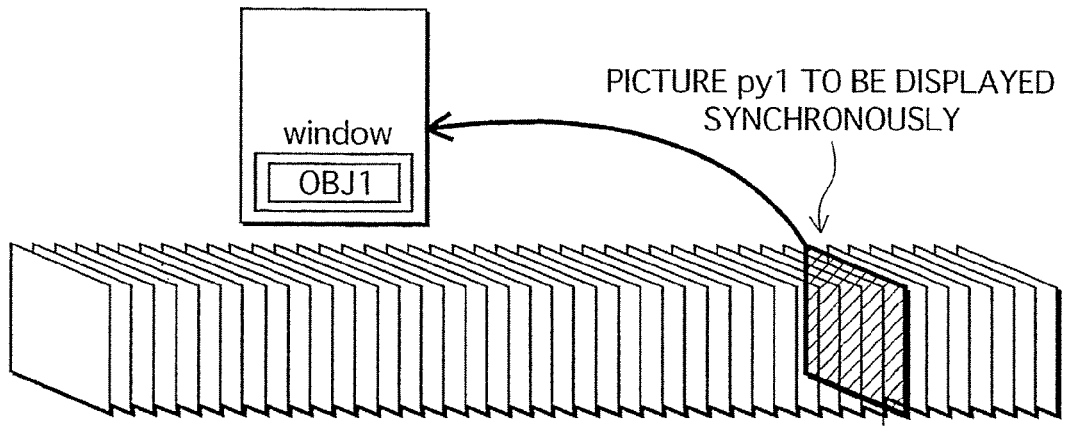
FIG. 17A shows a situation where one graphics Object exists in one Window.
Figure 17B:
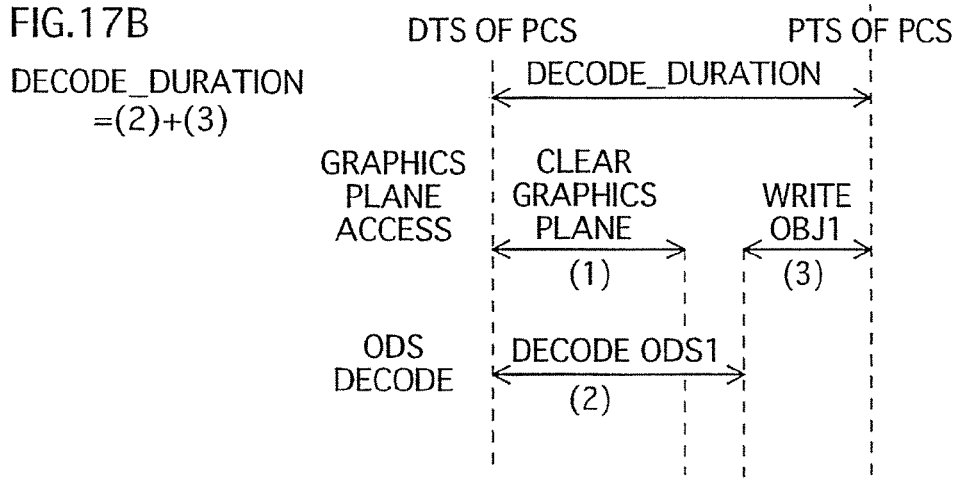
FIGS. 17B and 17C are timing charts showing parameters used in the algorithm shown in FIG. 14.
Figure 17C:
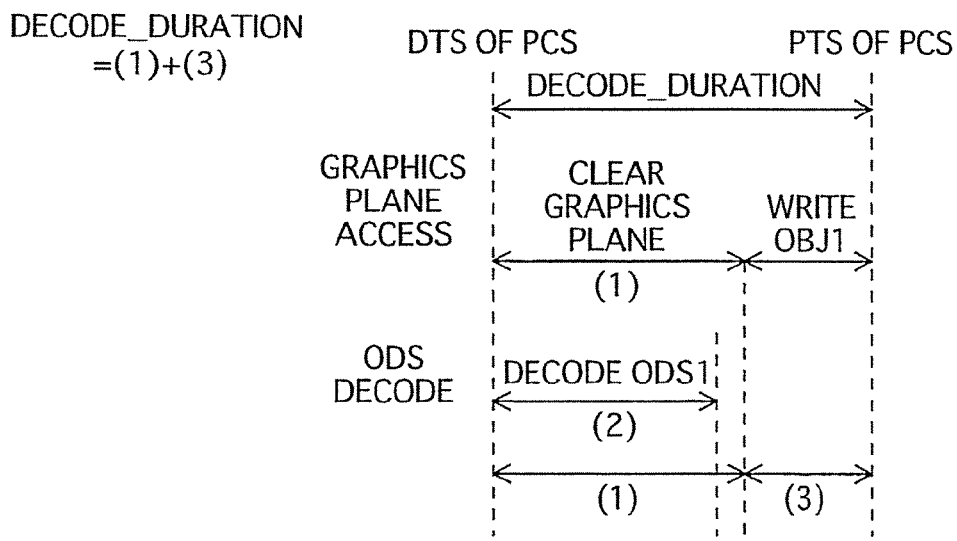

FIG. 17A shows a situation where one OBJ (OBJ1) corresponding to one ODS (ODS1) belongs to one Window. FIGS. 17B and 17C are timing charts showing a relationship between parameters used in FIG. 14. Each of these timing charts has three levels. Of the three levels, the "Graphics Plane access" level and the "ODS decode" level indicate two processes which are performed in parallel when reproducing the ODS. The above algorithm is based on an assumption that these two processes are performed in parallel.

Graphics Plane access is made up of clear period (1) and write period (3). Clear period (1) indicates either a time required for clearing the entire Graphics Plane (90,000×((size of the Graphics Plane)//256,000,000)) or a time required for clearing all Windows on the Graphics Plane (Σ(90,000×((size of Window[1])//256,000,000))).

Write period (3) indicates a time required for rendering on the entire Window (90,000×((size of the Window)//256,000,000)).

ODS decode is made up of decode period (2). Decode period (2) indicates a time period from a DTS to a PTS of ODS1.

Clear period (1), decode period (2), and write period (3) can vary depending on the range to be cleared, the size of an ODS to be decoded, and the size of a graphics Object to be written to the Graphics Plane. In FIG. 17, the beginning of decode period (2) is assumed to be the same as the beginning of clear period (1), for simplicity's sake.

FIG. 17B shows a case where decode period (2) is longer than clear period (1). In this case, decode_duration is a sum of decode period (2) and write period (3).

FIG. 17C shows a case where clear period (1) is longer than decode period (2). In this case, decode_duration is a sum of clear period (1) and write period (3).

Figure 18A:
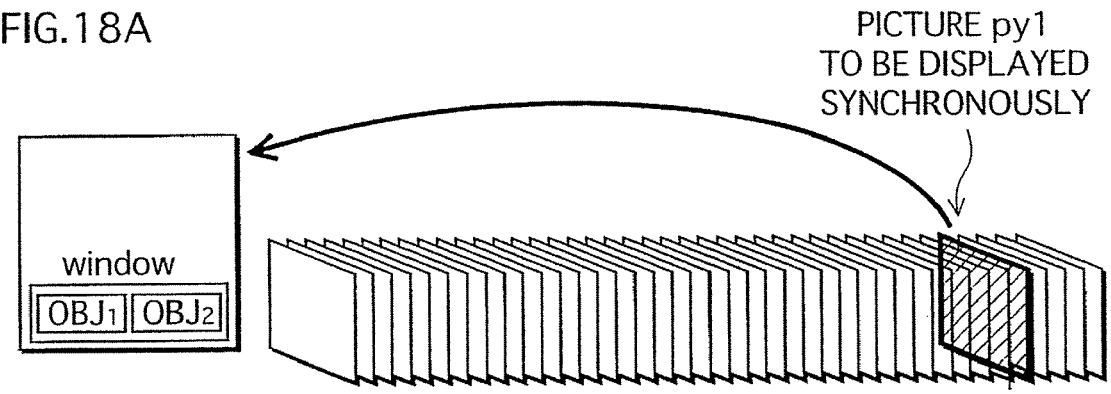
FIG. 18A shows a situation where two graphics Objects exist in one Window.
Figure 18B:
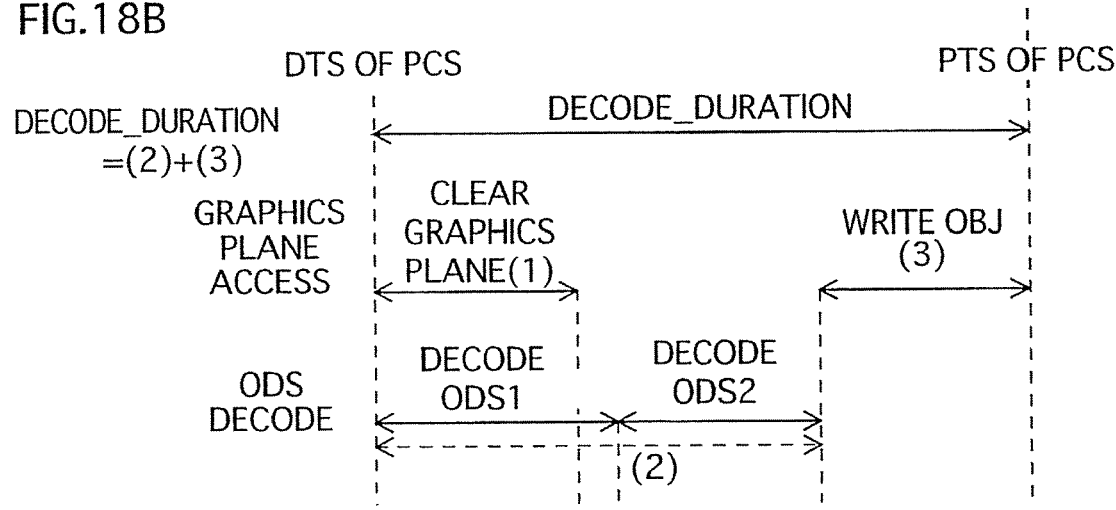
FIGS. 18B and 18C are timing charts showing parameters used in the algorithm shown in FIG. 14.
Figure 18C:
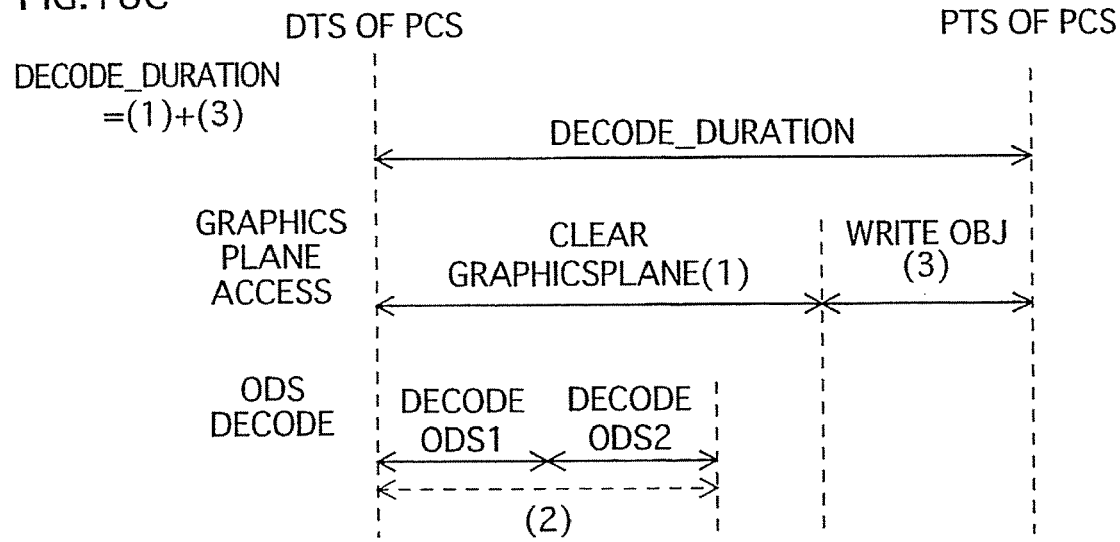

FIGS. 18A to 18C show a situation where two OBJs (OBJ1 and OBJ2) corresponding to two ODSs (ODS1 and ODS2) belong to one Window. In FIGS. 18B and 18C, decode period (2) indicates a total time required for decoding ODS1 and ODS2. Likewise, write period (3) indicates a total time required for writing OBJ1 and OBJ2 to the Graphics Plane. Though the number of ODSs is two, decode_duration can be calculated in the same way as in FIG. 17. In detail, if decode period (2) of ODS1 and ODS2 is longer than clear period (1), decode_duration is a sum of decode period (2) and write period (3) as shown in FIG. 18B.

If clear period (1) is longer than decode period (2), decode_duration is a sum of clear period (1) and write period (3) as shown in FIG. 18C.

FIGS. 19A to 19C show a situation where OBJ1 belongs to Window1 and OBJ2 belongs to Window2. In this case too, if clear period (1) is longer than decode period (2) of ODS1 and ODS2, decode_duration is a sum of clear period (1) and write period (3). If clear period (1) is shorter than decode period (2), on the other hand, OBJ1 can be written to Window1 without waiting for the end of decode period (2). In such a case, decode_duration is not simply a sum of decode period (2) and write period (3). Let write period (31) denote a time required for writing OBJ2 to Window1 and write period (32) denote a time required for writing OBJ2 to Window2. FIG. 19B shows a case where decode period (2) is longer than a sum of clear period (1) and write period (31). In this case, decode_duration is a sum of decode period (2) and write period (32).

FIG. 19C shows a case where a sum of clear period (1) and write period (31) is longer than decode period (2). In this case, decode_duration is a sum of clear period (1), write period (31), and write period (32).

The size of the Graphics Plane is fixed according to a player model. Also, sizes and numbers of Windows and ODSs are set in advance at the time of authoring. Hence decode_duration can be calculated as one of the sum of clear period (1) and write period (3), the sum of decode period (2) and write period (3), the sum of decode period (2) and write period (32), and the sum of clear period (1), write period (31), and write period (32). By setting the PTS of the PCS based on such calculated decode_duration, graphics can be synchronized with picture data with high accuracy. Such accurate synchronous control is achieved by defining Windows and restricting clearing and rendering operations within the Windows. Thus, the introduction of the concept "Window" in authoring is of great significance.

The following explains how a DTS and a PTS of the WDS in DSn are set. The DTS of the WDS is set so as to satisfy the following formula:

$$DTS(DSn[WDS]) \geq DTS(DSn[PCS])$$

The PTS of the WDS specifies a deadline for starting writing to the Graphics Plane. Since writing to the Graphics Plane is restricted to a Window, the time to start writing to the Graphics Plane can be determined by subtracting a time required for rendering on all Windows from the time shown by the PTS of the PCS. Let ΣSIZE(WDS.WIN[i]) be a total size of Windows[i]. Then a time required for clearing and rendering on all Windows[i] is ΣSIZE(WDS.WIN[i])//256,000,000. Expressing this time with the accuracy of 90,000 KHz yields 90,000×ΣSIZE(WDS.WIN[i])//256,000,000.

Accordingly, the PTS of the WDS can be calculated as follows:

$$PTS(DSn[WDS])=PTS(DSn[PCS])-90,000\times\Sigma SIZE(WDS.WIN[i])//256,000,000$$

Since the PTS of the WDS shows the deadline, the writing to the Graphics Plane can be launched earlier than the time shown by this PTS. Which is to say, once decoding of one ODS belonging to one of two Windows has completed, a graphics Object obtained by the decoding can be immediately written to the Window as shown in FIG. 19.

Thus, a Window can be allocated to a desired point on the reproduction time axis of the AV Clip, using the DTS and the PTS of the WDS. This completes the explanation on the DTS and PTS of each of the PCS and the WDS in DSn.

A PCS in each DS is active from a time shown by its DTS to a time shown by its PTS. This time period during which the PCS is active is called an active period of the PCS in the DS.

The following explains how active periods of PCSs in DSs are overlapped. When a graphics stream contains a plurality of DSs, it is desirable to process two or more DSs in parallel. To enable such parallel processing in a reproduction apparatus, active periods of PCSs in DSs need to be overlapped. Meanwhile, the Blu-ray Disc Read-Only Format stipulates that decoding be performed with a reproduction apparatus of a minimum necessary construction.

A decoder model of the Blu-ray Disc Read-Only Format is predicated on pipeline processing (pipelined decoding model). The pipelined decoding model is capable of reading a graphics Object of one DS from the Object Buffer to the Graphics Plane whilst, simultaneously, decoding and writing a graphics Object of the next DS to the Object Buffer.

Figure 20:
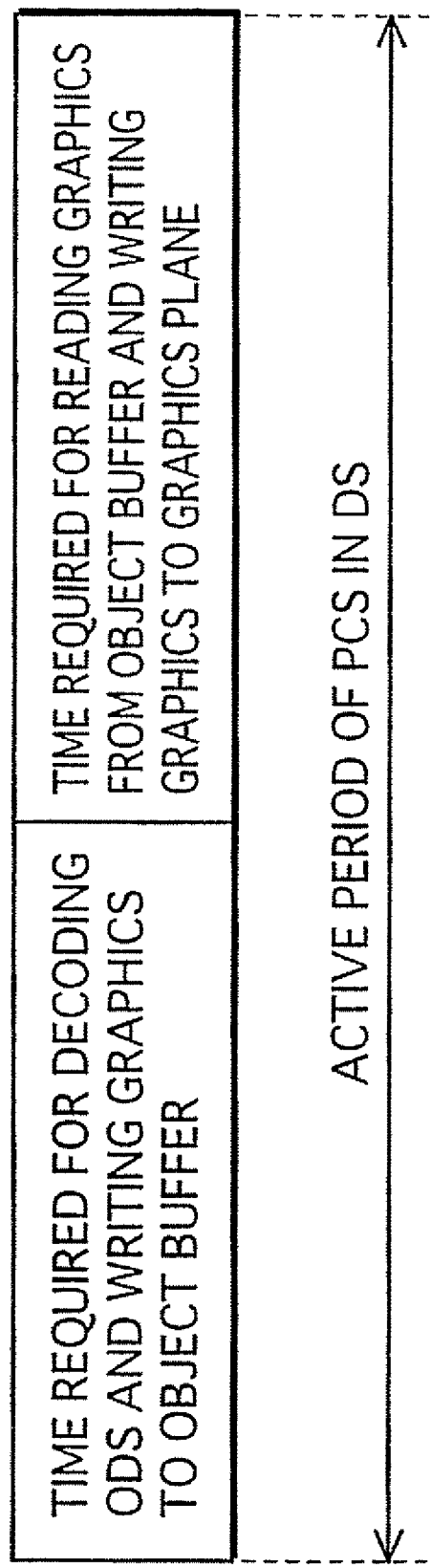
FIG. 20 shows processing contents of one DS.

When a reproduction apparatus follows the pipelined decoding model, introduction intervals need to be determined appropriately. An introduction interval referred to here is a time period from a start of processing of one DS to a start of processing of the next DS. Processing of one DS that involves the Object Buffer can be divided into two processes, i.e. a process of decoding an ODS and writing an uncompressed graphics Object to the Object Buffer and a process of reading the uncompressed graphics Object from the Object Buffer and writing it to the Graphics Plane. This being so, an active period of a PCS in one DS can be broken down as shown in FIG. 20. As shown in the drawing, processing of one DS is made up of a time required for decoding an ODS and writing graphics to the Object Buffer and a time required for reading the graphics from the Object Buffer and writing it to the Graphics Plane.

Figure 21:
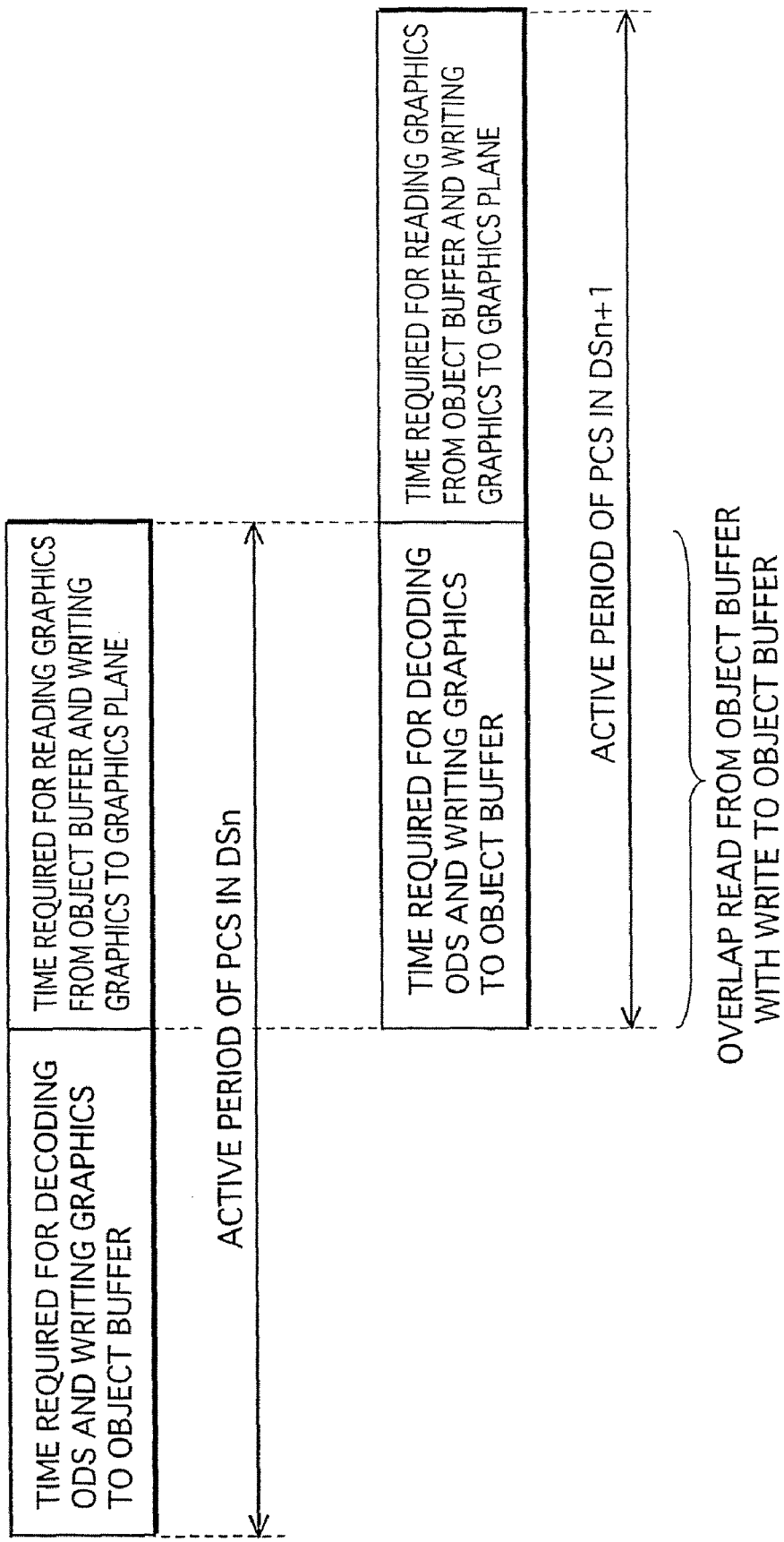
FIG. 21 shows how two DSs are processed in parallel in a pipelined decoder model.

The pipelined decoding model is capable of simultaneously writing graphics to the Object Buffer and reading graphics from the Object Buffer. Accordingly, two DSs can be processed in parallel as shown in FIG. 21. FIG. 21 shows how two DSs (DSn and DSn+1) are processed in parallel in the pipelined decoding model.

As illustrated, DSn and DSn+1 are processed in parallel so that a read time from the Object Buffer for DSn overlaps with a write time to the Object Buffer for DSn+1.

In such parallel processing, a graphics Object of DSn+1 is written to the Object Buffer after writing of a graphics Object of DSn to the Object Buffer is completed.

A decoding end time of an ODS in DSn is shown by a PTS of an END in DSn. Also, an earliest time to start decoding an ODS in DSn+1 is shown by a DTS of a PCS in DSn+1. Therefore, the time stamp of the END in DSn and the time stamp of the PCS in DSn+1 are set in advance so as to satisfy $$PTS(DSn[END])\leq DTS(DSn+1[PCS])$$

By setting an introduction interval in such a way, DSn and DSn+1 can be processed in parallel in the pipelined decoding model.

Figure 22:
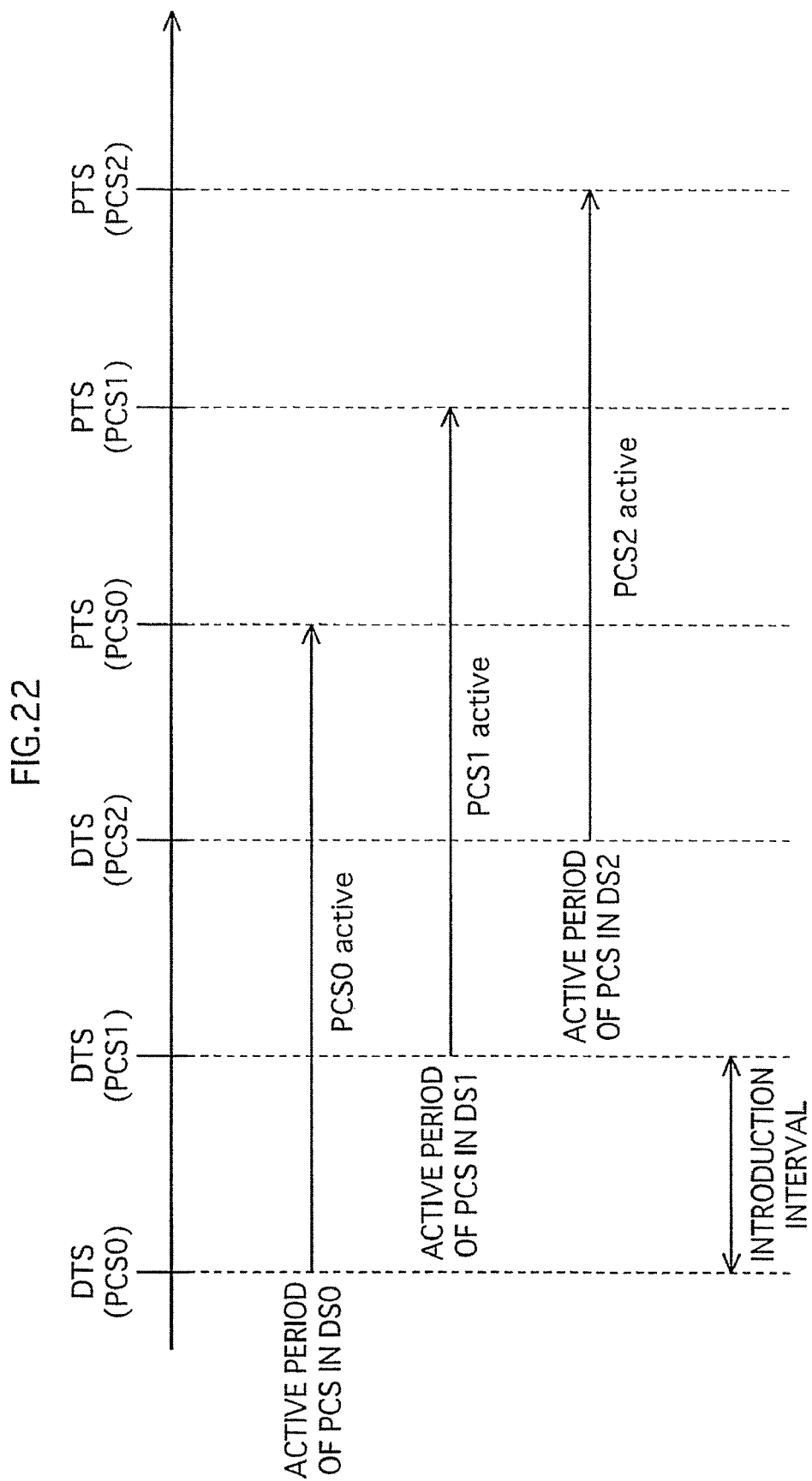
FIG. 22 shows an example of overlapping active periods of PCSs in three DSs.

FIG. 22 shows a case where active periods of PCSs in three DSs (DS0, DS1, and DS2) are overlapped.

Figure 23:
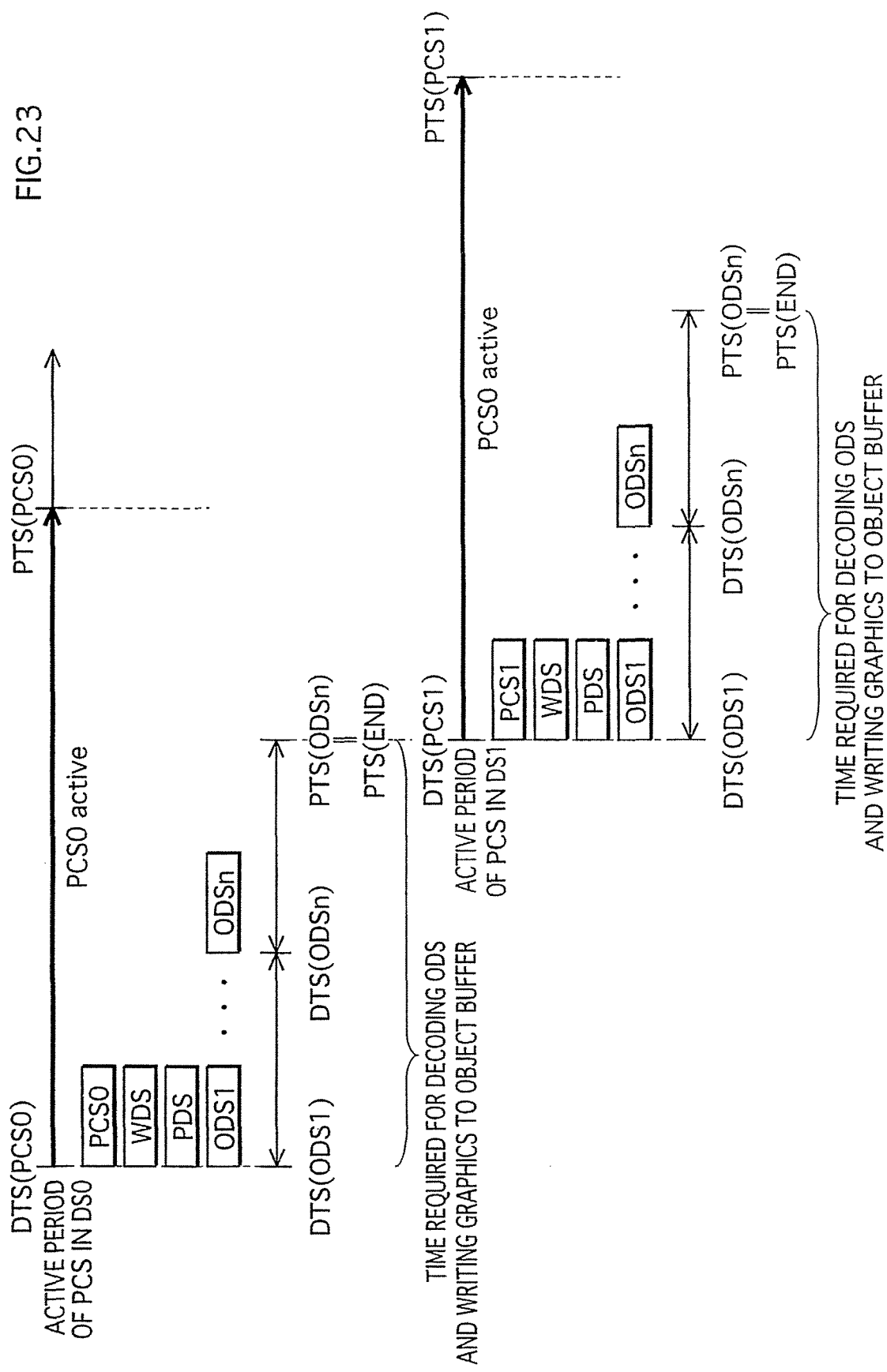
FIG. 23 shows settings of time stamps of functional Segments in each DS.

The following explains how time stamps of functional Segments in overlapping DSs are set on the reproduction time axis. FIG. 23 shows time stamps of functional Segments in each of DS0 and DS1 whose PCSs have overlapping active periods. In the drawing, DTSs of a WDS, a PDS, and a top ODS (ODS1) in DS0 are set to be equal to a DTS of a PCS in DS0. This means decoding of ODSs in DSn starts immediately when an active period of the PCS in DS0 begins. Accordingly, decoding of ODS1 is launched at a time shown by the DTS of the PCS. Meanwhile, decoding of ODSn which is a last ODS in DS0 ends at a time shown by a PTS of an END in DS0. It should be noted here that the DTSs of the WDS, the PDS, and the top ODS in DS0 may instead be set to be later than the DTS of the PCS in DS0.

A DTS of a PCS in DS1 shows a time which is equal to or later than the time shown by the PTS of the END in DS0. Therefore, when decoding of ODSs in DS1 is started at the time shown by the DTS of the PCS in DS1, DS0 and DS1 can be processed in parallel in the pipelined decoding model.

The following examines the process of rendering on the Graphics Plane in such pipeline processing.

When DSn and DSn+1 are processed in parallel, a graphics Object obtained by decoding for DSn and a graphics Object obtained by decoding for DSn+1 may be simultaneously written to the Graphics Plane, which causes a failure to display the graphics Object of DSn on the screen.

Figure 24:
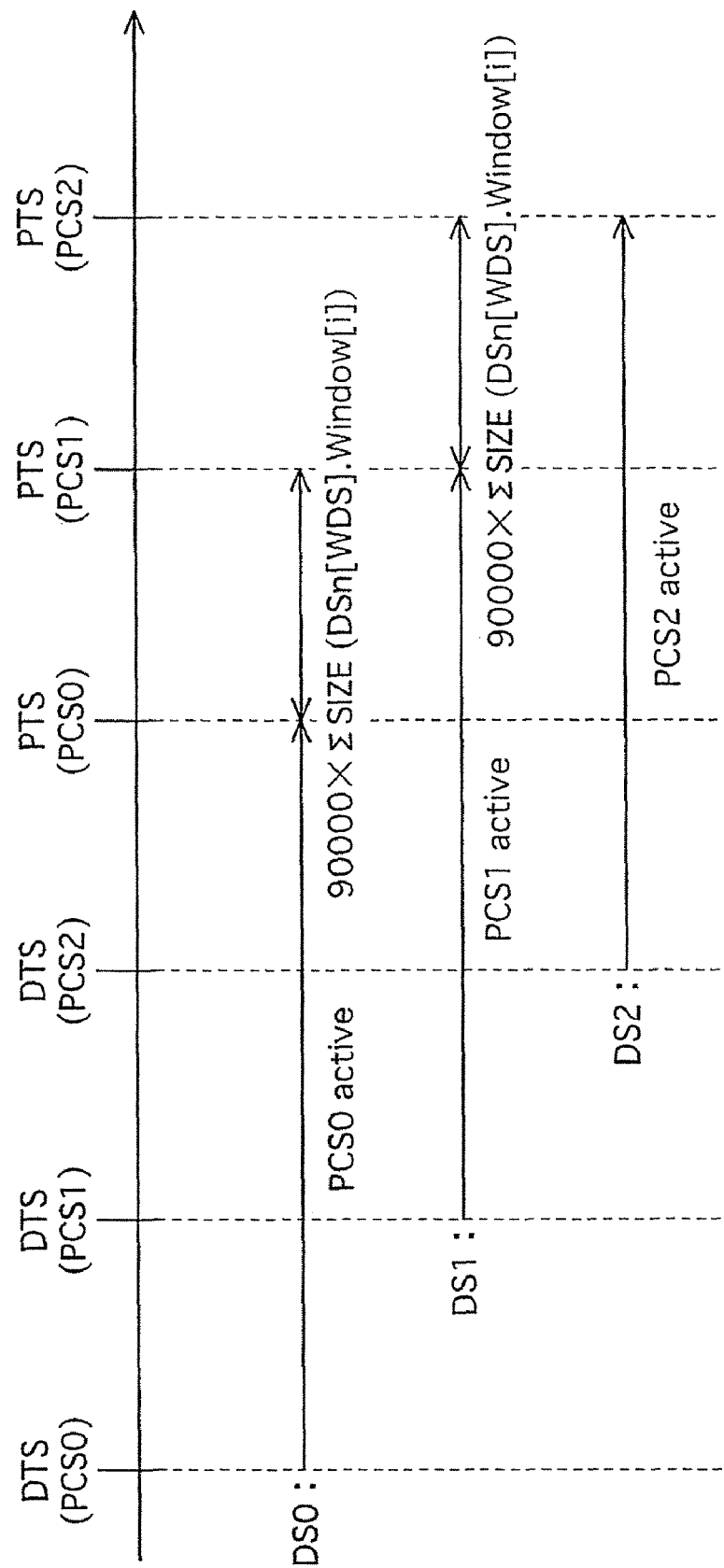
FIG. 24 shows time stamps of a PCS in each DS.

To prevent this, the PTS of the PCS in DSn and the PTS of the PCS in DSn+1 need to be set as follows:

$$PTS(DSn[PCS])+(90,000\times\Sigma SIZE(DSn[WDS].Window[i]))//256,000,000\leq PTS(DSn+1[PCS])$$

where $\Sigma SIZE(DSn[WDS].Window[i])$ is a total size of Windows[i] and $(90,000\times\Sigma SIZE(DSn[WDS].Window[i]))//256,000,000$ is a time required for rendering on Windows[i]. By delaying a display time of the graphics Object of DSn+1 in this way, the graphics Object of DSn+1 is kept from overwriting the graphics Object of DSn. FIG. 24 shows PTSs of PCSs in DS0 to DS2 according to this formula.

When a size of a Window is ¼ of the Graphics Plane, an interval between PTS(DSn[PCS]) and PTS(DSn+1[PCS]) is equivalent to one frame period of the video stream.

The following explains a constraint on overlapping of active periods of PCSs in DSs. If a graphics Object belonging to one DS has the same object_id as a graphics Object belonging to an immediately preceding DS so as to effect an update, active periods of PCSs in these DSs cannot be overlapped. Suppose DS0 includes an ODS having object_id=1, and DS1 includes an ODS having the same object_id=1.

If active periods of PCSs in such DS0 and DS1 overlap, the ODS in DS1 is loaded to the reproduction apparatus 200 and decoded before the end of DS0. In this case, a graphics Object of DS0 is overwritten by a graphics Object of DS1. This causes the graphics Object of DS1 to appear on the screen instead of the graphics Object of DS0. To prevent this, overlapping of active periods of PCSs in DSs is prohibited in the case of a graphics update.

FIG. 25A shows a case where two DSs can be processed in a pipeline, whereas FIG. 25B shows a case where two DSs cannot be processed in a pipeline. In these drawings, DS0 has ODSA and ODSB, whilst DS1 has ODSC and ODSD. If ODSC and ODSD in DS1 have different object_ids from ODSA and ODSB in DS0, active periods of PCSs in DS0 and DS1 can be overlapped as shown in FIG. 25A. If ODSC and ODSD in DS1 have the same object_ids as ODSA and ODSB in DS0, on the other hand, the active periods of the PCSs in DS0 and DS1 cannot be overlapped as shown in FIG. 25B.

This constraint can be overcome by the following method of "transfer acceleration". For example, when DS0 contains ODSA having object_id=1 and DS1 contains ODSC for updating a graphics Object of the ODSA in DS0, the ODSC in DS1 is initially given a different object_id from object_id=1. Only after a graphics Object of ODSC in DS1 has been stored in the Object Buffer, the object_id of the ODSC is changed to object_id=1, to overwrite the graphics Object of ODSA in DS0. According to this method, the above constraint can be overcome. Which is to say, a graphics Object for updating a previous graphics Object in the Object Buffer can be loaded into the Object Buffer, without waiting for the previous graphics Object to be displayed.

Since the above method can be used in graphics updates, one DS may often carry not only ODSs referenced by its own PCS but also ODSs referenced by a PCS of a succeeding DS. In such a case, it is necessary to indicate, to the reproduction apparatus 200, which ODSs belong to the DS. To do so, an END is placed after all ODSs carried in he DS itself. The reproduction apparatus 200 refers to the END in the DS, to detect the end of the ODSs belonging to the DS.

Figure 26:
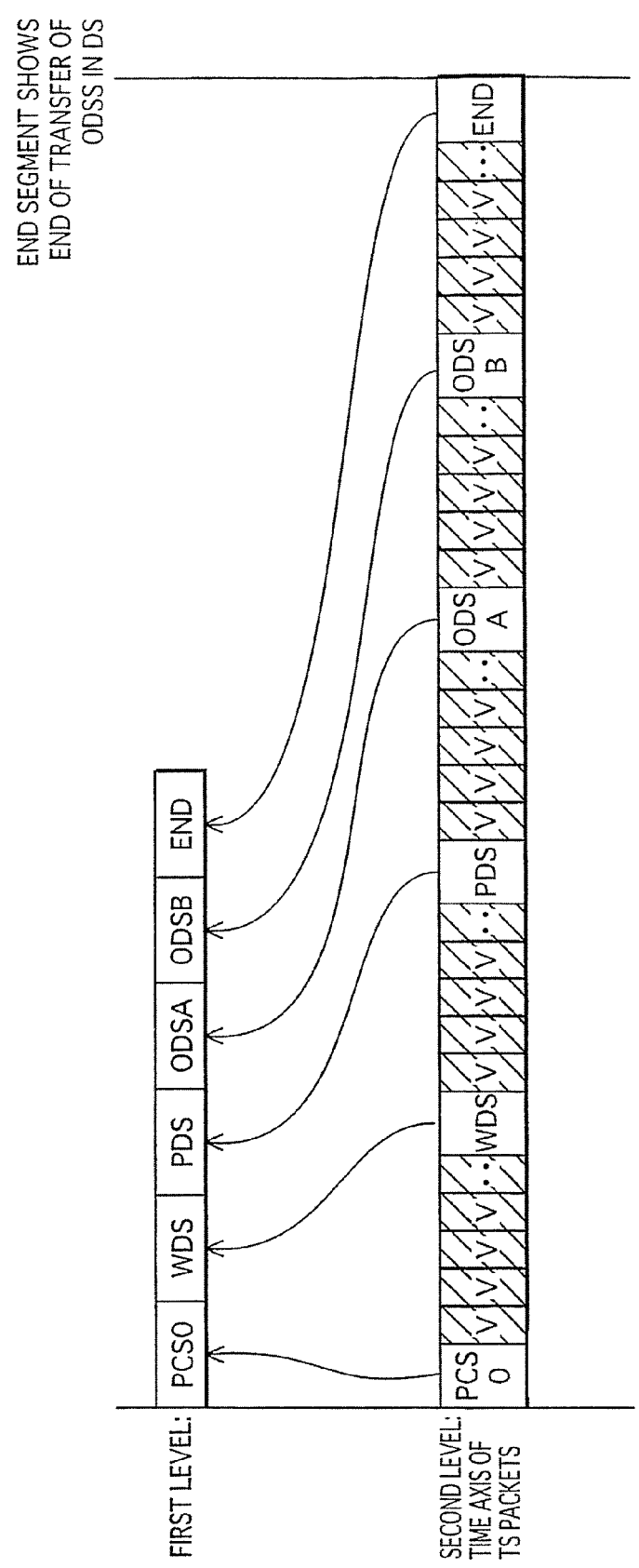
FIG. 26 shows an END Segment which indicates completion of transfer.

FIG. 26 shows an end of transfer of ODSs indicated by an END. In the drawing, the first level shows functional Segments belonging to one DS, and the second level shows an arrangement of these functional Segments on the BD-ROM 100. The functional Segments such as a PCS, a WDS, a PDS, and ODSs are converted to TS packets and recorded on the BD-ROM 100 together with a video stream which is equally converted to TS packets.

Each of the TS packets corresponding to the functional Segments and the TS packets corresponding to the video stream is given time stamps called an ATS and a PCS. The TS packets corresponding to the functional Segments and the TS packets corresponding to the video stream are arranged on the BD-ROM 100 so that TS packets having the same time stamps adjoin to each other.

This means the PCS, the WDS, and the PDS belonging to the DS are not consecutive on the BD-ROM 100, as TS packets corresponding to the video stream (indicated by the letter V in the drawing) are interposed therebetween. Hence the functional Segments appear on the BD-ROM 100 at intervals. When the TS packets corresponding to the functional Segments appear on the BD-ROM 100 at intervals, it is difficult to immediately detect up to which TS packets belong to the DS. Also, the DS may include ODSs not referenced by the PCS of the DS, which makes the detection more difficult. In this embodiment, however, an END is provided after the last ODS belonging to the DS. Accordingly, even when the functional Segments belonging to the DS appear at intervals, it is easy to detect up to which ODSs belong to the DS.

FIG. 27 shows a relationship between active period overlapping and object_id assignment. FIG. 27A shows four DSs (DS0, DS1, DS2, and DS3). A PCS of DS0 does not describe display of any graphics Object. A PCS of DS1 describes display of Objects X and Y on the screen, a PCS of DS2 describes display of Objects A, Y, and C on the screen, and a PCS of DS3 describes display of Object D on the screen.

FIG. 27B shows ODSs belonging to the DSs and active periods of the PCSs in the DSs. DS0 contains an ODS of Object X. DS1 contains an ODS of Object Y. DS2 contains ODSs of Objects A, B, and C. DS3 contains an ODS of Object D. Inconsistency between displayed graphics Objects and transferred ODSs in each of the four DSs is attributable to the above transfer acceleration. The active periods of the PCSs in these DSs are partially overlapped. FIG. 27C shows an arrangement of the graphics Objects in the Object Buffer.

Suppose object_ids 0, 1, 2, 3, and 4 are assigned to Objects X, Y, A, B, and C respectively. This being the case, Object D belonging to DS3 can be assigned any of the object_ids 5, 3, and 0.

The object_id 5 is possible since this object_id is unassigned in DS0 to DS2.

The object_id 3 is possible since Object B having this object_id is included in DS2 but is not referenced by a PCS of any DS.

The object_id 0 is possible since Object X having this object_id is displayed in DS1. So long as the active period of the PCS in DS1 has already ended, a problem of displaying Object D instead of Object X will not occur.

Conversely, it is impossible to assign any of the object_ids 1, 2, and 4 to Object D. If any of such object_ids is assigned to Object D, Object D will end up being displayed instead of any of three Objects A, Y, and C which are to be displayed in DS2.

Thus, Object D can be assigned the same object_id as an Object which is not referenced in an active period of a PCS in a DS that overlaps with the active period of the PCS in DS3 or an Object which is referenced by a PCS of a DS whose active period has already ended.

Overlapping of the active periods of PCSs in DSn and DSn+1 is based on a precondition that DSn and DSn+1 belong to the same Epoch in the graphics stream. If DSn and DSn+1 belong to different Epochs, the active periods of the PCSs in DSn and DSn+1 cannot be overlapped. This is because if the PCS or ODS of DSn+1 is loaded before the active period of the PCS in DSn ends, it becomes impossible to flush the Object Buffer and the Graphics Plane at the end of the active period of the PCS in DSn.

When DSn is a last DS of EPOCHm (hereafter "EPOCHm DSlast[PCS]") and DSn+1 is a top DS of EPOCHm+1 (hereafter "EPOCHm+1 DSfirst[PCS]"), PTSs of the PCSs of DSn and DSn+1 need to satisfy the following formula:

$$PTS(EPOCHm\ DSlast[PCS]) \leq DTS(EPOCHm+1\ DSfirst[PCS])$$

Also, overlapping of the active periods of the PCSs in DSn and DSn+1 is based on a precondition that the graphics stream is a Presentation graphics stream. There are two types of graphics streams: a Presentation graphics stream; and an Interactive graphics stream which is mainly intended to produce interactive displays.

If DSn and DSn+1 belong to an Interactive graphics stream, overlapping of DSn and DSn+1 is prohibited. In an Interactive graphics stream, a Segment carrying control information is called an Interactive Composition Segment (ICS). This being so, time information of DSn and DSn+1 need be set so that the active period of an ICS in DSn+1 starts immediately after the active period of an ICS in DSn. The end of the active period of the ICS in DSn is shown by a PTS of the ICS in DSn, and the beginning of the active period of the ICS in DSn+1 is shown by a DTS of the ICS in DSn+1. Here, PTS(DSn[ICS]) and DTS(DSn+1[ICS]) need to satisfy the following formula:

$$PTS(DSn[ICS]) \leq DTS(DSn+1[ICS])$$

This completes the explanation on overlapping of active periods of PCSs in DSs.

Note that the data structures of DSs (PCS, WDS, PDS, and ODS) explained above are instances of class structures written in a programming language. The author writes the class structures according to the syntax defined in the Blu-ray Disc Read-Only Format, to create these data structures on the BD-ROM 100.

Figure 28:
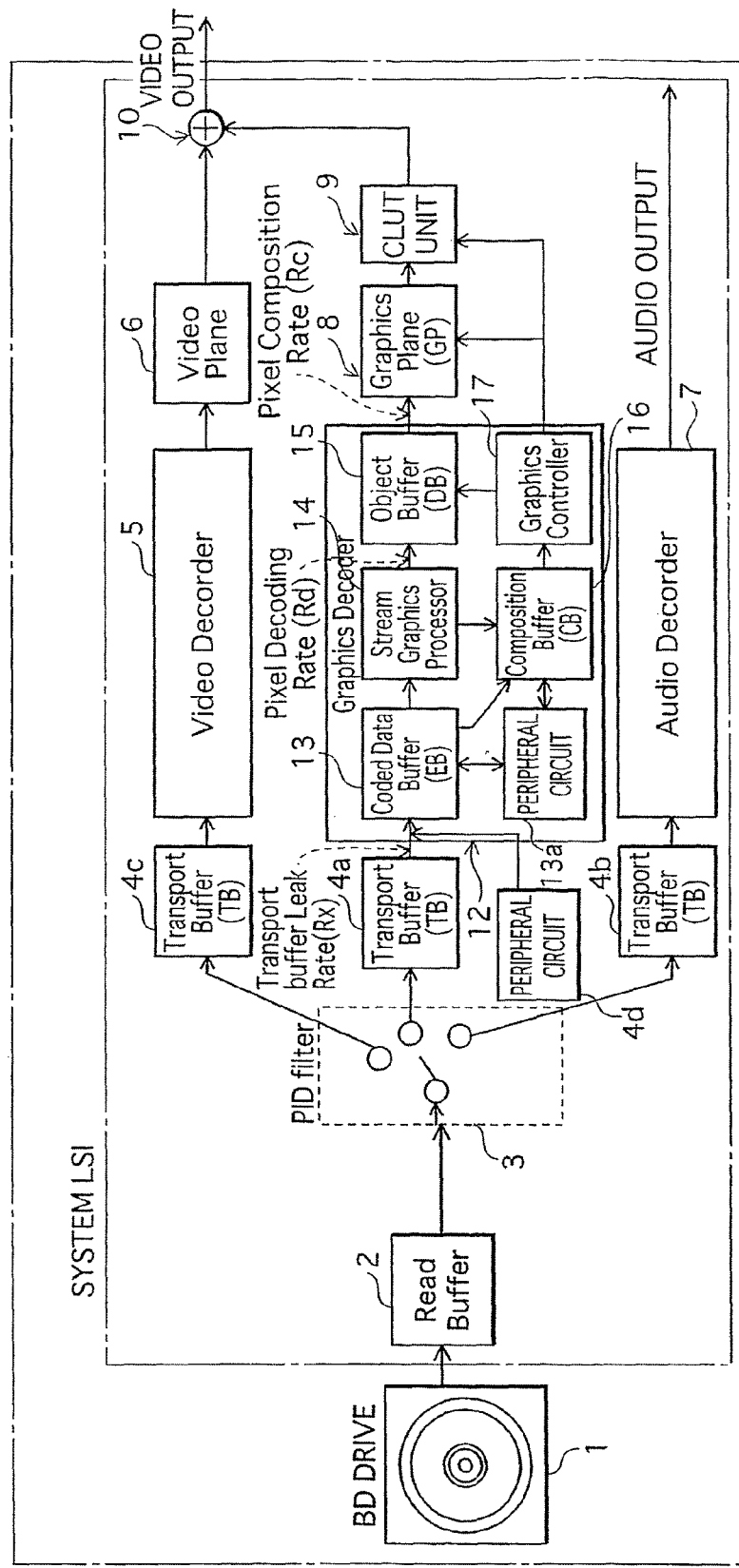
FIG. 28 shows an internal construction of a reproduction apparatus to which the embodiments of the present invention relate.

This completes the explanation on the recording medium according to the first embodiment of the present invention. The following explains a reproduction apparatus according to the first embodiment of the present invention. FIG. 28 shows an internal construction of the reproduction apparatus 200. The reproduction apparatus 200 is manufactured based on this internal construction. The reproduction apparatus 200 is roughly made up of three parts that are a system LSI, a drive device, and a microcomputer system. The reproduction apparatus 200 can be manufactured by mounting these parts on a cabinet and substrate of the apparatus. The system LSI is an integrated circuit including various processing units for achieving the functions of the reproduction apparatus 200. The reproduction apparatus 200 includes a BD drive 1, a Read Buffer 2, a PID filter 3, Transport Buffers 4a, 4b, and 4c, a peripheral circuit 4d, a Video Decoder 5, a Video Plane 6, an Audio Decoder 7, a Graphics Plane 8, a CLUT unit 9, an adder 10, and a Graphics Decoder 12. The Graphics Decoder 12 includes a Coded Data Buffer 13, a peripheral circuit 13a, a Stream Graphics Processor 14, an Object Buffer 15, a Composition Buffer 16, and a Graphics Controller 17.

The BD drive 1 performs loading, reading, and ejecting of the BD-ROM 100. The BD drive 1 accesses to the BD-ROM 100.

The Read Buffer 2 is a FIFO (first-in first-out) memory. Accordingly, TS packets read from the BD-ROM 100 are removed from the Read Buffer 2 in the same order as they arrive.

The PID filter 3 performs filtering on TS packets output from the Read Buffer 2. In more detail, the PID filter 3 passes only TS packets having predetermined PIDs to the Transport Buffers 4a, 4b, and 4c. There is no buffering inside the PID filter 3. Accordingly, TS packets entering the PID filter 3 are instantaneously written to the Transport Buffers 4a, 4b, and 4c.

The Transport Buffers 4a, 4b, and 4c are FIFO memories for storing TS packets output from the PID filter 3. A speed at which a TS packet is read from the Transport Buffer 4a is denoted by transfer rate Rx.

The peripheral circuit 4d has a wired logic for converting TS packets read from the Transport Buffer 4a to functional Segments. The functional Segments are then stored in the Coded Data Buffer 13.

The Video Decoder 5 decodes TS packets output from the PID filter 3 to obtain uncompressed pictures, and writes then to the Video Plane 6.

The Video Plane 6 is a plane memory for a moving picture.

The Audio Decoder 7 decodes TS packets output from the PID filter 3, and outputs uncompressed audio data.

The Graphics Plane 8 is a plane memory having a memory area of one screen, and is capable of storing uncompressed graphics of one screen.

The CLUT unit 9 converts index colors of the uncompressed graphics on the Graphics Plane 8, based on Y, Cr, and Cb values shown in a PDS.

The adder 10 multiplies the uncompressed graphics converted by the CLUT unit 9, by a T value (transparency) shown in the PDS. The adder 10 then performs addition for corresponding pixels in the resulting uncompressed graphics and the uncompressed picture data on the Video Plane 6, and outputs a resultant image.

The Graphics Decoder 12 decodes a graphics stream to obtain uncompressed graphics, and writes the uncompressed graphics to the Graphics Plane 8 as graphics Objects. As a result of decoding the graphics stream, subtitles and menus appear on the screen.

This Graphics Decoder 12 executes pipeline processing, by reading a graphics Object belonging to DSn from the Object Buffer 15 whilst simultaneously writing a graphics Object belonging to DSn+1 to the Object Buffer 15.

The Graphics Decoder 12 includes the Coded Data Buffer 13, the peripheral circuit 13a, the Stream Graphics Processor 14, the Object Buffer 15, the Composition Buffer 16, and the Graphics Controller 17.

The Coded Data Buffer 13 is used for storing functional Segments together with DTSs and PTSs. Such functional Segments are obtained by removing a TS packet header and a PES packet header from each TS packet stored in the Transport Buffer 4a and arranging remaining payloads in sequence. DTSs and PTSs contained in the removed TS packet headers and PES packet headers are stored in the Coded Data Buffer 13 in correspondence with the functional Segments.

The peripheral circuit 13a has a wired logic for transferring data from the Coded Data Buffer 13 to the Stream Graphics Processor 14 and transferring data from the Coded Data Buffer 13 to the Composition Buffer 16. In more detail, when the current time reaches a DTS of an ODS, the peripheral circuit 13a transfers the ODS from the Coded Data Buffer 13 to the Stream Graphics Processor 14. Also, when the current time reaches a DTS of a PCS or a PDS, the peripheral circuit 13a transfers the PCS or the PDS from the Coded Data Buffer 13 to the Composition Buffer 16.

The Stream Graphics Processor 14 decodes the ODS to obtain uncompressed graphics having index colors, and transfers the uncompressed graphics to the Object Buffer 15 as a graphics Object. The decoding by the Stream Graphics Processor 14 is instantaneous, and the graphics Object obtained by the decoding is temporarily stored in the Stream Graphics Processor 14. Though the decoding by the Stream Graphics Processor 14 is instantaneous, the transfer of the graphics Object from the Stream Graphics Processor 14 to the Object Buffer 15 is not instantaneous. This is because transfer to the Object Buffer 15 is performed at a transfer rate of 128 Mbps in the player model of the Blu-ray Disc Read-Only Format. An end of transfer of all graphics Objects belonging to a DS to the Object Buffer 15 is shown by a PTS of an END in the DS. Therefore, processing of the next DS will not be started until the time shown by the PTS of the END. Transfer of a graphics Object obtained by decoding each ODS to the Object Buffer 15 starts at a time shown by a DTS of the ODS and ends at a time shown by a PTS of the ODS.

If a graphics Object of DSn and a graphics Object of DSn+1 have different object_ids, the Stream Graphics Processor 14 writes the two graphics Objects in different storage areas of the Object Buffer 15. This allows pipeline presentation of the graphics Objects, without the graphics Object of DSn being overwritten by the graphics Object of DSn+1. If the graphics Object of DSn and the graphics Object of DSn+1 have the same object_id, on the other hand, the Stream Graphics Processor 14 writes the graphics Object of DSn+1 to a storage area in the Object Buffer 15 in which the graphics Object of DSn is stored, so as to overwrite the graphics Object of DSn. In this case, pipeline processing is not performed. Also, a DS may include ODSs which are referenced by a PCS of the DS and ODSs which are not referenced by the PCS. The Stream Graphics Processor 14 sequentially decodes not only the ODSs referenced by the PCS but also the ODSs not referenced by the PCS, and stores graphics obtained by the decoding to the Object Buffer 15.

The Object Buffer 15 corresponds to a pixel buffer in ETSI EN 300 743. Graphics Objects decoded by the Stream Graphics Processor 14 are stored in the Object Buffer 15. A size of the Object Buffer 15 needs to be twice or four times as large as that of the Graphics Plane 8. This is because the Object Buffer 15 needs to be capable of storing twice or four times as much graphics as the Graphics Plane 8 in order to achieve scrolling.

The Composition Buffer 16 is used for storing a PCS and a PDS. When active periods of PCSs in DSn and DSn+1 overlap, the Composition Buffer 16 stores the PCSs of both DSn and DSn+1.

The Graphics Controller 17 decodes the PCSs in the Composition Buffer 16. Based on a decoding result, the Graphics Controller 17 writes a graphics Object of DSn+1 to the Object Buffer 15, while reading a graphics Object of DSn from the Object Buffer 15 and presenting it for display. The presentation by the Graphics Controller 17 is performed at a time shown by a PTS of the PCS in DSn. An interval between the presentation of the graphics Object of DSn and the presentation of the graphics Object of DSn+1 by the Graphics Controller 17 is as described above.

Figure 29:
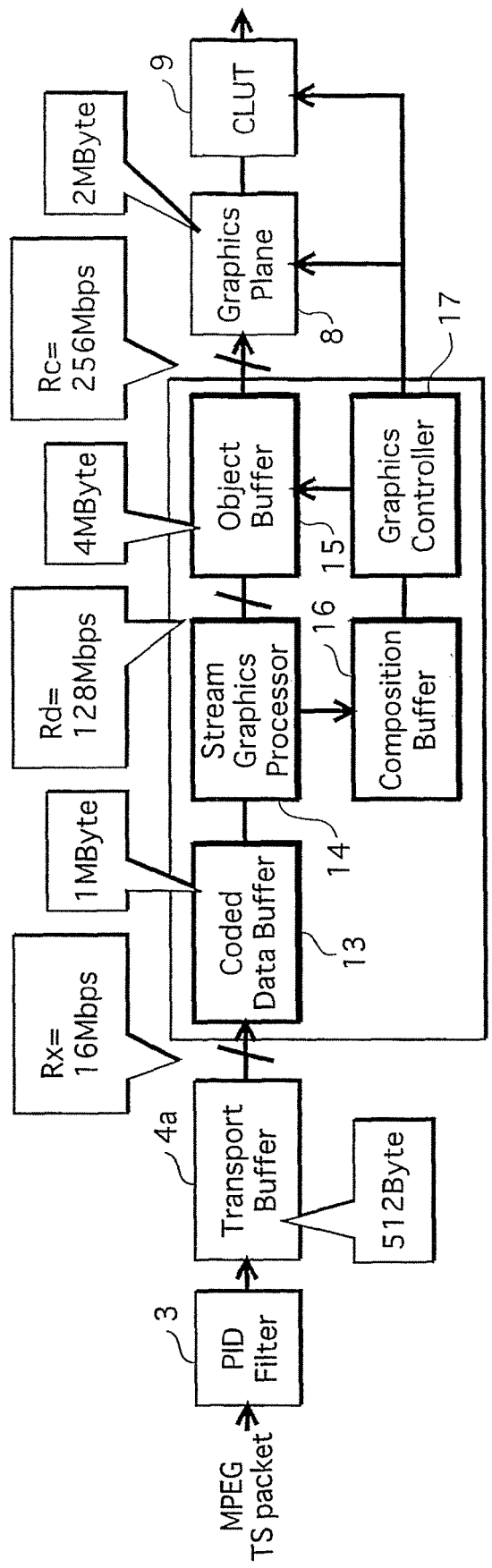
FIG. 29 shows transfer rates Rx, Rc, and Rd and sizes of a Graphics Plane, a Coded Data Buffer, and an Object Buffer shown in FIG. 28.

Recommended transfer rates and buffer sizes for realizing the PID filter 3, the Transport Buffers 4a, 4b, and 4c, the Graphics Plane 8, the CLUT unit 9, the Coded Data Buffer 13, the Stream Graphics Processor 14, the Object Buffer 15, the Composition Buffer 16, and the Graphics Controller 17 are given below. FIG. 29 shows transfer rates Rx, Rc, and Rd and sizes of the Graphics Plane 8, the Transport Buffer 4a, the Coded Data Buffer 13, and the Object Buffer 15.

Transfer rate Rc (Pixel Composition Rate) from the Object Buffer 15 to the Graphics Plane 8 is a highest transfer rate in the reproduction apparatus 200, and is calculated as 256 Mbps (=500 Kbytes×29.97×2) from a Window size and a frame rate.

Transfer rate Rd (Pixel Decoding Rate) from the Stream Graphics Processor 14 to the Object Buffer 15 does not need to coincide with the frame rate unlike Rc, and may be ½ or ¼ of Rc. Therefore, transfer rate Rd is 128 Mbps or 64 Mbps.

Transfer rate Rx (Transport Buffer Leak Rate) from the Transport Buffer 4a to the Coded Data Buffer 13 is a transfer rate of ODSs in a compressed state. Accordingly, transfer rate Rx can be calculated by multiplexing Rd by a compression rate of ODSs. For example, when the compression rate is 25%, transfer rate Rx is 16 Mbps (=64 Mbps×25%).

These transfer rates and buffer sizes are merely shown as minimum standards, and transfer rates and buffer sizes greater than those shown in FIG. 29 are equally applicable.

In the above constructed reproduction apparatus 200, the construction elements perform processing in a pipeline.

Figure 30:
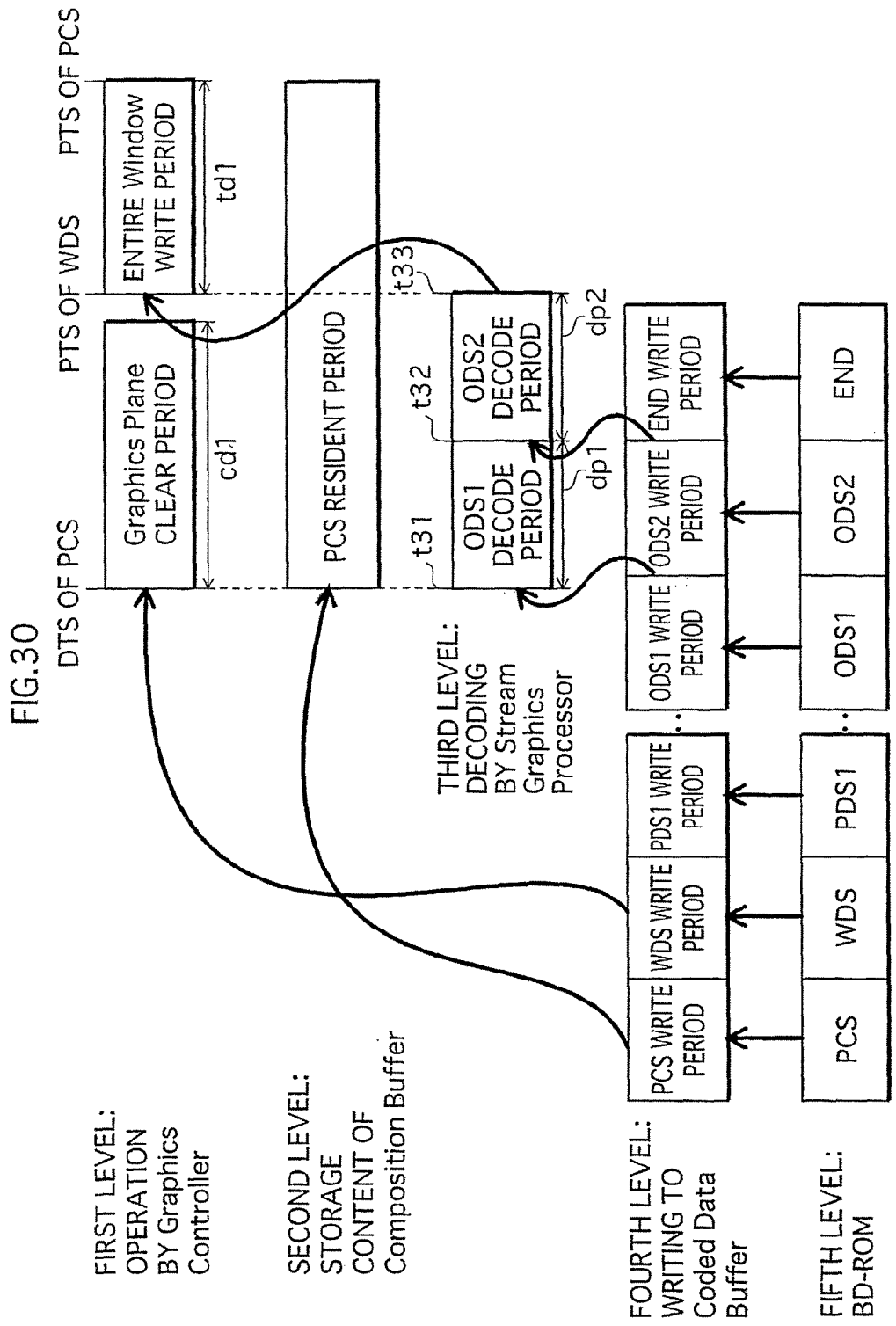
FIG. 30 is a timing chart of pipeline processing in the reproduction apparatus.

FIG. 30 is a timing chart showing pipeline processing performed in the reproduction apparatus 200. In the drawing, the fifth level shows a DS on the BD-ROM 100. The fourth level shows write periods of a PCS, a WDS, a PDS, ODSs, and an END to the Coded Data Buffer 13. The third level shows decode periods of the ODSs by the Stream Graphics Processor 14. The second level shows storage contents of the Composition Buffer 16. The first level shows operations of the Graphics Controller 17.

DTSs of ODS1 and ODS2 show t31 and t32 respectively. Therefore, ODS1 and ODS2 need to be buffered in the Coded Data Buffer 13 by t31 and t32 respectively. This being so, writing of ODS1 to the Coded Data Buffer 13 is completed by t31 at which decode period dp1 begins, and writing of ODS2 to the Coded Data Buffer 13 is completed by t32 at which decode period dp2 begins.

Meanwhile, PTSs of ODS1 and ODS2 show t32 and t33 respectively. Accordingly, decoding of ODS1 by the Stream Graphics Processor 14 is completed by t32, and decoding of ODS2 by the Stream Graphics Processor 14 is completed by t33. Thus, an ODS is buffered in the Coded Data Buffer 13 by a time shown by a DTS of the ODS, and the buffered ODS is decoded and transferred to the Object Buffer 15 by a time shown by a PTS of the ODS.

On the first level, cd1 denotes a time period needed for the Graphics Controller 17 to clear the Graphics Plane 8, and td1 denotes a time period needed for the Graphics Controller 17 to write graphics obtained in the Object Buffer 15 to the Graphics Plane 8. A PTS of the WDS shows a deadline for starting writing the graphics. A PTS of the PCS shows a time at which the writing of the graphics to the Graphics Plane 8 ends and the written graphics is presented for display. Therefore, uncompressed graphics of one screen is obtained on the Graphics Plane 8 at the time shown by the PTS of the PCS. The CLUT unit 9 performs color conversion on the uncompressed graphics, and the adder 10 overlays the graphics on an uncompressed picture stored on the Video Plane 6. This produces a resultant image.

In the Graphics Decoder 12, the Stream Graphics Processor 14 continues decoding while the Graphics Controller 17 is clearing the Graphics Plane 8. As a result of such pipeline processing, graphics can be displayed speedily.

Figure 31:
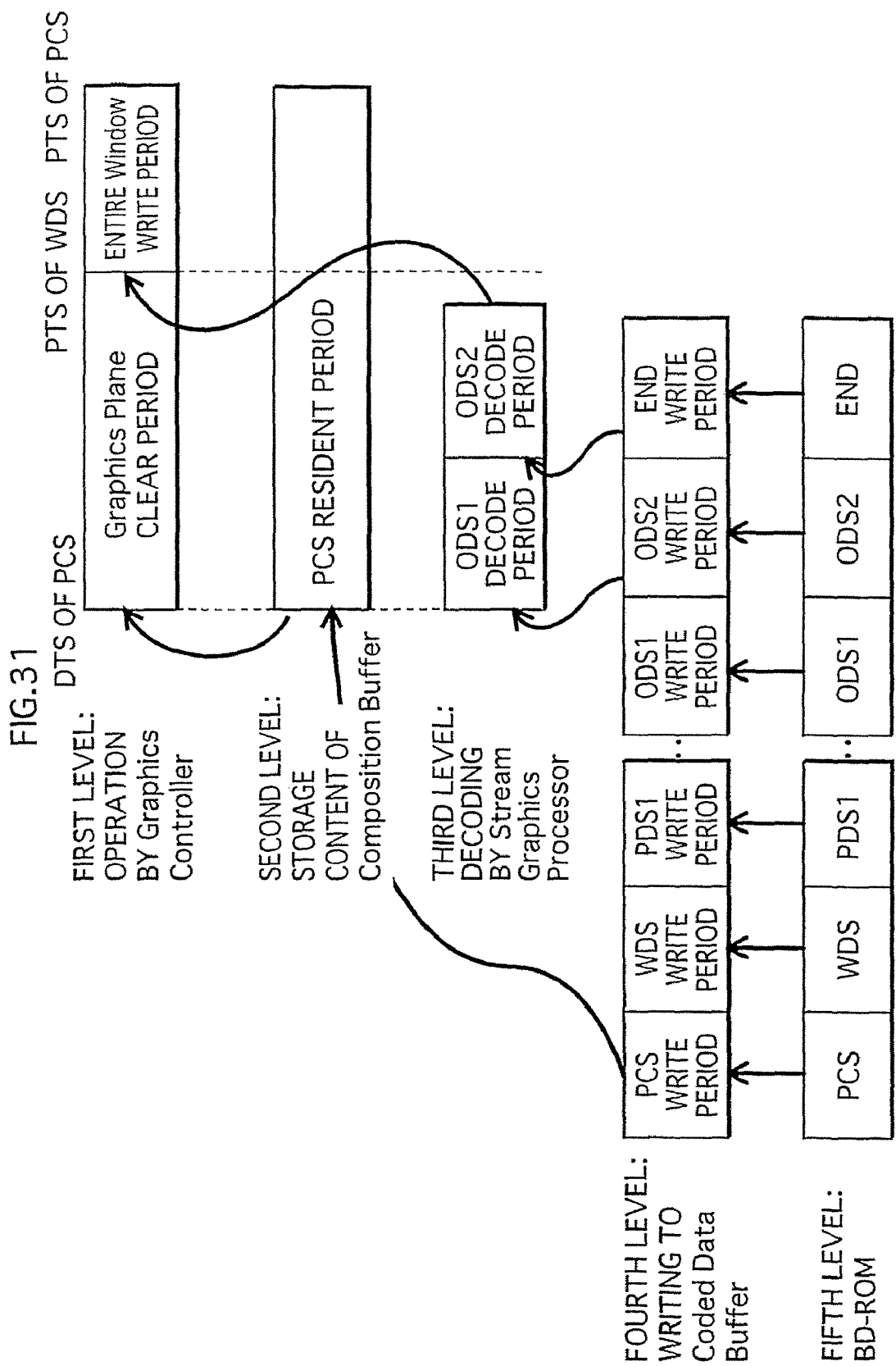
FIG. 31 is a timing chart of pipeline processing when decoding of ODSs ends before clearing of the Graphics Plane.

FIG. 30 shows an example when the clearing of the Graphics Plane 8 ends before the decoding of the ODSs. FIG. 31, on the other hand, is a timing chart showing pipeline processing when the decoding of the ODSs ends before the clearing of the Graphics Plane 8. In this case, upon completion of the decoding of the ODSs, the graphics obtained by the decoding cannot yet be written to the Graphics Plane 8. Only after the clearing of the Graphics Plane 8 is completed, the graphics can be written to the Graphics Plane 8.

Figure 32:
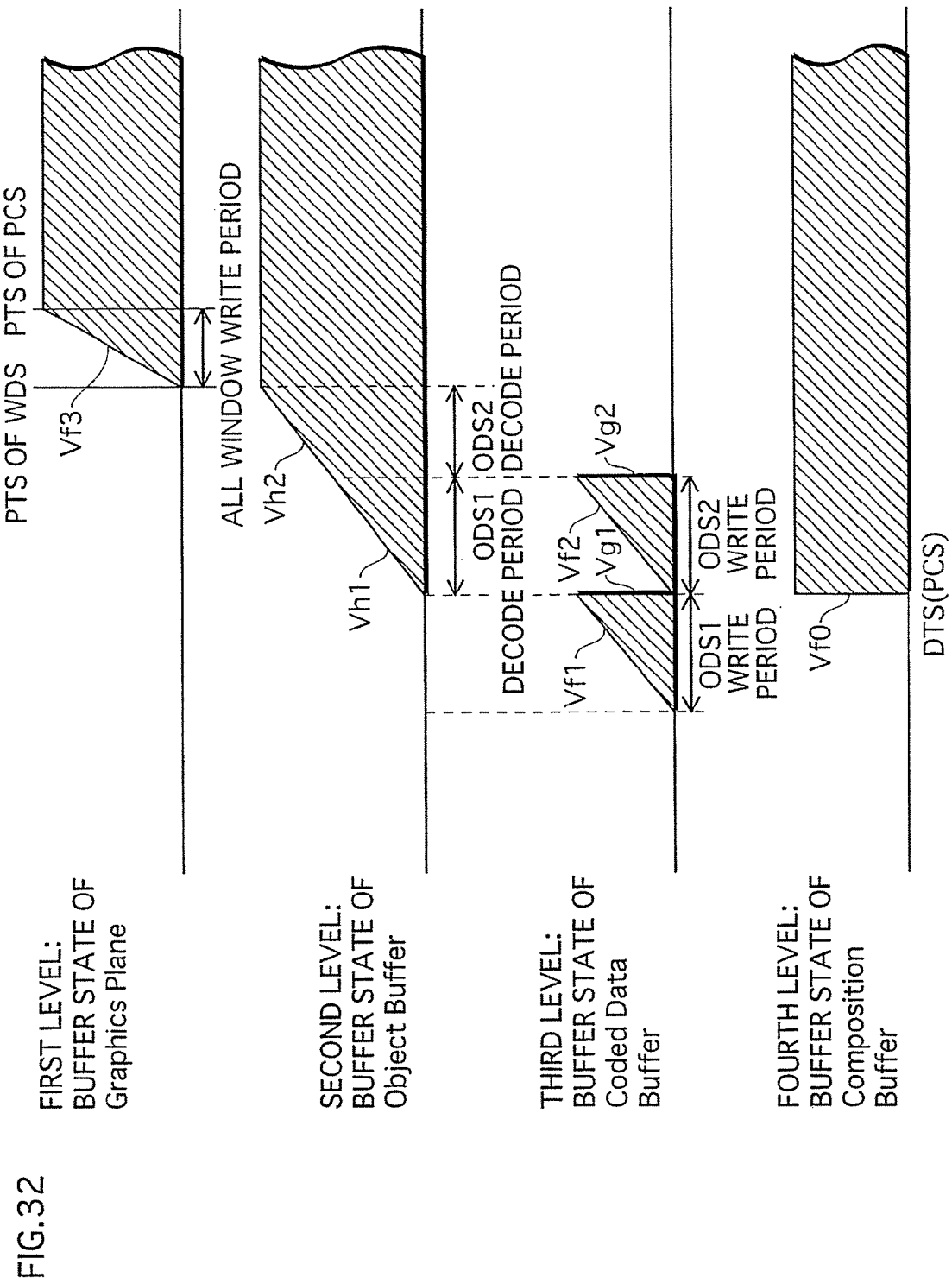
FIG. 32 is a timing chart showing changes in occupancy of the Composition Buffer, the Object Buffer, the Coded Data Buffer, and the Graphics Plane.

FIG. 32 is a timing chart showing changes in buffer occupancy in the reproduction apparatus 200. In the drawing, the first to fourth levels show changes in occupancy of the Graphics Plane 8, the Object Buffer 15, the Coded Data Buffer 13, and the Composition Buffer 16, respectively. These changes are shown in the form of a line graph in which the horizontal axis represents time and the vertical axis represents occupancy.

The fourth level shows changes in occupancy of the Composition Buffer 16. As illustrated, the changes in occupancy of the Composition Buffer 16 include monotone increase Vf0 with which the PCS output from the Coded Data Buffer 13 is stored.

The third level shows changes in occupancy of the Coded Data Buffer 13. As illustrated, the changes in occupancy of the Coded Data Buffer 13 include monotone increases Vf1 and Vf2 with which ODS1 and ODS2 are stored, and monotone decreases Vg1 and Vg2 with which ODS1 and ODS2 are sequentially read by the Stream Graphics Processor 14. Slopes of monotone increases Vf1 and Vf2 are based on transfer rate Rx from the Transport Buffer 4a to the Coded Data Buffer 13, whereas monotone decreases Vg1 and Vg2 are instantaneous since decoding by the Stream Graphics Processor 14 is performed instantaneously. Which is to say, the Stream Graphics Processor 14 decodes each ODS instantaneously and holds uncompressed graphics obtained by the decoding. Since transfer rate Rd from the Stream Graphics Processor 14 to the Object Buffer 15 is 128 Mbps, the occupancy of the Object Buffer 15 increases at 128 Mbps.

The second level shows changes in occupancy of the Object Buffer 15. As illustrated, the changes in occupancy of the Object Buffer 15 include monotone increases Vh1 and Vh2 with which the graphics Objects of ODS1 and ODS2 output from the Stream Graphics Processor 14 are stored. Slopes of monotone increases Vh1 and Vh2 are based on transfer rate Rd from the Stream Graphics Processor 14 to the Object Buffer 15. A decode period of each of ODS1 and ODS2 corresponds to a time period in which a monotone decrease occurs on the third level and a monotone increase occurs on the second level. The beginning of the decode period is shown by a DTS of the ODS, whereas the end of the decode period is shown by a PTS of the ODS. Once the uncompressed graphics Object has been transferred to the Object Buffer 15 by the time shown by the PTS of the ODS, the decoding of the ODS is complete. It is essential for the uncompressed graphics Object to be stored in the Object Buffer 15 by the time shown by the PTS of the ODS. As long as this is satisfied, the monotone decrease and the monotone increase in the decode period are not limited to those shown in FIG. 32.

The first level shows changes in occupancy of the Graphics Plane 8. As illustrated, the changes in occupancy of the Graphics Plane 8 include monotone increase Vf3 with which the graphics Objects output from the Object Buffer 15 are stored. A slope of monotone increase Vf3 is based on transfer rate Rc from the Object Buffer 15 to the Graphics Plane 8. The end of monotone increase Vf3 is shown by the PTS of the PCS.

The graph such as the one shown in FIG. 32 can be created through the use of the DTSs and PTSs of the ODSs, the DTS and the PTS of the PCS, and the buffer sizes and transfer rates shown in FIG. 29. Such a graph allows the author to grasp how the buffer states change when the AV Clip on the BD-ROM 100 is reproduced.

These changes of the buffer states can be adjusted by rewriting DTSs and PTSS. Therefore, it is possible for the author to prevent the occurrence of such a decoding load that exceeds specifications of a decoder of the reproduction apparatus 200, or to prevent a buffer overflow during reproduction. This makes it easier to implement hardware and software when developing the reproduction apparatus 200. This completes the explanation on the internal construction of the reproduction apparatus 200.

The following explains how to implement the Graphics Decoder 12. The Graphics Decoder 12 can be realized by having a general-purpose CPU execute a program for performing an operation shown in FIG. 33. An operation of the Graphics Decoder 12 is explained below, with reference to FIG. 33.

Figure 33:
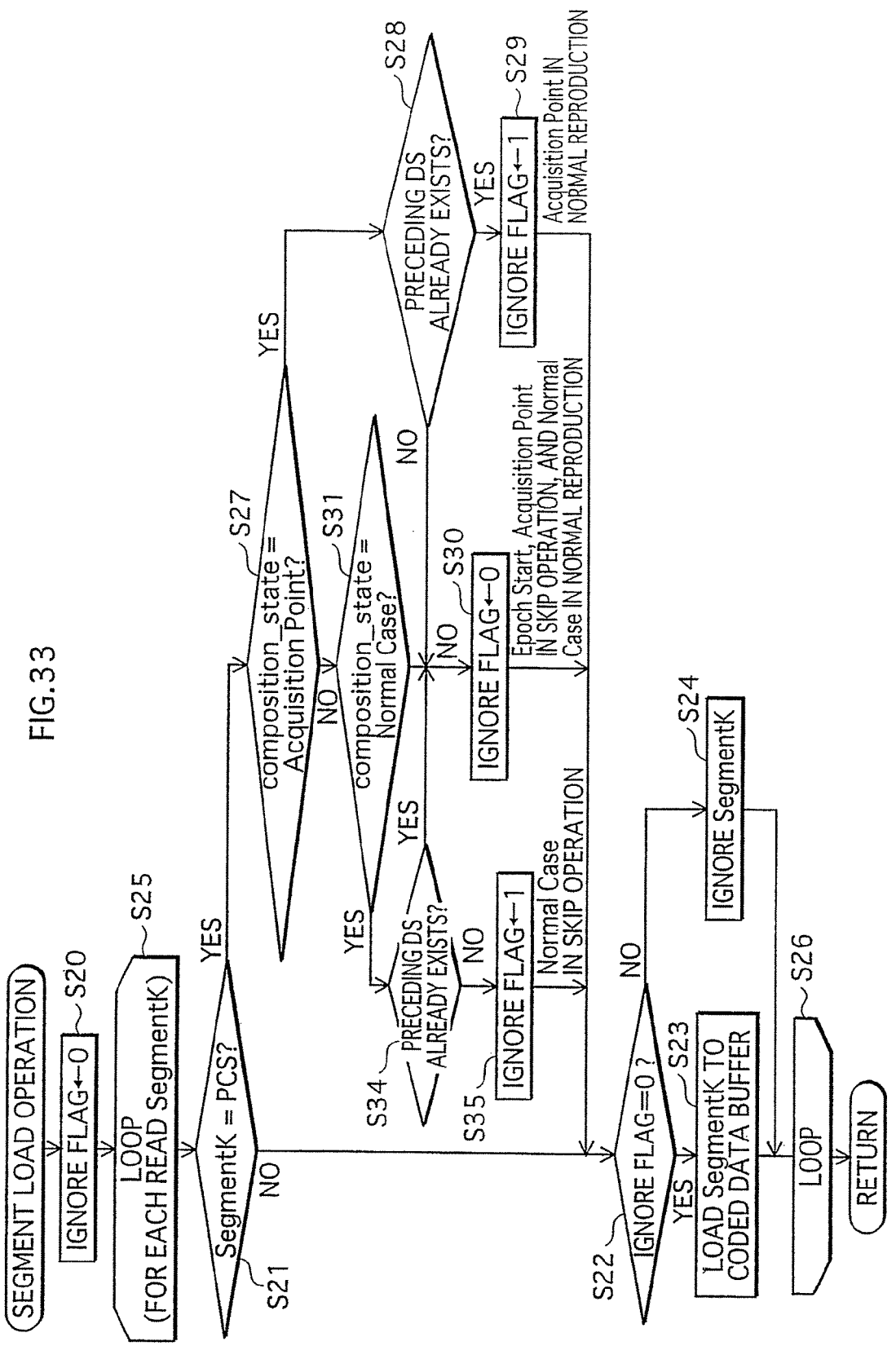
FIG. 33 is a flowchart of an operation of loading functional Segments.

FIG. 33 is a flowchart showing an operation of loading a functional Segment. In the drawing, SegmentK is a variable indicating a Segment (PCS, WDS, PDS, or ODS) which belongs to a DS and is read during reproduction of the AV Clip, and an ignore flag indicates whether SegmentK is to be ignored or loaded. In this flowchart, after the ignore flag is reset to 0 (S20), a loop of steps S21 to S24 and S27 to S31 is performed for each SegmentK (S25 and S26).

Step S21 judges whether SegmentK is a PCS. If SegmentK is a PCS, the operation proceeds to step S27.

Step S22 judges whether the ignore flag is 0 or 1. If the ignore flag is 0, the operation proceeds to step S23. If the ignore flag is 1, the operation proceeds to step S24. In step S23, SegmentK is loaded to the Coded Data Buffer 13.

If the ignore flag is 1 (S22:NO), SegmentK is ignored (S24). This leads to the negative judgment on all functional Segments belonging to the DS in step S22, as a result of which the functional Segments of the DS are all ignored.

Thus, the ignore flag indicates whether SegmentK is to be ignored or loaded. Steps S27 to S31 and S34 to S35 are performed to set this ignore flag.

Step S27 judges whether a composition_state field of the PCS shows Acquisition Point. If the composition_state field shows Acquisition Point, the operation proceeds to step S28. If the composition_state field shows Epoch Start or Normal Case, the operation proceeds to step S31.

Step S28 judges whether an immediately preceding DS exists in any of the buffers (the Coded Data Buffer 13, the Stream Graphics Processor 14, the Object Buffer 15, and the Composition Buffer 16) in the Graphics Decoder 12. The immediately preceding DS does not exist in the Graphics Decoder 12 if a skip operation is performed. In this case, the display needs to be started from the Acquisition Point DS, so that the operation proceeds to step S30 (S28:NO).

In step S30, the ignore flag is set to 0, and the operation proceeds to step S22.

On the other hand, the immediately preceding DS exists in the Graphics Decoder 12 if normal reproduction is performed. In this case, the operation proceeds to step S29 (S28: YES). In step S29, the ignore flag is set to 1, and the operation proceeds to step S22.

Step S31 judges whether the composition_state field shows Normal Case. If the composition_state field shows Normal Case, the operation proceeds to step S34. If the composition_state field shows Epoch Start, the operation proceeds to step S30 where the ignore flag is set to 0.

Step S34 is the same as step S28, and judges whether the immediately preceding DS exists in the Graphics Decoder 12. If the immediately preceding DS exists, the ignore flag is set to 0 (S30). Otherwise, the ignore flag is set to 1, because enough functional Segments for composing one screen of graphics cannot be obtained (S35). In this way, when the immediately preceding DS does not exist in the Graphics Decoder 12, the functional Segments of the Normal Case DS are ignored.

Figure 34:
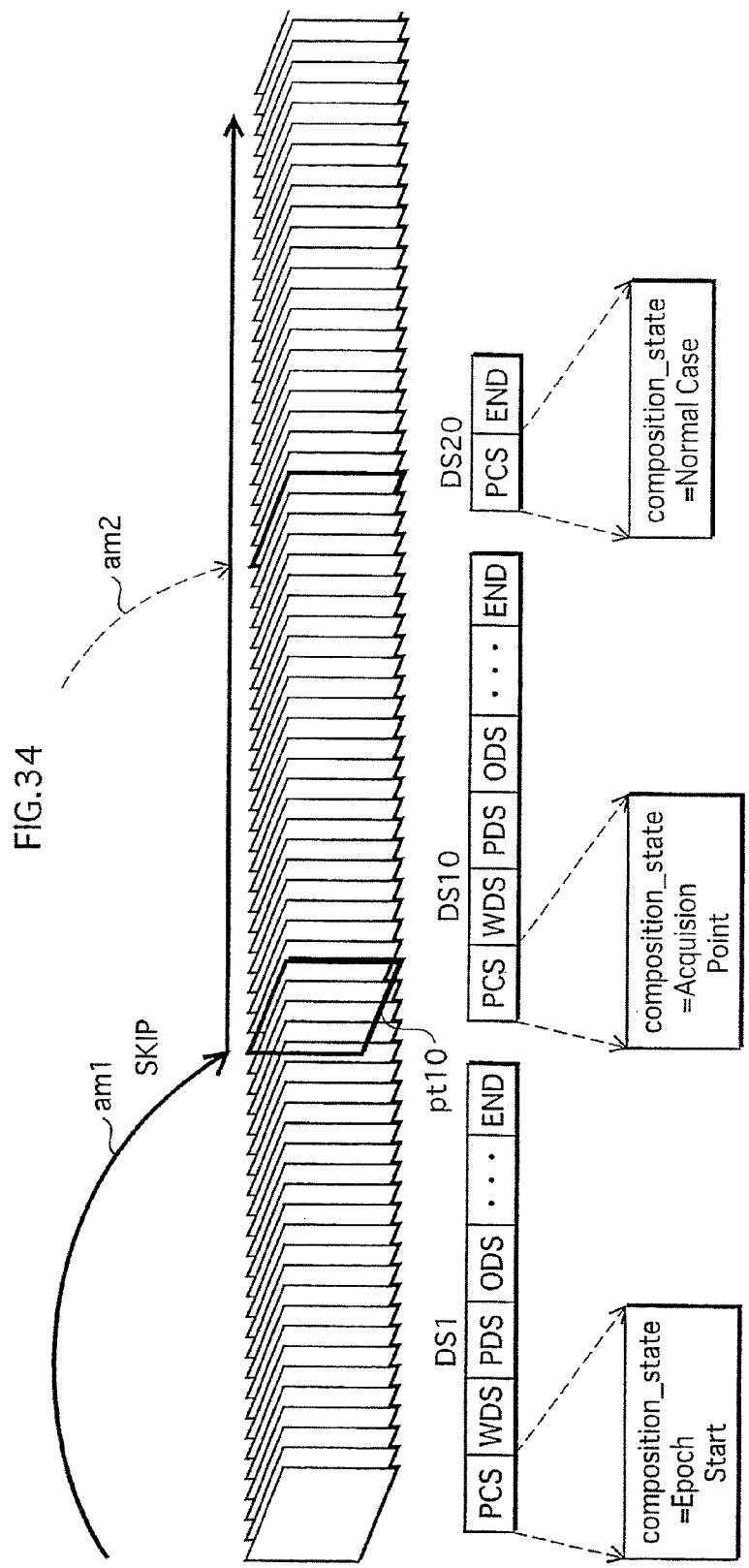
FIG. 34 shows a case when a skip operation is performed.

The following gives a specific example of loading DSs, with reference to FIG. 34. In FIG. 34, three DSs (DS1, DS10, and DS20) are multiplexed with video. A composition_state field of DS1 shows Epoch Start, a composition_state field of DS10 shows Acquisition Point, and a composition_state field of DS20 shows Normal Case.

Figure 35:
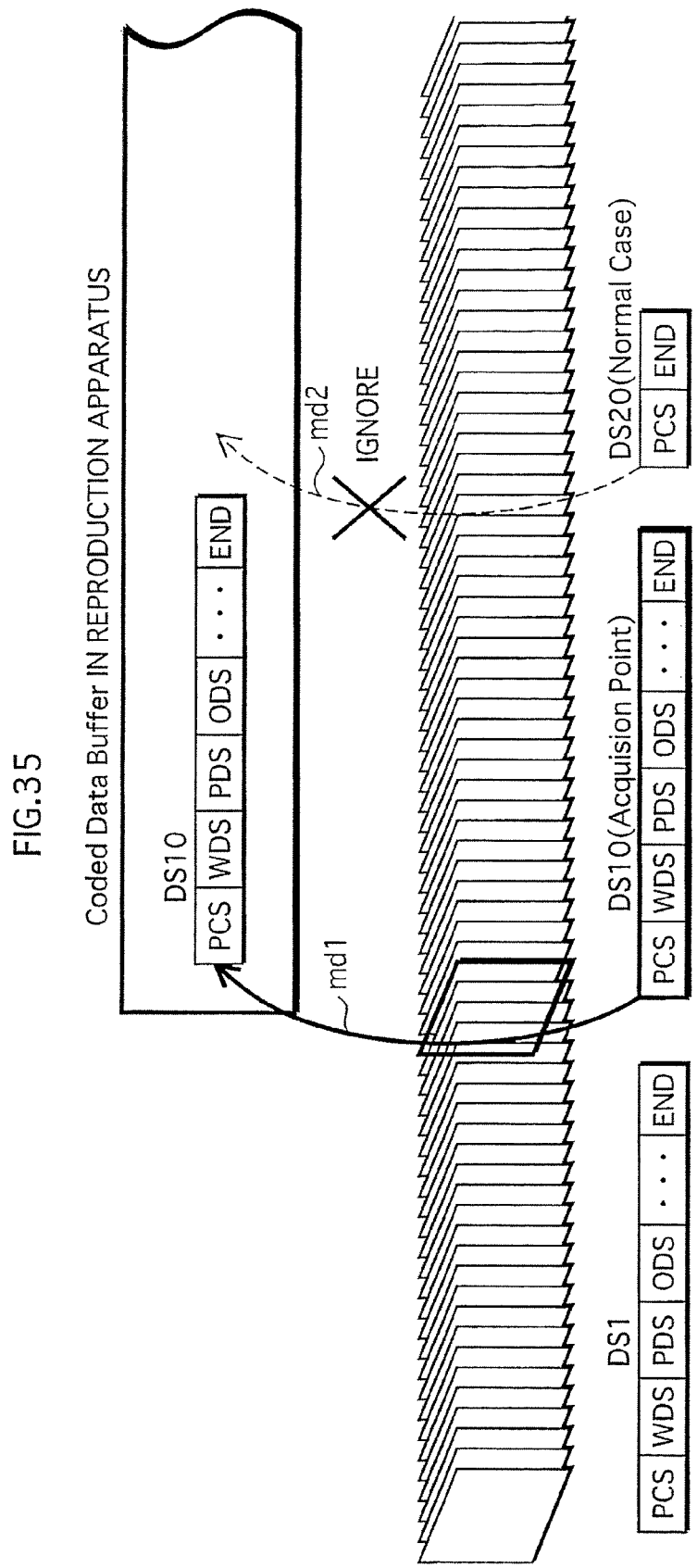
FIG. 35 shows a situation where DS10 is loaded into the Coded Data Buffer when the skip operation is performed as shown in FIG. 34.

Suppose a skip operation is performed on picture data pt10 in an AV Clip in which these three DSs are multiplexed with video, as indicated by arrow am1. In such a case, DS10 which is closest to pt10 is subjected to the operation shown in FIG. 33. The composition_state field of DS10 shows Acquisition Point (S27:YES), but the immediately preceding DS (DS1) does not exist in the Coded Data Buffer 13 (S28:NO). Accordingly, the ignore flag is set to 0 (S30). As a result, DS10 is loaded to the Coded Data Buffer 13 as indicated by arrow md1 in FIG. 35. Suppose, on the other hand, a skip operation is performed on picture data which is located after DS10, as indicated by arrow am2 in FIG. 34. In this case, DS20 is a Normal Case DS, and the immediately preceding DS (DS10) does not exist in the Coded Data Buffer 13. Accordingly, DS20 is ignored, as indicated by arrow md2 in FIG. 35.

Figure 36:
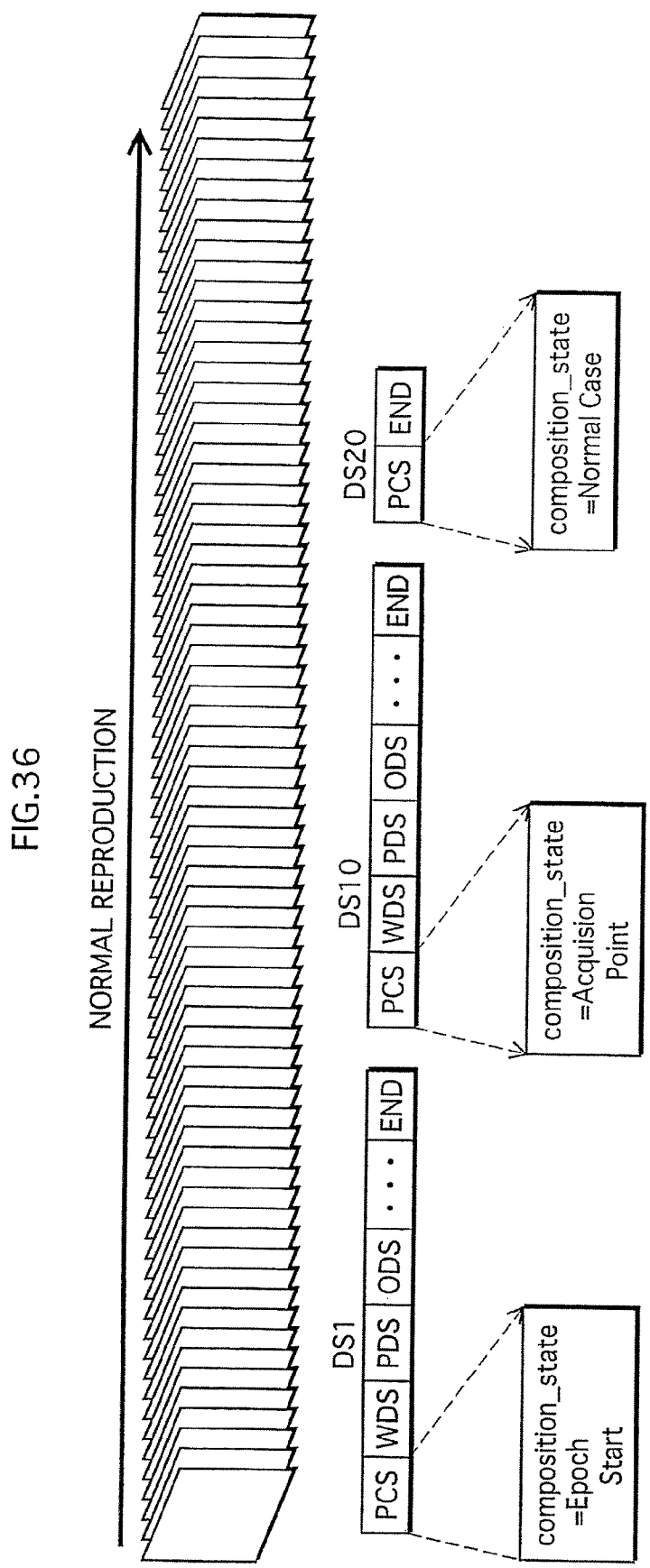
FIG. 36 shows a case when normal reproduction is performed.
Figure 37:
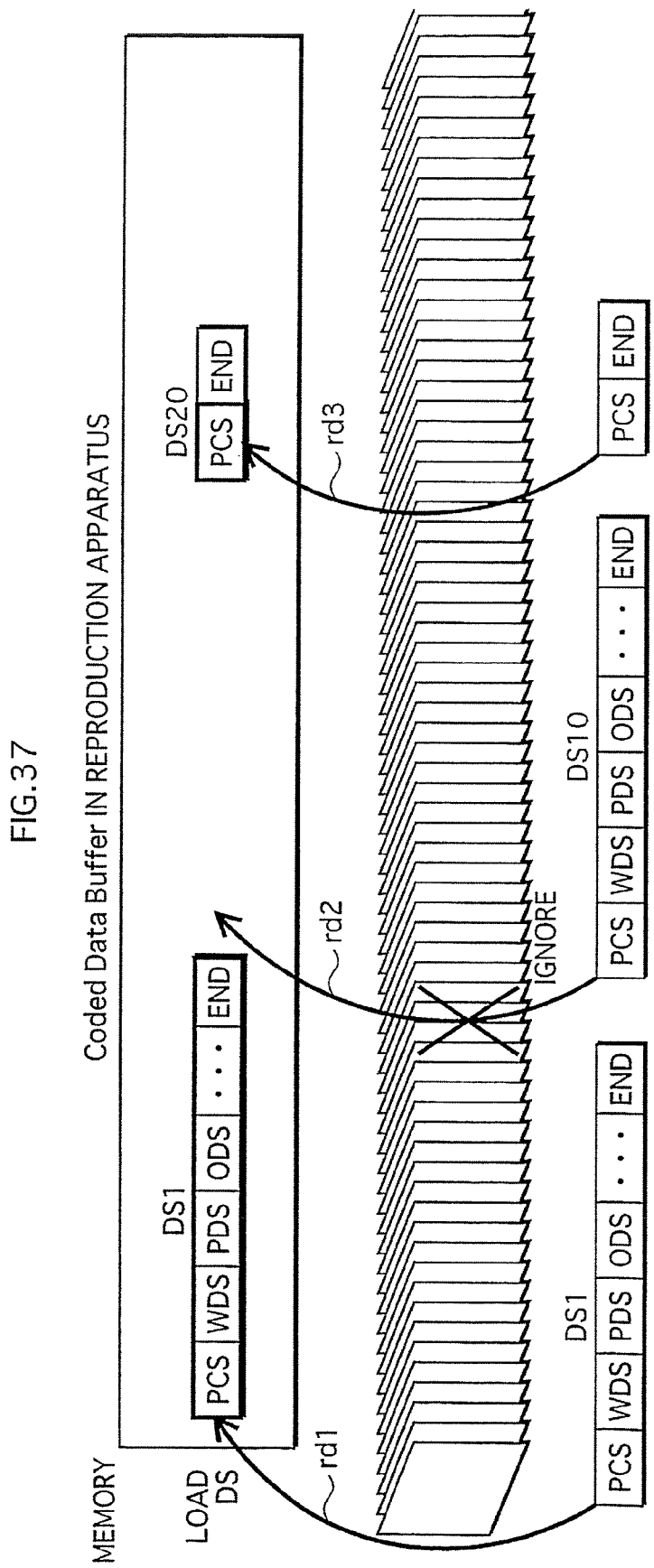
FIG. 37 shows a situation where DS1 and DS20 are loaded into the Coded Data Buffer when the normal reproduction is performed as shown in FIG. 36.

FIG. 37 shows how DS1, DS10, and DS20 are loaded when normal reproduction is performed as shown in FIG. 36. Of the three DSs, DS1 which is an Epoch Start DS is loaded to the Coded Data Buffer 13, as indicated by arrow rd1 (S23). However, the ignore flag is set to 1 for DS10 which is an Acquisition Point DS (S29), so that the functional Segments of DS10 are not loaded to the Coded Data Buffer 13 but ignored, as indicated by arrow rd2 (S24). Meanwhile, DS20 which is a Normal Case DS is loaded to the Coded Data Buffer 13, as indicated by arrow rd3 (S23).

Figure 38:
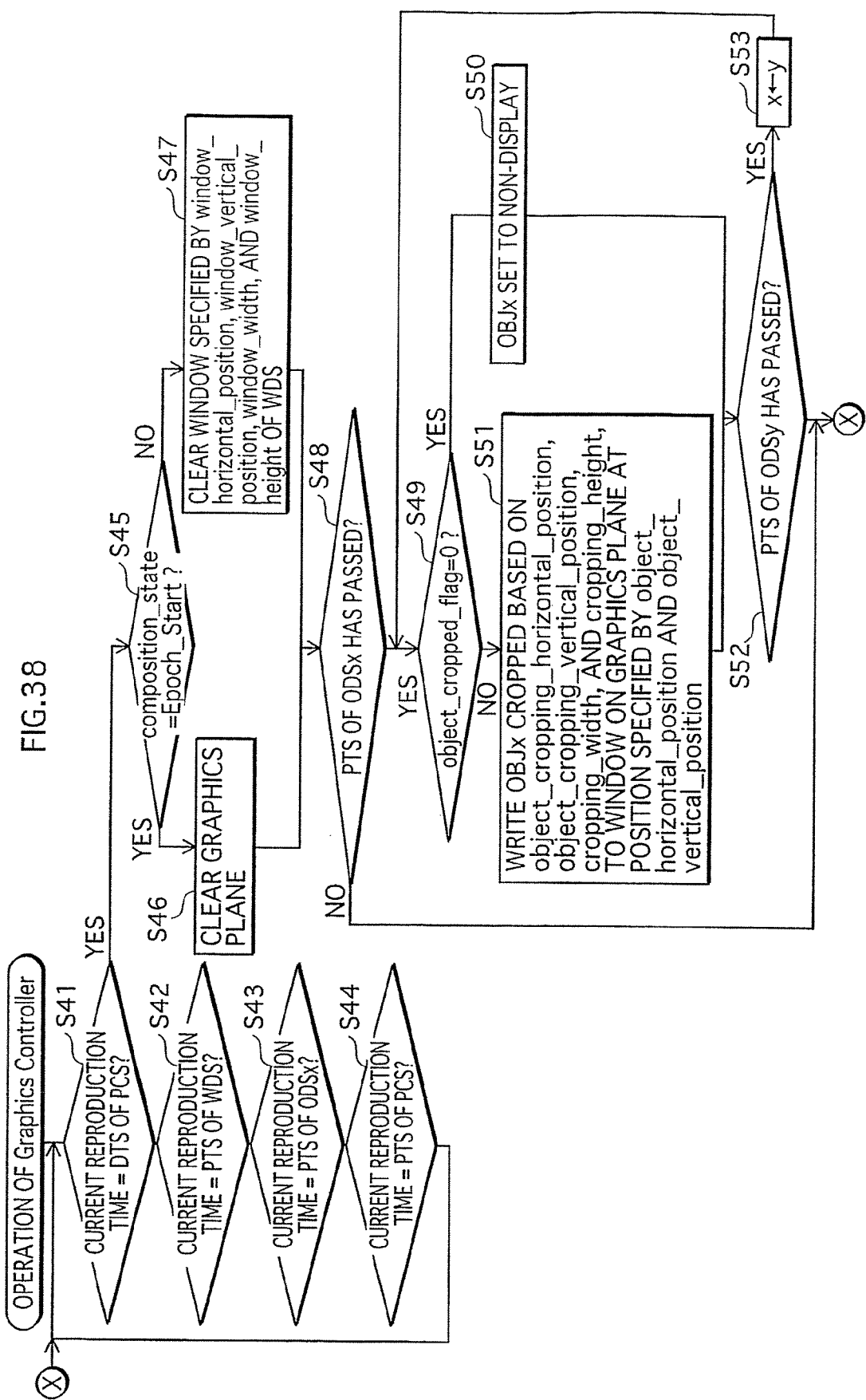
FIG. 38 is a flowchart of an operation of a Graphics Controller shown in FIG. 28.
Figure 39:
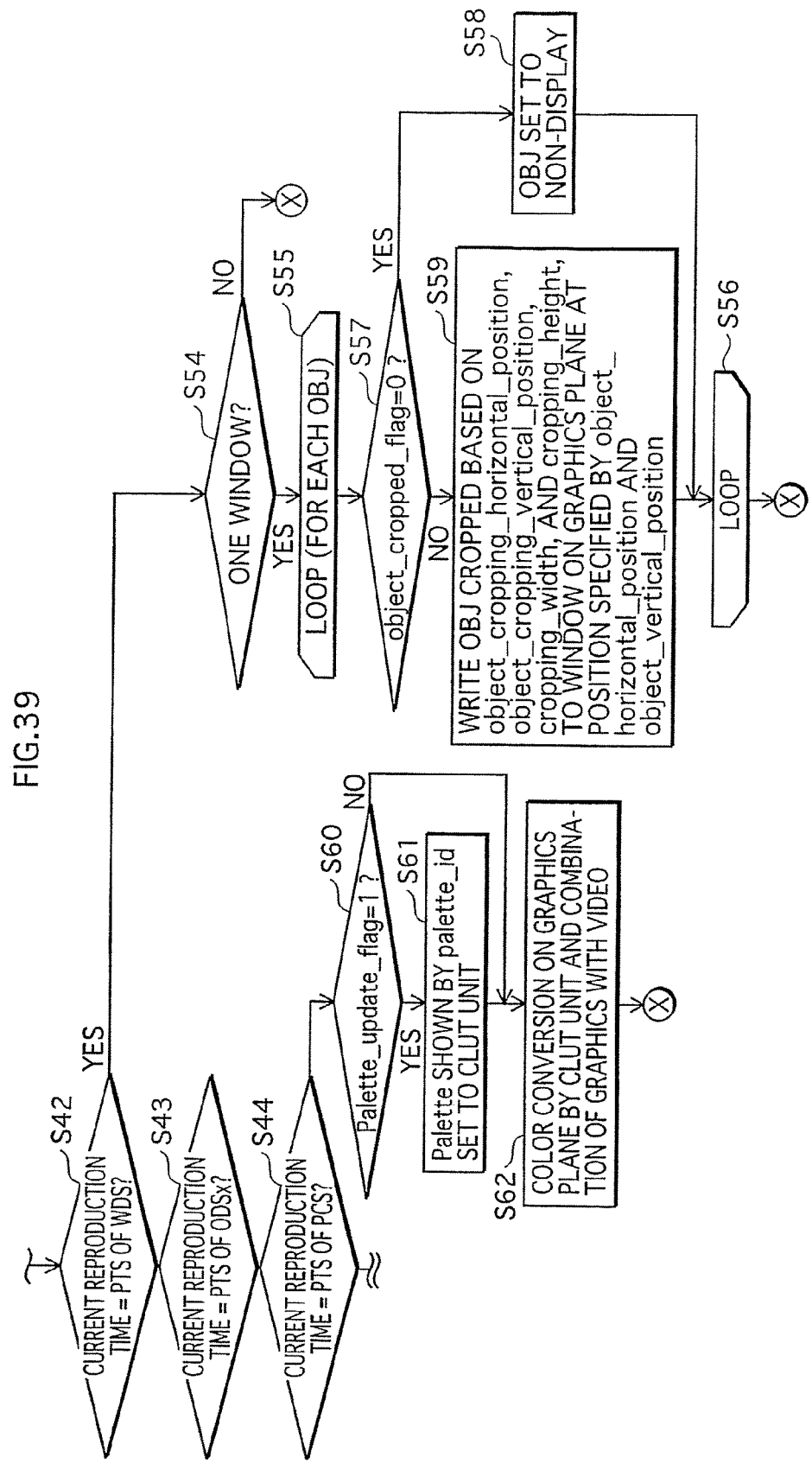
FIG. 39 is a flowchart of the operation of the Graphics Controller.
Figure 40:
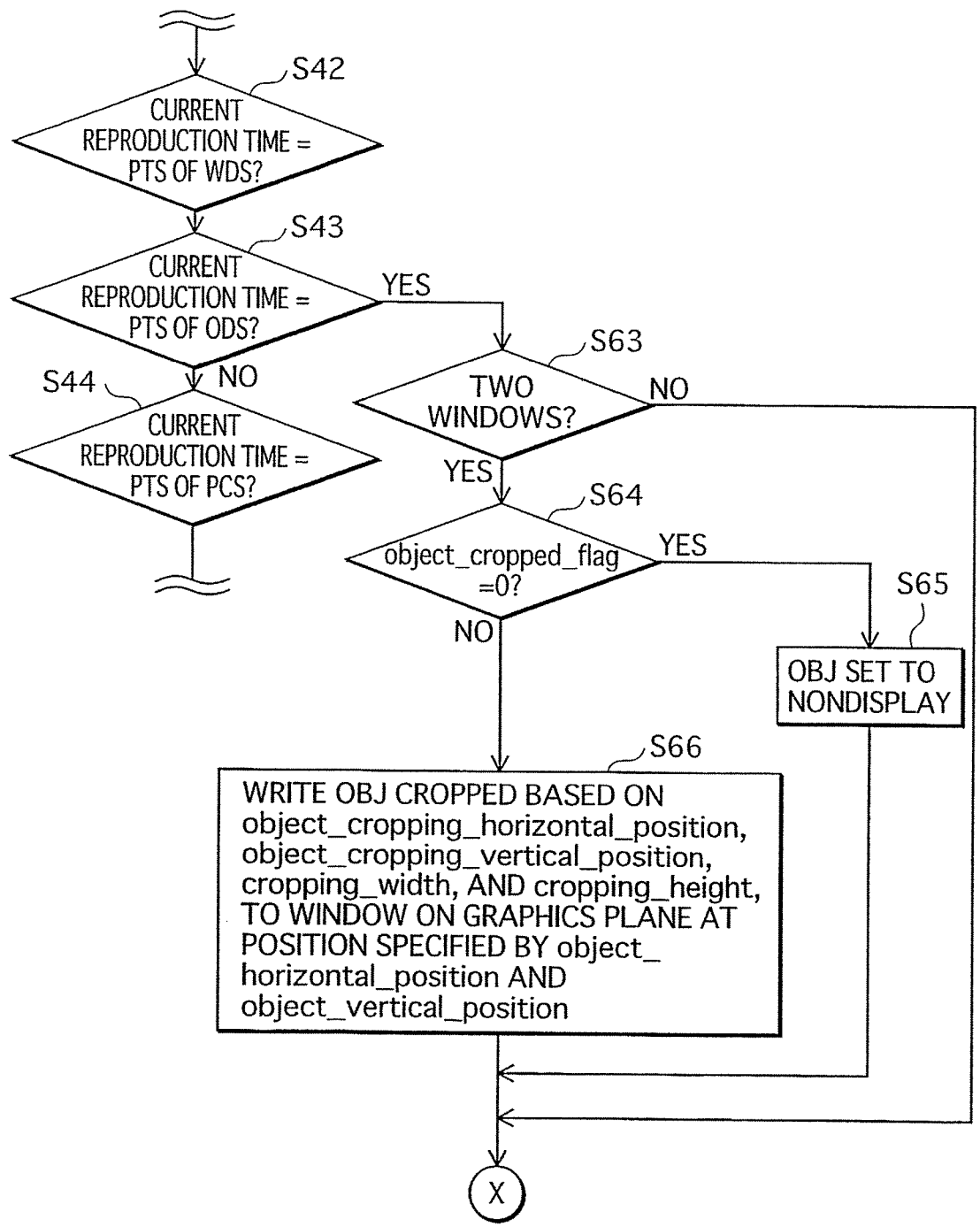
FIG. 40 is a flowchart of the operation of the Graphics Controller.

The following explains an operation of the Graphics Controller 17. FIGS. 38 to 40 are flowcharts showing the operation of the Graphics Controller 17.

Steps S41 to S44 constitute a main routine, where an event specified by any of steps S41 to S44 is waited.

In FIG. 38, step S41 judges whether the current reproduction time is a DTS of a PCS. If so, steps S45 to S53 are performed.

Step S45 judges whether a composition_state field of the PCS shows Epoch Start. If so, the entire Graphics Plane 8 is cleared in step S46. Otherwise, a Window specified by a window_horizontal_position field, a window_vertical_position field, a window_width field, and a window_height field of a WDS is cleared in step S47.

Step S48 is performed after step S46 or S47, and judges whether a PTS of arbitrary ODSx has passed. Clearing the entire Graphics Plane 8 takes a long time, so that decoding of ODSx may already be completed by the time the entire Graphics Plane 8 is cleared. Step S48 examines this possibility. If the PTS of ODSx has not passed, the operation returns to the main routine. If the PTS of ODSx has passed, steps S49 to S51 are performed. Step S49 judges whether an object_cropped_flag field shows 0. If so, a graphics Object corresponding to ODSx is set to non-display (S50).

If the object_cropped_flag shows 1, the graphics Object cropped based on an object_cropping_horizontal_position field, an object_cropping_vertical_position field, a cropping_width field, and a cropping_height field is written to the Window on the Graphics Plane 8 at a position specified by an object_horizontal_position field and an object_vertical_position field (S51). In this way, the graphics Object is written to the Window.

Step S52 judges whether a PTS of another ODS (ODSy) has passed. If decoding of ODSy is completed during when the graphics Object of ODSx is being written to the Graphics Plane 8, ODSy is set as ODSx (S53), and the operation returns to step S49. As a result, steps S49 to S51 are performed on ODSy.

In FIG. 39, step S42 judges whether the current reproduction time is a PTS of the WDS. If so, the operation proceeds to step S54, to judge whether the number of Windows is 1. If the number of Windows is 2, the operation returns to the main routine. If the number of Windows is 1, a loop of steps S55 to S59 is performed. In this loop, steps S57 to S59 are performed for each of at most two graphics Objects to be displayed in the Window. Step S57 judges whether the object_cropped_flag field shows 0. If so, the graphics Object is set to non-display (S58).

If the object_cropped_flag field shows 1, the graphics Object cropped based on an object_cropping_horizontal_position field, an object_cropping_vertical_position field, a cropping_width field, and a cropping_height field is written to the Window on the Graphics Plane 8 at a position specified by an object_horizontal_position field and an object_vertical_position field (S59). As a result of this loop, one or more graphics Objects are written to the Window.

Step S44 judges whether the current reproduction time is a PTS of the PCS. If so, the operation proceeds to step S60 to judge whether a palette_update_flag field shows 1. If so, a Palette identified by a palette_id field is set to the CLUT unit 9 (S61). If the palette_update_flag field shows 0, step S61 is skipped.

After this, the CLUT unit 9 performs color conversion of graphics on the Graphics Plane 8. The graphics is then overlaid on video (S62).

In FIG. 40, step S43 judges whether the current reproduction time is a PTS of an ODS. If so, the operation proceeds to step S63 to judge whether the number of Windows is 2. If the number of Windows is 1, the operation returns to the main routine.

Here, the judgments made in steps S43 and S63 have the following meaning. If the number of Windows is 2, two graphics Objects are displayed respectively in the two Windows. In such a case, each time decoding of one ODS is completed, a graphics Object obtained by the decoding needs to be written to the Graphics Plane 8 (see FIG. 19B). Therefore, if the current reproduction time is the PTS of the ODS and the number of Windows is 2, steps S64 to S66 are performed to write each individual graphics Object to the Graphics Plane 8. Step S64 judges whether the object_cropped_flag field shows 0. If so, the graphics Object is set to non-display (S65).

If the object_cropped_flag field shows 1, the graphics Object cropped based on an object_cropping_horizontal_position field, an object_cropping_vertical_position field, a cropping_width field, and a cropping_height field is written to a Window on the Graphics Plane 8 at a position specified by an object_horizontal_position field and an object_vertical_position field (S66). By repeating this process, two graphics Objects are written respectively to the two Windows.

According to this embodiment, processing of one DS is started during an active period of a PCS in an immediately preceding DS. In other words, the processing of the DS can be started without waiting for the active period of the PCS in the immediately preceding DS to end. The timing with which the processing of the DS is started is when, during the active period of the PCS in the immediately preceding DS, decoding and transfer of graphics of the immediately preceding DS are completed. Therefore, the processing of the DS can be advanced by a time period from the completion of the decoding and transfer of the graphics of the immediately preceding DS to the end of the active period of the PCS in the immediately preceding DS.

Even when the processing of the DS is started during the active period of the PCS in the immediately preceding DS in such a way, a time period in which a graphics Object of the DS is written to the Object Buffer does not overlap with a time period in which a graphics Object of the immediately preceding DS is written to the Object Buffer. Accordingly, as long as a dual port memory that can be read and written simultaneously is used as the Object Buffer, two or more DSs can be processed in a pipeline with a single Stream Graphics Processor. Such pipeline processing increases decoding efficiency, without complicating the internal construction of the reproduction apparatus 200.

(Second Embodiment)

The second embodiment of the present invention relates to a manufacturing process of the BD-ROM 100 explained in the first embodiment. FIG. 41 is a flowchart showing the manufacturing process of the BD-ROM 100.

The manufacturing process includes a material production step of recording video, sound, and the like (S201), an authoring step of creating an application format using an authoring device (S202), and a pressing step of creating an original master of the BD-ROM 100 and performing stamping and bonding to complete the BD-ROM 100 (S203).

In this manufacturing process, the authoring step includes steps S204 to S213.

In step S204, control information, Window definition information, Palette definition information, and graphics are generated. In step S205, the control information, the Window definition information, the Palette definition information, and the graphics are converted to functional Segments. In step S206, a PTS of each PCS is set based on a time of a picture to be synchronized with. In step S207, a DTS[ODS] and a PTS [ODS] are set based on the PTS[PCS]. In step S208, a DTS [PCS], a PTS[PDS], a DTS[WDS], and a PTS[WDS] are set based on the DTS[ODS]. In step S209, changes in occupancy of each buffer in the player model are graphed. In step S210, a judgment is made as to whether the graphed changes satisfy constraints of the player model. If the judgment is in the negative, the DTS and PTS of each functional Segment are rewritten in step S211. If the judgment is in the affirmative, a graphics stream is generated in step S212, and the graphics stream is multiplexed with a video stream and an audio stream to form an AV Clip in step S213. After this, the AV Clip is adapted to the Blue-ray Disc Read-Only Format, to complete the application format.

(Modifications)

Though the present invention has been described by way of the above embodiments, the present invention is not limited to such. The present invention can be realized with any of modifications (A) to (O) below. The invention of each of the claims of this application includes extension and generalization of the above embodiments and their modifications below. The degree of extension and generalization depends upon the state of the art in the technical field of the present invention at the time when the present invention was made.

(A) The above embodiments describe the case where the BD-ROM is used as the recording medium. Main features of the present invention, however, lie in a graphics stream recorded on the recording medium, which does not rely on physical characteristics of BD-ROMs. Therefore, the present invention is applicable to any recording medium that is capable of recording a graphics stream. Examples of such a recording medium include: an optical disc such as a DVD-ROM, a DVD-RAM, a DVD-RW, a DVD-R, a DVD+RW, a DVD+R, a CD-R, or a CD-RW; a magneto-optical disk such as a PD or an MO; a semiconductor memory card such as a CompactFlash card, a SmartMedia card, a Memory Stick card, a MultiMediaCard, or a PCMCIA card; a magnetic disk such as a flexible disk, SuperDisk, Zip, or Clik!; a removable hard disk drive such as ORB, Jaz, SparQ, SyJet, EZFley, or Microdrive, and a nonremovable hard disk drive.

(B) The above embodiments describe the case where the reproduction apparatus decodes an AV Clip on the BD-ROM and outputs the decoded AV Clip to the television. As an alternative, the reproduction apparatus may be equipped with only a BD drive, with the remaining construction elements being provided in the television. In this case, the reproduction apparatus and the television can be incorporated in a home network connected with an IEEE 1394 connector.

The above embodiments describe the case where the reproduction apparatus is connected to the television, but the reproduction apparatus may instead be integrated with a display device. Also, the reproduction apparatus may include only the system LSI (integrated circuit) which constitutes an essential part of processing. The reproduction apparatus and the integrated circuit are both an invention described in this specification. Accordingly, regardless of whether the reproduction apparatus or the integrated circuit is concerned, an act of manufacturing a reproduction apparatus based on the internal construction of the reproduction apparatus described in the first embodiment is an act of working of the present invention. Also, any act of assigning with charge (i.e. for sale) or without charge (i.e. as a gift), leasing, and importing the reproduction apparatus is an act of working of the present invention. Likewise, an act of offering for assignment or lease of the reproduction apparatus using storefront displays, catalogs, or brochures is an act of working of the present invention.

(C) Information processing using the programs shown in the flowcharts is actually realized using hardware resources. Accordingly, the programs which describe the operational procedures shown in the flowcharts are themselves an invention. The above embodiments describe the case where the programs are incorporated in the reproduction apparatus, but the programs can be used independently of the reproduction apparatus. Acts of working of the programs include (1) an act of manufacturing, (2) an act of assigning with or without charge, (3) an act of leasing, (4) an act of importing, (5) an act of providing to the public via a bi-directional electronic communications network, and (6) an act of offering for assignment or lease using storefront displays, catalogs, or brochures.

(D) The time elements of the steps which are executed in a time series in each of the flowcharts can be regarded as the necessary elements of the present invention. This being so, a reproduction method shown by these flowcharts is an invention. If the processing shown in each flowchart is carried out by performing the steps in a time series so as to achieve the intended aim and the intended effect, this is an act of working of the recording method of the present invention.

(E) When recording an AV Clip on the BD-ROM, an extension header may be added to each TS packet in the AV Clip. The extension header is called a TP_extra_header, includes an arrival_time_stamp and a copy_permission_indicator, and has a data length of 4 bytes. TS packets with TP_extra_headers (hereafter "EX TS packets") are grouped in units of 32 packets, and each group is written to three sectors. One group made up of 32 EX TS packets has 6,144 bytes (=32×192), which is equivalent to a size of three sectors that is 6144 bytes (=2048×3). The 32 EX TS packets contained in the three sectors are called an Aligned Unit.

In a home network connected with an IEEE 1394 connector, the reproduction apparatus transmits an Aligned Unit in the following manner. The reproduction apparatus removes a TP_extra_header from each of the 32 EX TS packets in the Aligned Unit, encrypts the body of each TS packet according to the DTCP Specification, and outputs the encrypted TS packets. When outputting the TS packets, the reproduction apparatus inserts an isochronous packet between adjacent TS packets. A position where the isochronous packet is inserted is based on a time shown by an arrival_time_stamp of the TP_extra_header. The reproduction apparatus outputs a DTCP_descriptor, as well as the TS packets. The DTCP_descriptor corresponds to a copy_permission_indicator in the TP_extra_header. With the provision of the DTCP_descriptor indicating "copy prohibited", it is possible to prevent, when using the TS packets in the home network connected with the IEEE 1394 connector, the TS packets from being recorded to other devices.

(F) The above embodiments describe the case where an AV Clip of the Blu-ray Disc Read-Only Format is used as a digital stream, but the present invention can also be realized with a VOB (Video Object) of the DVD-Video Format or the DVD-Video Recording Format. The VOB is a program stream that complies with the ISO/IEC 13818-1 Standard and is obtained by multiplexing a video stream and an audio stream. Also, the video stream in the AV Clip may be an MPEG4 video stream or a WMV video stream. Further, the audio stream in the AV Clip may be a Linear PCM audio stream, a Dolby AC-3 audio stream, an MP3 audio stream, an MPEG-AAC audio stream, or a dts audio stream.

(G) The film described in the above embodiments may be obtained by encoding an analog image signal broadcast by analog broadcasting. Also, the film may be stream data made up of a transport stream broadcast by digital broadcasting.

Alternatively, an analog/digital image signal recorded on a videotape may be encoded to obtain content. Also, an analog/digital image signal directly captured by a video camera may be encoded to obtain content. A digital work distributed by a distribution server is applicable too.

(H) Graphics Objects described in the above embodiments is run-length encoded raster data. Run-length encoding is used for compression/encoding of graphics Objects, because the run-length encoding is suitable for compression and decompression of subtitles. Subtitles have a property in that a continuous length of the same pixel value in a horizontal direction is relatively long. Therefore, by performing compression using run-length encoding, a high compression rate can be attained. In addition, run-length encoding reduces a load for decompression, and is therefore suitable for realizing decoding by software. Nevertheless, the use of run-length encoding for graphics Objects is not a limitation of the present invention. For example, graphics Objects may be PNG data. Also, graphics Objects may be vector data instead of raster data. Further, graphics Objects may be transparent patterns.

(I) Graphics of subtitles selected according to a language setting in the reproduction apparatus may be subjected to display effects of PCSs. As a result, display effects achieved by using characters which are contained within the body of video in a conventional DVD can be realized with subtitle graphics displayed according to the language setting of the reproduction apparatus. This contributes to high practicality.

Also, subtitle graphics selected according to a display setting of the reproduction apparatus may be subjected to display effects of PCSs. For example, graphics of various display modes such as wide screen, pan and scan, and letterbox are recorded on the BD-ROM, and the reproduction apparatus selects one of these display modes according to a display setting of the television connected with the reproduction apparatus and displays corresponding graphics. Since the display effects of PCSs are applied to such graphics, viewability increases. As a result, display effects achieved by using characters which are contained within the body of video in a conventional DVD can be realized with subtitle graphics displayed according to the display setting. This contributes to high practicality.

(J) The first embodiment describes the case where transfer rate Rc from the Object Buffer to the Graphics Plane is set so as to clear the Graphics Plane and render graphics on a Window, which is 25% in size of the Graphics Plane, within one video frame. However, transfer rate Rc may be set so that the clearing and the rendering complete within a vertical blanking time. Suppose the vertical blanking time is 25% of 1/29.97 seconds. Then Rc is 1 Gbps. By setting Rc in this way, graphics can be displayed smoothly.

Also, writing in sync with line scan can be used together with writing within a vertical blanking time. This enables subtitles to be displayed smoothly with Rc=256 Mbps.

(K) The above embodiments describe the case where the reproduction apparatus includes the Graphics Plane. Alternatively, the reproduction apparatus may include a line buffer for storing uncompressed pixels of one line. Since conversion to an image signal is performed for each horizontal row (line), conversion to an image signal can equally be performed with the line buffer.

(L) The above embodiments describe the case where graphics is character strings representing dialogs in a film. However, the graphics may also include a combination of figures, letters, and colors constituting a trademark, a national crest, a national flag, a national emblem, a public symbol or seal employed by a national government for supervision/certification, a crest, flag, or emblem of an international organization, or a mark of origin of a particular item.

(M) The first embodiment describes the case where a Window is provided on the top or bottom of the Graphics Plane, on an assumption that subtitles are displayed horizontally on the top or bottom of the screen. Instead, a Window may be provided on the left or right of the Graphics Plane, to display subtitles vertically on the left or right of the screen. This enables Japanese subtitles to be displayed vertically.

(O) The Graphics Decoder performs pipeline processing on DSn and DSn+1, when DSn and DSn+1 belong to the same Epoch in the graphics stream. When DSn and DSn+1 belong to different Epochs, on the other hand, the Graphics Decoder starts processing DSn+1 after display of graphics of DSn begins.

Also, there are two types of graphics streams, i.e., a Presentation graphics stream which is mainly intended to synchronize with video, and an Interactive graphics stream which is mainly intended to realize an interactive display. The Graphics Decoder performs pipeline processing of DSn and DSn+1 when the graphics stream is a Presentation graphics stream, and does not perform pipeline processing when the graphics stream is an Interactive graphics stream.

The present invention can be modified as explained above. Nevertheless, the invention of each of the claims of this application reflects means for solving the technical problem encountered by the conventional techniques, so that the technical scope of the invention according to the claims will not extend beyond the technical scope in which one skilled in the art acknowledges the technical problem. Hence the invention according to the claims substantially corresponds to the description of the specification.

Industrial Applicability

The above embodiments disclose the internal constructions of the recording medium and the reproduction apparatus to which the present invention relates, and the recording medium and the reproduction apparatus can be manufactured in volume based on the disclosed internal constructions. In other words, the recording medium and the reproduction apparatus are capable of being industrially manufactured. Hence the recording medium and the reproduction apparatus have industrial applicability.

The invention claimed is:

1. A non-transitory recording medium used for storing a digital stream which is readable by a computer to reproduce a video stream and a graphics stream which are multiplexed in the digital stream, the non-transitory recording medium comprising:

the digital stream generated by multiplexing the video stream and the graphics stream, wherein:

the graphics stream includes a plurality of display sets each of which is used for a graphics display;

the display set includes a PCS (Presentation Composition Segment), an ODS (Object Definition Segment) for defining a graphics object, and an END segment;

the PCS has time information, the time information designating an active period of the PCS in the display set on a reproduction time axis of the video stream;

each segment is contained in a packet;

the time information includes a decoding time stamp and a presentation time stamp which are written in a packet;

the display set includes a sequence of ODSs including a referenced ODS which is referenced by the PCS in the display set and a non-referenced ODS which is not referenced by the PCS in the display set;

the referenced ODS and the non-referenced ODS are arranged in the display set;

the sequence of the referenced ODS and the non-referenced ODS are to be sequentially decoded in an order of the arrangement; and the END segment immediately follows a last ODS of the sequence of the referenced ODS and the non-referenced ODS in the display set.

2. The non-transitory recording medium of claim 1, wherein:

a time stamp associated with the END segment shows a time at which the decoding of the referenced ODS and the non-referenced ODS included in the display set is completed.

3. A reproduction apparatus for reading a digital stream from a recording medium and reproducing a video stream and a graphics stream which are multiplexed in the digital stream, the reproduction apparatus comprising:

a video decoder operable to decode the video stream to generate a moving picture; and a graphics decoder operable to decode the graphics stream to generate a graphics object, wherein:

the graphics stream includes a plurality of display sets each of which is used for a graphics display;

the display set includes a PCS (Presentation Composition Segment), an ODS (Object Definition Segment) for defining a graphics object, and an END segment;

the PCS has time information, the time information designating an active period of the PCS in the display set on a reproduction time axis of the video stream;

each segment is contained in a packet;

the time information includes a decoding time stamp and a presentation time stamp which are written in a packet;

the display set includes a sequence of ODSs including a referenced ODS which is referenced by the PCS in the display set and a non-referenced ODS which is not referenced by the PCS in the display set;

the referenced ODS and the non-referenced ODS are arranged in the display set; and when processing the display set, the graphics decoder decodes the referenced ODS and the non-referenced ODS which are placed between the PCS and the END segment in the display set, and stores a graphics object obtained as a result of the decoding into a buffer in the graphics decoder.

4. The reproduction apparatus of claim 3, wherein:

the decoding of the referenced ODS and the non-referenced ODS by the graphics decoder is completed at a time shown by a time stamp associated with the END segment.

5. A recording method, comprising:

generating application data; and obtaining a recording medium on which the generated application data is written, wherein:

the application data includes a digital stream generated by multiplexing a video stream and a graphics stream;

the graphics stream includes a plurality of display sets each of which is used for a graphics display;

the display set includes a PCS (Presentation Composition Segment), an ODS (Object Definition Segment) for defining a graphics object, and an END segment;

the PCS has time information, the time information designating an active period of the PCS in the display set on a reproduction time axis of the video stream;

each segment is contained in a packet;

the time information includes a decoding time stamp and a presentation time stamp which are written in a packet;

the display set includes a sequence of ODSs including a referenced ODS which is referenced by the PCS in the display set and a non-referenced ODS which is not referenced by the PCS in the display set;

the referenced ODS and the non-referenced ODS are arranged in the display set;

the sequence of the referenced ODS and the non-referenced ODS are to be sequentially decoded in an order of the arrangement; and the END segment immediately follows a last ODS of the sequence of the referenced ODS and the non-referenced ODS.

6. A reproduction method for realizing, on a computer, a process of reading a digital stream from a recording medium and reproducing a video stream and a graphics stream which are multiplexed in the digital stream, comprising:

decoding the video stream to generate a moving picture; and decoding the graphics stream to generate a graphics object, wherein:

the graphics stream includes a plurality of display sets each of which is used for a graphics display;

the display set includes a PCS (Presentation Composition Segment), an ODS (Object Definition Segment) for defining a graphics object, and an END segment;

the PCS has time information, the time information designating an active period of the PCS in the display set on a reproduction time axis of the video stream;

each segment is contained in a packet;

the time information includes a decoding time stamp and a presentation time stamp which are written in a packet;

the display set includes a sequence of ODSs including a referenced ODS which is referenced by the PCS in the display set and a non-referenced ODS which is not referenced by the PCS in the display set;

the referenced ODS and the non-referenced ODS are arranged in the display set; and when processing the display set, the decoding the graphics stream decodes the referenced ODS and the non-referenced ODS which are placed between the PCS and the END segment in the display set, and stores a graphics object obtained as a result of the decoding into a buffer in the computer.

7. A program recorded on a first non-transitory recording medium used for enabling a computer to execute a function of reading a digital stream from a second non-transitory recording medium and reproducing a video stream and a graphics stream which are multiplexed in the digital stream, the program enabling the computer to execute:

a function of decoding the video stream to generate a moving picture; and a function of decoding the graphics stream to generate a graphics object, wherein:

the graphics stream includes a plurality of display sets each of which is used for a graphics display;

the display set includes a PCS (Presentation Composition Segment), an ODS (Object Definition Segment) for defining a graphics object, and an END segment;

the PCS has time information, the time information designating an active period of the PCS in the display set on a reproduction time axis of the video stream;

each segment is contained in a packet;
the time information includes a decoding time stamp and a presentation time stamp which are written in a packet;
the display set includes a sequence of ODSs including a referenced ODS which is referenced by the PCS in the display set and a non-referenced ODS which is not referenced by the PCS in the display set;
the referenced ODS and the non-referenced ODS are arranged in the display set; and
when processing the display set, the function of decoding the graphics stream decodes the referenced ODS and the non-referenced ODS which are placed between the PCS and the END segment in the display set, and stores a graphics object obtained as a result of the decoding into a buffer in the computer.

* * * * *